(12) United States Patent
Ito et al.

(10) Patent No.: US 8,394,468 B2
(45) Date of Patent: Mar. 12, 2013

(54) POLYMERIZABLE COMPOUND AND LIQUID CRYSTAL COMPOSITION INCLUDING IT

(75) Inventors: Maiko Ito, Chiba (JP); Keiji Kimura, Chiba (JP); Norikatsu Hattori, Chiba (JP); Eriko Saegusa, Chiba (JP)

(73) Assignees: JNC Corporation, Tokyo (JP); JNC Petrochemical Corporation, Tokyo (JP)

( * ) Notice: Subject to any disclaimer, the term of this patent is extended or adjusted under 35 U.S.C. 154(b) by 0 days.

(21) Appl. No.: 13/318,360

(22) PCT Filed: May 7, 2010

(86) PCT No.: PCT/JP2010/057786
§ 371 (c)(1),
(2), (4) Date: Nov. 1, 2011

(87) PCT Pub. No.: WO2010/131600
PCT Pub. Date: Nov. 18, 2010

(65) Prior Publication Data
US 2012/0092608 A1    Apr. 19, 2012

(30) Foreign Application Priority Data
May 11, 2009    (JP) ................................. 2009-114247

(51) Int. Cl.
*C07C 69/76* (2006.01)
*C09K 19/32* (2006.01)
*C09K 19/30* (2006.01)
*C09K 19/34* (2006.01)
*C09K 19/12* (2006.01)
*C09K 19/20* (2006.01)
*G02F 1/1333* (2006.01)

(52) U.S. Cl. . 428/1.1; 560/80; 252/299.61; 252/299.62; 252/299.63; 252/299.66; 252/299.67; 349/183

(58) Field of Classification Search .................. 560/139, 560/194, 80; 252/299.62, 299.61; 349/183; 428/1.1
See application file for complete search history.

(56) References Cited

U.S. PATENT DOCUMENTS

| | | | |
|---|---|---|---|
| 3,660,505 A | 5/1972 | Starnes, Jr. | |
| 4,676,604 A | 6/1987 | Petrzilka | |
| 5,674,576 A * | 10/1997 | Gotoh et al. | .................... 428/1.2 |
| 2006/0066793 A1 | 3/2006 | Ohmuro et al. | |
| 2012/0069289 A1 * | 3/2012 | Taugerbeck et al. | .......... 349/183 |

FOREIGN PATENT DOCUMENTS

| | | |
|---|---|---|
| EP | 1889894 | 2/2008 |
| JP | 02-503441 | 10/1990 |
| JP | 08-209147 | 8/1996 |
| JP | 2003-307720 | 10/2003 |
| JP | 2004-123829 | 4/2004 |
| JP | 2004-131704 | 4/2004 |
| JP | 2005-035986 | 2/2005 |
| JP | 2006-133619 | 5/2006 |
| WO | 2009/030322 | 3/2009 |

* cited by examiner

*Primary Examiner* — Shean C Wu
(74) *Attorney, Agent, or Firm* — Jianq Chyun IP Office

(57) ABSTRACT

Provided is a polymerizable compound with large solubility in a liquid crystal composition and high reactivity irradiated by ultraviolet in the longer wavelength range. Provided is a liquid crystal composition that satisfies at least one of characteristics such as high maximum temperature of a nematic phase, low minimum temperature of a nematic phase, small viscosity, suitable optical anisotropy, large negative dielectric anisotropy, large specific resistance, high stability to ultraviolet light and high stability to heat, or that is suitably balanced between at least two of the characteristics. Provided is the polymerizable compound wherein at least one of a 1,3-phenylene structure and a 2,7-fluorenediyl structure is introduced to the polymerizable compound to give stable displays by forming a polymer with a high degree of polymerization in a PSA device production process using longer wavelengths, the liquid crystal composition includes the compound, and the liquid crystal display device contains the composition.

17 Claims, 6 Drawing Sheets

US 8,394,468 B2

POLYMERIZABLE COMPOUND AND LIQUID CRYSTAL COMPOSITION INCLUDING IT

CROSS-REFERENCE TO RELATED APPLICATION

This application is a 371 of international application of PCT application serial no. PCT/JP2010/057786, filed on May 7, 2010, which claims the priority benefit of Japan application no. 2009-114247, filed on May 11, 2009. The entirety of each of the above-mentioned patent applications is hereby incorporated by reference herein and made a part of this specification.

TECHNICAL FIELD

The invention relates to a polymerizable compound that is polymerized, for example, by light or heat, and a liquid crystal composition including this polymerizable compound. It also relates a liquid crystal display device, where the liquid crystal composition is sealed between substrates, and the polymerizable compound included in the liquid crystal composition is polymerized while a voltage applied to the liquid crystal layer is adjusted, and then the orientation of liquid crystals is fixed.

Technical field of the invention relates mainly to a liquid crystal composition suitable for use in an AM (active matrix) device and so forth, and an AM device and so forth that contain the composition. More specifically, it relates to a liquid crystal composition having negative dielectric anisotropy, and a device containing this composition and having an IPS (in-plane switching) mode, a VA (vertical alignment) mode, or these modes to which PSA (polymer sustained alignment) technology is applied. The VA mode includes a MVA (multi-domain vertical alignment) mode and a PVA (patterned vertical alignment) mode.

TECHNICAL BACKGROUND

In a liquid crystal display device, a classification based on an operating mode for liquid crystals includes modes of PC (phase change), TN (twisted nematic), STN (super twisted nematic), ECB (electrically controlled birefringence), OCB (optically compensated bend), IPS (in-plane switching) and VA (vertical alignment). A classification based on a driving mode in the device includes PM (passive matrix) and AM (active matrix). The PM is further classified into static, multiplex and so forth, and the AM is classified into TFT (thin film transistor), MIM (metal-insulator-metal) and so forth. The TFT is further classified into amorphous silicon and polycrystal silicon. The latter is classified into a high temperature type and a low temperature type according to the production process. A classification based on a light source includes a reflection type utilizing natural light, a transmission type utilizing a backlight and a semi-transmission type utilizing both natural light and a backlight.

These devices contain a liquid crystal composition having suitable characteristics. The liquid crystal composition has a nematic phase. General characteristics of the composition should be improved to give an AM device having good general characteristics. Table 1 below summarizes the relationship between the general characteristics of the two. The general characteristics of the composition will be further explained on the basis of a commercially available AM device. The temperature range of a nematic phase relates to the temperature range in which the device can be used. A desirable maximum temperature of the nematic phase is 70° C. or higher and a desirable minimum temperature of the nematic phase is −10° C. or lower. The viscosity of the composition relates to the response time of the device. A short response time is desirable for displaying moving images on the device. Accordingly, a small viscosity of the composition is desirable. A small viscosity at a low temperature is more desirable.

TABLE 1

General Characteristics of Composition and AM Device

| No. | General Characteristics of Composition | General Characteristics of AM Device |
|---|---|---|
| 1 | wide temperature range of a nematic phase | wide usable temperature range |
| 2 | small viscosity [1] | short response time |
| 3 | suitable optical anisotropy | large contrast ratio |
| 4 | large positive or negative dielectric anisotropy | low threshold voltage and small electric power consumption large contrast ratio |
| 5 | large specific resistance | large voltage holding ratio and large contrast ratio |
| 6 | high stability to ultraviolet light and heat | long service life |

[1] A liquid crystal composition can be injected into a liquid crystal cell in a shorter period of time.

The optical anisotropy of the composition relates to the contrast ratio of the device. The product ($\Delta n \times d$) of the optical anisotropy ($\Delta n$) of the composition and the cell gap (d) of the device is designed so as to maximize the contrast ratio. A suitable value of the product depends on the kind of operating mode. In a device having a VA mode or a PSA mode, a suitable value is in the range of 0.30 μm to 0.40 μm, and in a device having an IPS mode, a suitable value is in the range of 0.20 μm to 0.30 μm. In this case, a composition having a large optical anisotropy is desirable for a device having a small cell gap. A large absolute value of the dielectric anisotropy in the composition contributes to a low threshold voltage, small electric power consumption and a high contrast ratio of the device. Accordingly, a large absolute value of the dielectric anisotropy is desirable. A large specific resistance of the composition contributes to a large voltage holding ratio and a large contrast ratio of the device. Accordingly, a composition having a large specific resistance at room temperature and also at a high temperature in the initial stage is desirable. A composition having a large specific resistance at room temperature and also at a high temperature is desirable after it has been used for a long time. The stability of the composition to ultraviolet light and heat relates to the service life of the liquid crystal display device. In the case where the stability is high, the device has a long service life. Such characteristics are desirable for an AM device used in a liquid crystal projector, a liquid crystal television and so forth.

A composition having positive dielectric anisotropy is used for an AM device having a TN mode. On the other hand, a composition having negative dielectric anisotropy is used for an AM device having a VA mode. A composition having positive or negative dielectric anisotropy is used for an AM device having an IPS mode. A composition having positive or negative dielectric anisotropy is used for an AM device to which PSA (polymer sustained alignment) technology is applied. Examples of the liquid crystal composition having negative dielectric anisotropy are disclosed in the following patent documents No. 1 to No. 4.

PRIOR ART

Reference-Patents
Patent document No. 1: JP 2003-307720 A.
Patent document No. 2: JP 2004-131704 A.
Patent document No. 3: JP 2006-133619 A.
Patent document No. 4: EP 1,889,894 A.

A desirable AM device has characteristics such as a wide temperature range in which the device can be used, a short response time, a large contrast ratio, a low threshold voltage, a large voltage holding ratio and a long service life. Response time that is even one millisecond shorter than that of the other devices is desirable. Thus, desirable characteristics of the composition include a high maximum temperature of a nematic phase, a low minimum temperature of a nematic phase, a small viscosity, a suitable optical anisotropy, a large positive or negative dielectric anisotropy, a large specific resistance, a high stability to ultraviolet light and a high stability to heat.

In a display device to which PSA technology is applied, a small amount (for example, 0.3% by weight, and typically less than 1%) of a polymerizable compound (RM) is added to a liquid crystal composition. After the pouring into a liquid crystal display cell, the RM only is polymerized usually by irradiation with ultraviolet light under the conditions that a voltage is applied between electrodes, giving a polymer structure in the device. It is known that a polymerizable mesogenic or liquid crystal compound as a monomer, which will be added to a liquid crystal composition is especially suitable for the PM.

OUTLINE OF THE INVENTION

Subject to be Solved by the Invention

In the polymerizable mesogenic or liquid crystal compound described above, the ability to orient liquid crystal molecules is generally high. On the other hand, the solubility in the liquid crystal composition is poor, and thus a large amount cannot be added. Introduction of a flexible bonding group such as alkylene or ester between the ring structures increases the solubility in the liquid crystal composition, whereas ability to orient liquid crystal molecules is decreased since the rigidity of the molecules is decreased.

The production process of a liquid crystal display device is paid attention to. A polymerizable compound is mixed with a liquid crystal composition, and the mixture is sealed between glass substrates and is polymerized, while a voltage applied to the liquid crystal layer is adjusted. Ultraviolet light is irradiated through the glass substrate. The glass used for the display device absorbs ultraviolet light with short wavelengths. Thus, it is desirable that the compound has properties sensitive to ultraviolet light with longer wavelengths than the wavelength region absorbed by the glass, for effective polymerization of the polymerizable compound with ultraviolet light.

One of the aims of the invention is to provide a liquid crystal composition that satisfies at least one of characteristics such as a high maximum temperature of a nematic phase, a low minimum temperature of a nematic phase, a small viscosity, a suitable optical anisotropy, a large negative dielectric anisotropy, a large specific resistance, a high stability to ultraviolet light and a high stability to heat. Another aim is to provide a liquid crystal composition that is suitably balanced between at least two of the characteristics. A further aim is to provide a liquid crystal display device that contains such a composition. An additional aim is to provide a composition that has a suitable optical anisotropy, which means a large optical anisotropy or a small optical anisotropy, a large negative dielectric anisotropy, a high stability to ultraviolet light and so forth, and is to provide an AM device that has a short response time, a large voltage holding ratio, a large contrast ratio, a long service life and so forth, by the action of a polymer structure formed in the liquid crystal layer.

Means for Solving the Subject

The inventers paid attention to the skeleton structure of a polymerizable compound for use in a liquid crystal display device to which PSA technology is applied, and found that introduction of the skeleton structure of at least one of 1,3-phenylene or 2,7-fluorenediyl to the compound as a skeleton structure increased the solubility in a liquid crystal composition without an introduction of a flexible bonding group, and increased ability to orient the liquid crystal molecules by exhibiting an efficient PSA effect. The polymerizable compound of the invention is suitable as the PM for use in a variety of liquid crystal display apparatuses to which the PSA technology is applied under the conditions that the liquid crystal materials are less damaged, since it exhibits a high reactivity caused by irradiation with ultraviolet in the longer wavelength range.

With the addition of the polymerizable compound of the invention, it becomes possible to provide a liquid crystal composition that satisfies at least one of characteristics such as a high maximum temperature of a nematic phase, a low minimum temperature of a nematic phase, a small viscosity, a suitable optical anisotropy, a large positive or negative dielectric anisotropy, a large specific resistance, a high stability to ultraviolet light and a high stability to heat, or that has a suitable balance between at least two of the characteristics, and that is suitable for a display device to which PSA technology is applied.

It becomes possible to produce an AM device that has a short response time, a large voltage holding ratio, a large contrast ratio, a long service life and so forth, by using the liquid crystal composition of the invention that has a suitable optical anisotropy that is a small optical anisotropy or a large optical anisotropy, a large negative dielectric anisotropy, a high stability to ultraviolet light and so forth.

The invention is effective in an improvement of characteristics especially in a VA mode liquid crystal display device to which PSA technology is applied. The VA device to which PSA technology has two substrates equipped with a transparent electrode and a alignment film for orienting liquid crystal molecules, and a liquid crystal composition including a polymerizable compound is arranged between these substrates, and then the device is produced via step polymerization of the polymerizable compound while a voltage is applied between the opposing transparent electrodes on the substrates.

According to the invention, a liquid crystal material in which orientation of a polymer component during the voltage application is memorized is arranged between the substrates, and the direction of the fall of liquid crystal molecules sealed is memorized, and thus the response time is decreased, which makes it possible to improve screen afterimage.

Use of the polymerizable compound of the invention is applicable to a variety of cell production processes. Use of ultraviolet light with longer wavelengths makes it possible to produce a higher quality of a liquid crystal display device in comparison with the device using a reactive monomer that has been used for conventional polymer-aligned liquid crystal displays.

The invention concerns the compound represented by formula (1), a liquid crystal composition including the compound represented by formula (1) and a liquid crystal display device containing this composition.

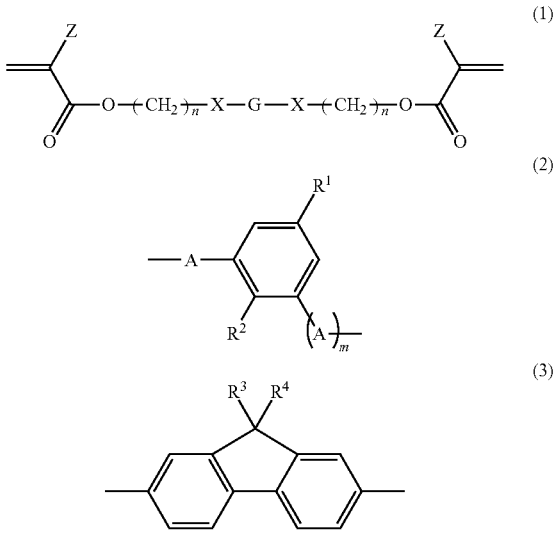

In formula (1), X is independently a single bond, —COO— or —O—; Z is independently hydrogen, fluorine, chlorine, methyl or —CF$_3$; n is independently an integer from 0 to 8; and G is a divalent group represented by formula (2) or formula (3).

In formula (2) and formula (3), A is independently 1,4-cyclohexylene, 1,4-cyclohexenylene, 1,4-phenylene, naphthalene-2,6-diyl, tetrahydropyran-2,5-diyl, 1,3-dioxane-2,5-diyl, pyrimidine-2,5-diyl or pyridine-2,5-diyl, and in these rings, arbitrary hydrogen may be replaced by fluorine; m is 0 or 1; $R^1$, $R^2$, $R^3$ and $R^4$ is independently alkyl having 1 to 5 carbons, hydrogen, chlorine or fluorine.

Effect of the Invention

An advantage of the invention is that the polymerizable compound has solubility in the liquid crystal composition, a high ability to orient liquid crystal molecules, a high reactivity caused by irradiation with ultraviolet in the longer wavelength range.

Another advantage of the invention is a liquid crystal composition that satisfies at least one of characteristics such as a high maximum temperature of a nematic phase, a low minimum temperature of a nematic phase, a small viscosity, a suitable optical anisotropy, a large negative dielectric anisotropy or a large positive dielectric anisotropy, a large specific resistance, a high stability to ultraviolet light and a high stability to heat. An aspect of the invention is a liquid crystal composition that is suitably balanced between at least two of the characteristics. Another aspect is a liquid crystal display device containing such a composition. A further aspect is composition having a suitable optical anisotropy, a large negative dielectric anisotropy or a large positive dielectric anisotropy, a large specific resistance, a high stability to ultraviolet light and so forth and an AM device that has an especially short response time, a large voltage holding ratio, a large contrast ratio, a long service life and so forth.

EMBODIMENT TO CARRY OUT THE INVENTION

Figure 1:
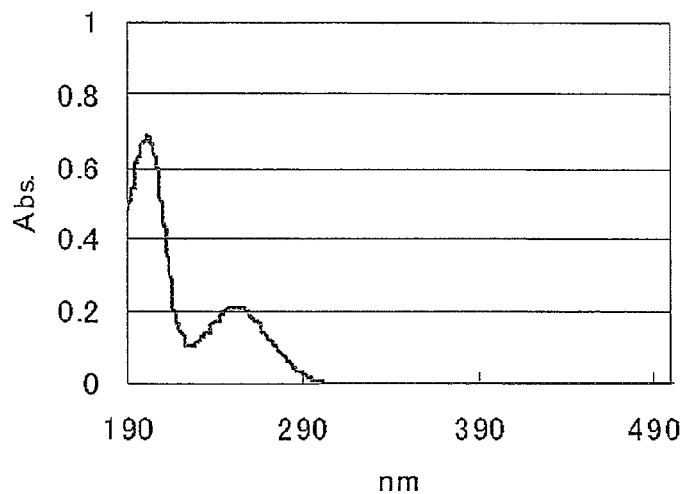
FIG. 1: UV/Vis spectrum of the compound (1-2-1) obtained in Example 1.

Usage of the terms in this specification is as follows. The liquid crystal composition of the invention and the liquid crystal display device of the invention may be abbreviated to "the composition" and "the device," respectively. "A liquid crystal display device" is a generic term for a liquid crystal display panel and a liquid crystal display module. "A liquid crystal compound" is a generic term for a compound having a liquid crystal phase such as a nematic phase or a smectic phase, and also for a compound having no liquid crystal phases but being useful as a component of a composition. Such a useful compound has a six-membered ring such as 1,4-cyclohexylene and 1,4-phenylene, and a rod-like molecular structure. An optically active compound and a polymerizable compound other than the compound represented by formula (1) may occasionally be added to the composition. Even in the case where these compounds are liquid crystalline, the compounds are classified as an additive herein. At least one compound selected from the group of compounds represented by formula (1) may be abbreviated to "the compound (1)." "The compound (1)" means one compound, or two or more compounds represented by formula (1). The same rules apply to compounds represented by the other formulas. "Arbitrary" is used not only in cases where the position is arbitrary but also in cases where the number is arbitrary. However, it is not used in cases where the number is 0 (zero).

A higher limit of the temperature range of a nematic phase may be abbreviated to "the maximum temperature." A lower limit of the temperature range of a nematic phase may be abbreviated to "the minimum temperature." That "specific resistance is large" means that a composition has a large specific resistance at room temperature and also at a temperature close to the maximum temperature of a nematic phase in the initial stage, and that the composition has a large specific resistance at room temperature and also at a temperature close to the maximum temperature of a nematic phase even after it has been used for a long time. That "a voltage holding ratio is large" means that a device has a large voltage holding ratio at room temperature and also at a high temperature in the initial stage, and that the device has a large voltage holding ratio at room temperature and also at a temperature close to the maximum temperature of a nematic phase even after it has been used for a long time. When characteristics such as optical anisotropy are explained, values obtained according to the measuring methods described in Examples will be used. Each component such as a first component means one compound, or two or more compounds. "The ratio of the first component" is expressed as a percentage by weight (% by weight) based on the total weight (100% by weight) of the liquid crystal composition excluding the first component. The ratio of the second component, the third component or the like (excluding the first component) means a percentage by weight (% by weight) of each component based on the total weight of the liquid crystal composition excluding the first component. That is to say, the ratio of the first component is calculated depending on the components of the composition in the following manner.

The ratio of the first component is calculated on the basis of the total weight of the second component and the third component. The ratio of the first component is calculated on the basis of the total weight of the second component, the third component and the fourth component. The ratio of the first component is calculated on the basis of the total weight of the second component, the third component, the fourth component and the fifth component.

A combination of components of the second component to, the fifth component is only one of examples, and is not limited to the examples. Each component may further include an impurity.

The ratio of an additive mixed with the composition is expressed as a percentage by weight (% by weight) or weight parts per million (ppm) based on the total weight of the liquid crystal composition.

The symbol $R^1$ is used for a plurality of compounds in the chemical formulas of component compounds. The meanings of $R^1$ may be the same or different in two arbitrary compounds among these. In one case, for example, $R^1$ of the compound (1-2) is ethyl and $R^1$ of the compound (2) is ethyl. In another case, $R^1$ of the compound (1-2) is ethyl and $R^1$ of the compound (2) is propyl. The same rule applies to the symbols $R^2$ to $R^{15}$ and so forth.

$Z^{11}$ to $Z^{15}$ and X to $X^2$, which are divalent groups, are not limited to the direction of the definition described, in the chemical formulas of component compounds. For example, the definition of —$CH_2O$— may also mean —$OCH_2$—, the definition of —COO— may also mean —OCO—, and definition of —$CF_2O$— may also mean —$OCF_2$—.

A, $A^l$, B, $B^1$, $B^2$, C, D, E, $F^1$, $F^2$, $I^1$ to $I^3$ and $J^1$ to $J^3$, which are disubstituted rings, are not limited to the direction of the definition described in the chemical formulas of component compounds. For example, the definition of 2-fluoro-1,4-phenylene may mean 3-fluoro-1,4-phenylene.

When k, j, p, q, r, t or u, which means the repetition of the unit structure, is two ore more in the chemical formulas of component compounds, a plurality of a divalent group or a disubstituted ring can be selected and these may be the same or different.

For example, when k is 2 in the compound (4), two of the ring B may be two of 1,4-cyclohexylene or two of 1,4-phenylene, and may also be a combination of 1,4-cyclohexylene and 1,4-phenylene. Similarly, a combination of a single bond and a single bond may be selected for $Z^{11}$, or a combination of a single bond and —COO— may be selected for $Z^{11}$ for instance.

The invention includes the following items.
1. A compound represented by formula (1).

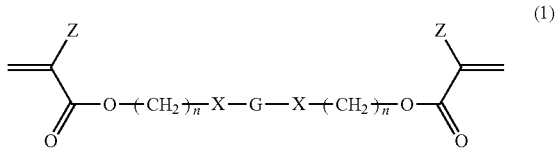

(1)

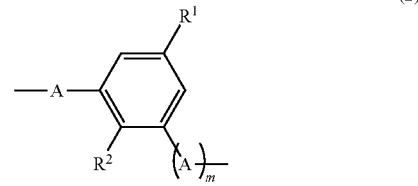

(2)

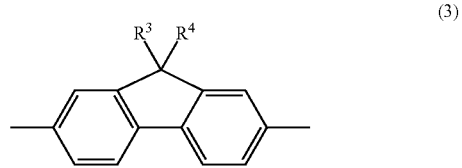

(3)

In formula (1), X is independently a single bond, —COO— or —O—; Z is independently hydrogen, fluorine, chlorine, methyl or —$CF_3$; n is independently an integer from 0 to 8; and G is a divalent group represented by formula (2) or formula (3).

In formula (2) and formula (3), A is independently 1,4-cyclohexylene, 1,4-cyclohexenylene, 1,4-phenylene, naphthalene-2,6-diyl, tetrahydropyran-2,5-diyl, 1,3-dioxane-2,5-diyl, pyrimidine-2,5-diyl or pyridine-2,5-diyl, and in these rings arbitrary hydrogen may be replaced by fluorine; m is 0 or 1; and $R^1$, $R^2$, $R^3$ and $R^4$ are independently alkyl having 1 to 5 carbons, hydrogen, chlorine or fluorine.

2. A compound represented by formula (1-2).

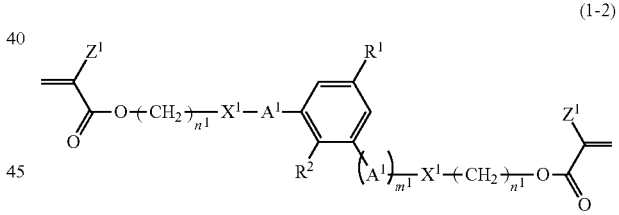

(1-2)

In the formula, $R^1$ and $R^2$ are independently alkyl having 1 to 5 carbons, hydrogen, chlorine or fluorine; $A^l$ is independently 1,4-cyclohexylene, 1,4-cyclohexenylene, 1,4-phenylene, naphthalene-2,6-diyl, tetrahydropyran-2,5-diyl, 1,3-dioxane-2,5-diyl, pyrimidine-2,5-diyl or pyridine-2,5-diyl, and in these rings, arbitrary hydrogen may be replaced by fluorine; $X^1$ is independently a single bond, —COO— or —O—; $Z^1$ is independently hydrogen, fluorine, chlorine, methyl or —$CF_3$; $m^1$ is 0 or 1; and $n^1$ is independently an integer from 0 to 8.

3. The compound according to item 2, wherein $R^1$ and $R^2$ are independently hydrogen, methyl, chlorine or fluorine; $A^1$ is independently 1,4-phenylene, 2-fluoro-1,4-phenylene, 2,3-difluoro-1,4-phenylene, naphthalene-2,6-diyl or 3-fluoro-naphthalene-2,6-diyl; $X^1$ is a single bond; $Z^1$ is independently hydrogen or methyl; $m^1$ is 1; and $n^1$ is 0.

4. The compound according to item 2, wherein $R^1$ is hydrogen, methyl, chlorine or fluorine; $R^2$ is hydrogen or fluorine; $A^1$ is independently 1,4-phenylene, 2-fluoro-1,4-phenylene, 2,3-difluoro-1,4-phenylene, naphthalene-2,6-diyl or 3-fluoro-naphthalene-2,6-diyl; $X^1$ is a single bond; $Z^1$ is independently hydrogen or methyl; $m^1$ is 0; and $n^1$ is 0.

5. A compound represented by formula (1-3).

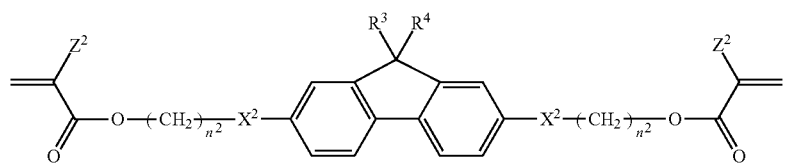

(1-3)

In the formula, $R^3$ and $R^4$ are independently alkyl having 1 to 5 carbons, hydrogen, chlorine or fluorine; $X^2$ is independently a single bond, —COO— or —O—; $Z^2$ is independently hydrogen, fluorine, chlorine, methyl or —$CF_3$; and $n^2$ is independently an integer from 0 to 8.

6. The compound according to item 5, wherein $R^3$ is hydrogen, $R^4$ is methyl, $X^2$ is a single bond, $Z^2$ is independently hydrogen or methyl, and $n^2$ is 0.

7. The compound according to item 5, wherein $R^3$ and $R^4$ are methyl, $X^2$ is a single bond, $Z^2$ is independently hydrogen or methyl, and $n^2$ is 0.

8. A liquid crystal composition including at least one compound selected from the group of compounds represented by formula (1) according to item 1 as a first component, at least one compound selected from the group of compounds represented by formula (4) as a second component, and at least one compound selected from the group of compounds represented by formula (5) as a third component.

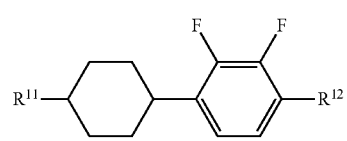

(4)

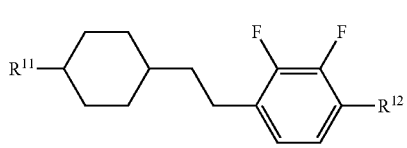

(5)

In the formulas, $R^{11}$, $R^{12}$, $R^{13}$ and $R^{14}$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; the ring B is independently 1,4-cyclohexylene or 1,4-phenylene; the ring C and the ring D are independently 1,4-cyclohexylene, 1,4-phenylene, 2-fluoro-1,4-phenylene or 2,5-difluoro-1,4-phenylene; $Z^{11}$ is independently a single bond, —$(CH_2)_2$—, —$CH_2O$— or —COO—; and k and j are independently 1, 2 or 3.

9. The liquid crystal composition according to item 8, wherein the first component is at least one compound selected from the group of compounds represented by formula (1-2) according to item 2, the second component is at least one compound selected from the group of compounds represented by formula (4), and the third component is at least one compound selected from the group of compounds represented by formula (5).

10. The liquid crystal composition according to item 8, wherein the first component is at least one compound selected from the group of compounds represented by formula (1-3) according to item 5, the second component is at least one compound selected from the group of compounds represented by formula (4), and the third component is at least one compound selected from the group of compounds represented by formula (5).

11. The liquid crystal composition according to item 8, wherein the second component is at least one compound selected from the group of compounds represented by formula (4-1) to formula (4-7).

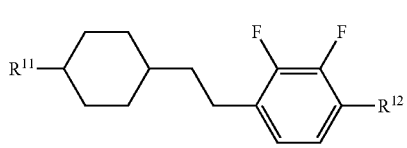

(4-1)

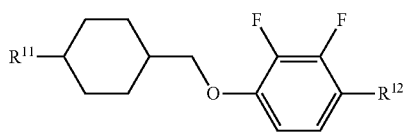

(4-2)

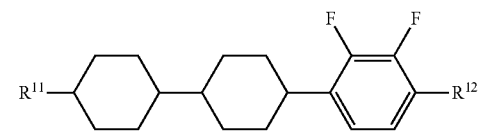

(4-3)

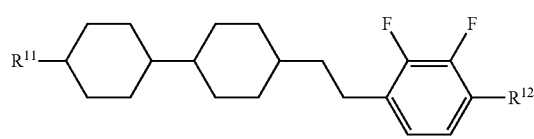

(4-4)

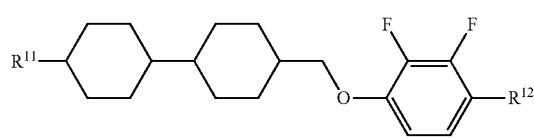

(4-5)

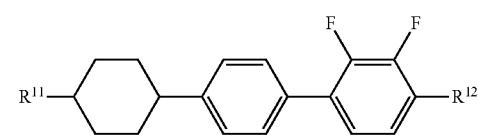

(4-6)

(4-7)

In the formulas, $R^{11}$ and $R^{12}$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

12. The liquid crystal composition according to item 11, wherein the second component is at least one compound selected from the group of compounds represented by formula (4-1).

13. The liquid crystal composition according to item 11, wherein the second component is at least one compound selected from the group of compounds represented by formula (4-4).

14. The liquid crystal composition according to item 11, wherein the second component is at least one compound selected from the group of compounds represented by formula (4-7).

15. The liquid crystal composition according to item 11, wherein the second component is a mixture of at least one compound selected from the group of compounds represented by formula (4-1) and at least one compound selected from the group of compounds represented by formula (4-4).

16. The liquid crystal composition according to item 11, wherein the second component is a mixture of is at least one compound selected from the group of compounds represented by formula (4-1) and at least one compound selected from the group of compounds represented by formula (4-7).

17. The liquid crystal composition according to item 11, wherein the second component is a mixture of at least one compound selected from the group of compounds represented by formula (4-1), at least one compound selected from the group of compounds represented by formula (4-4), and at least one compound selected from the group of compounds represented by formula (4-7).

18. The liquid crystal composition according to any one of items 8 to 17, wherein the third component is at least one compound selected from the group of compounds represented by formula (5-1) to formula (5-13).

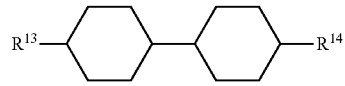
(5-1)

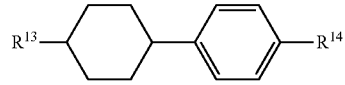
(5-2)

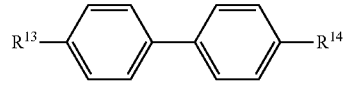
(5-3)

(5-4)

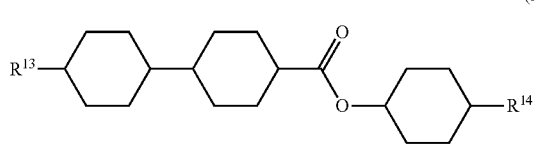

(5-5)

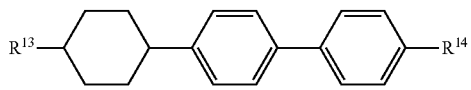
(5-6)

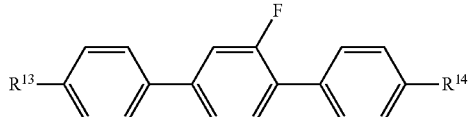
(5-7)

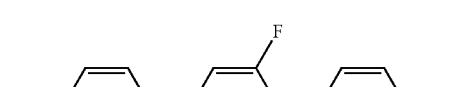
(5-8)

(5-9)

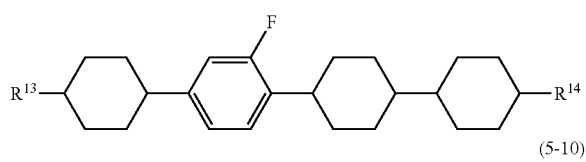

(5-10)

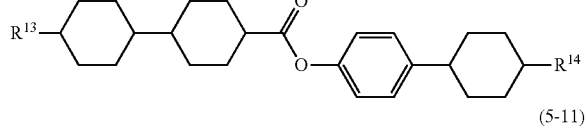

(5-11)

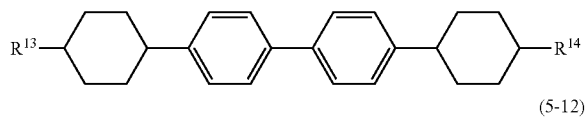

(5-12)

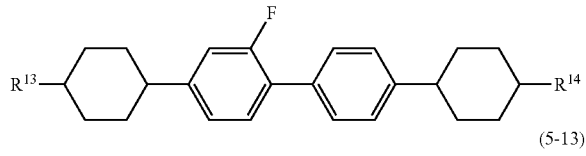

(5-13)

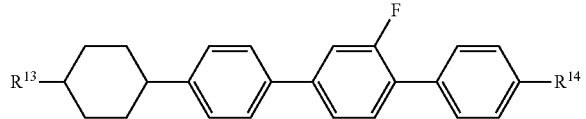

In the formulas, $R^{13}$ and $R^{14}$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

19. The liquid crystal composition according to item 18, wherein the third component is at least one compound selected from the group of compounds represented by formula (5-1).

20. The liquid crystal composition according to item 18, wherein the third component is a mixture of at least one compound selected from the group of compounds represented by formula (5-1) and at least one compound selected from the group of compounds represented by formula (5-5).

21. The liquid crystal composition according to item 18, wherein the third component is a mixture of at least one compound selected from the group of compounds represented by formula (5-1) and at least one compound selected from the group of compounds represented by formula (5-7).

22. The liquid crystal composition according to item 18, wherein the third component is a mixture of at least one compound selected from the group of compounds represented by formula (5-1), at least one compound selected from the group of compounds represented by formula (5-7), and at least one compound selected from the group of compounds represented by formula (5-13).
23. The liquid crystal composition according to any one of items 8 to 22, wherein the ratio of the second component is in the range of 10% by weight to 60% by weight and the ratio of the third component is in the range of 5% by weight to 50% by weight based on the weight of the liquid crystal composition excluding the first component, and the ratio of the first component is in the range of 0.05% by weight to 10% by weight based on 100% by weight of the liquid crystal composition excluding the first component.
24. The liquid crystal composition according to any one of items 8 to 23, further including at least one compound selected from the group of compounds represented by formula (6-1) to formula (6-4) as a fourth component.

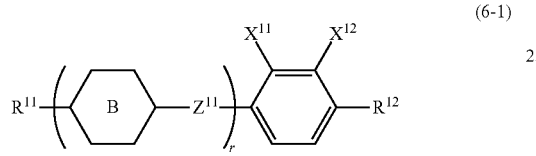

(6-1)

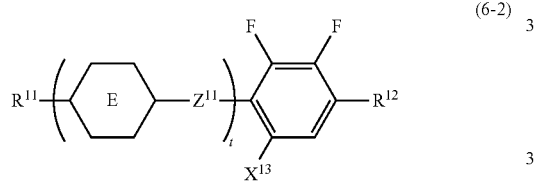

(6-2)

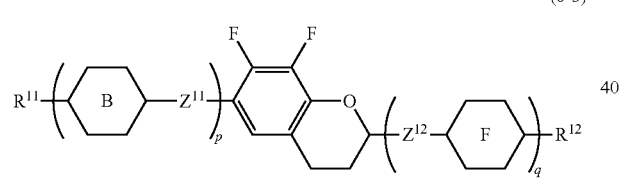

(6-3)

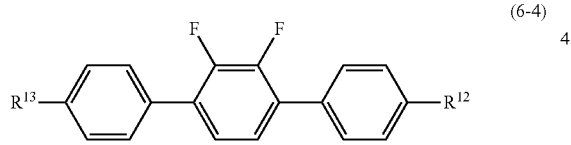

(6-4)

In the formulas, $R^{11}$ and $R^{12}$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; the ring B and the ring F are independently 1,4-cyclohexylene or 1,4-phenylene; the ring E is independently tetrahydropyran-2,5-diyl, 1,4-cyclohexylene, 1,4-phenylene, 2,3-difluoro-1,4-phenylene or 2-fluoro-1,4-phenylene; $Z^{11}$ and $Z^{12}$ are independently a single bond, —(CH$_2$)$_2$—, —CH$_2$O— or —COO—; one of $X^{11}$ and $X^{12}$ is fluorine, and the other is chlorine; $X^{13}$ is hydrogen or methyl, and at least one of the ring E is tetrahydropyran-2,5-diyl, 2,3-difluoro-1,4-phenylene or 2-fluoro-1,4-phenylene when $X^{13}$ is hydrogen; r and t are independently 1, 2 or 3; and p and q are independently 0, 1, 2 or 3, and the sum of p and q is 0, 1, 2 or 3.
25. The liquid crystal composition according to item 24, wherein the fourth component is at least one compound selected from the group of compounds represented by formula (6-1-1) to formula (6-1-3), formula (6-2-1) to formula (6-2-16), formula (6-3-1) to formula (6-3-4) and formula (6-4).

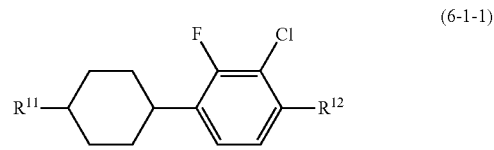

(6-1-1)

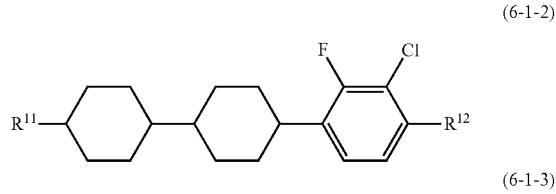

(6-1-2)

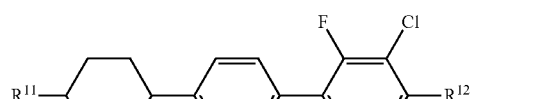

(6-1-3)

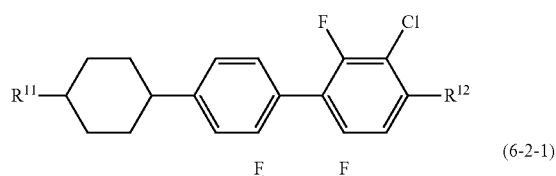

(6-2-1)

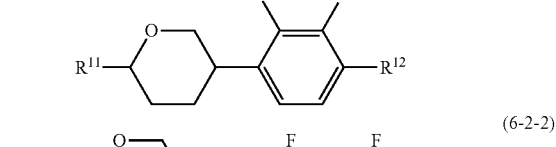

(6-2-2)

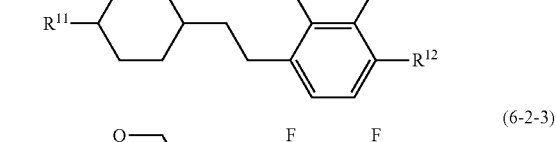

(6-2-3)

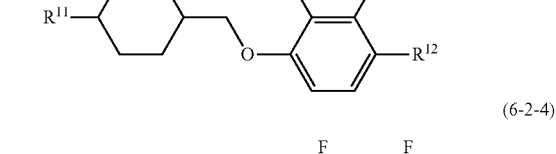

(6-2-4)

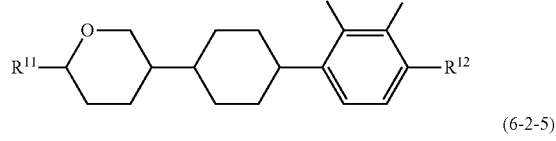

(6-2-5)

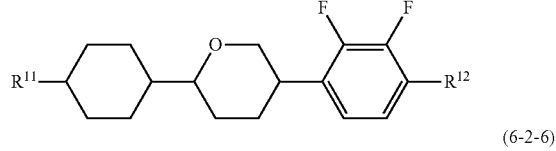

(6-2-6)

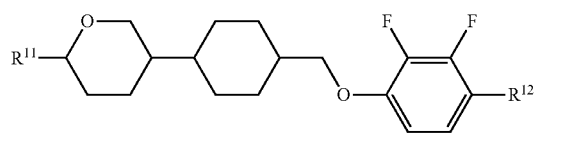

(6-2-7)

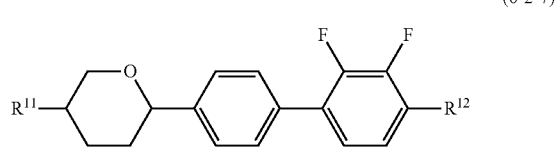

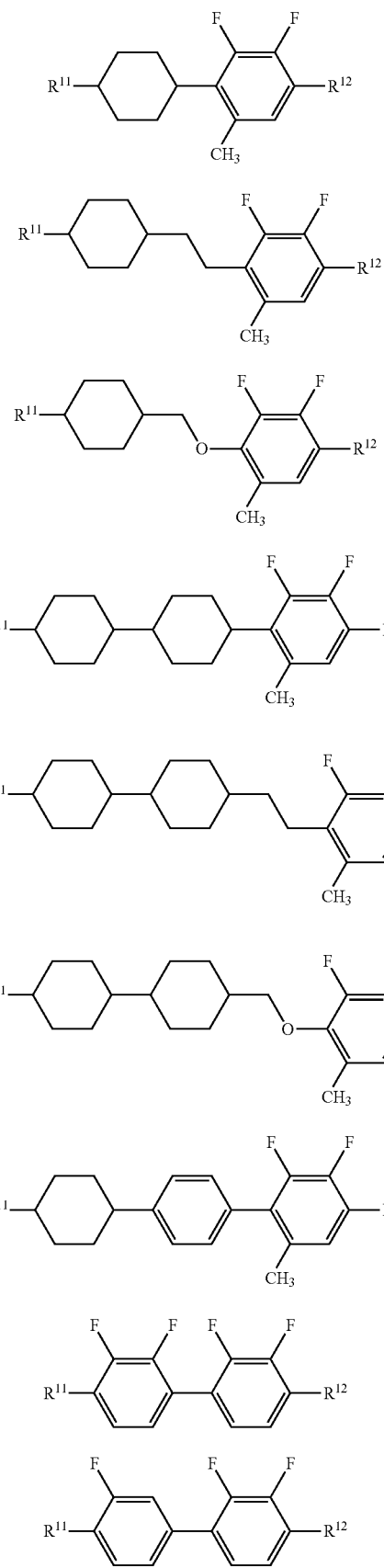
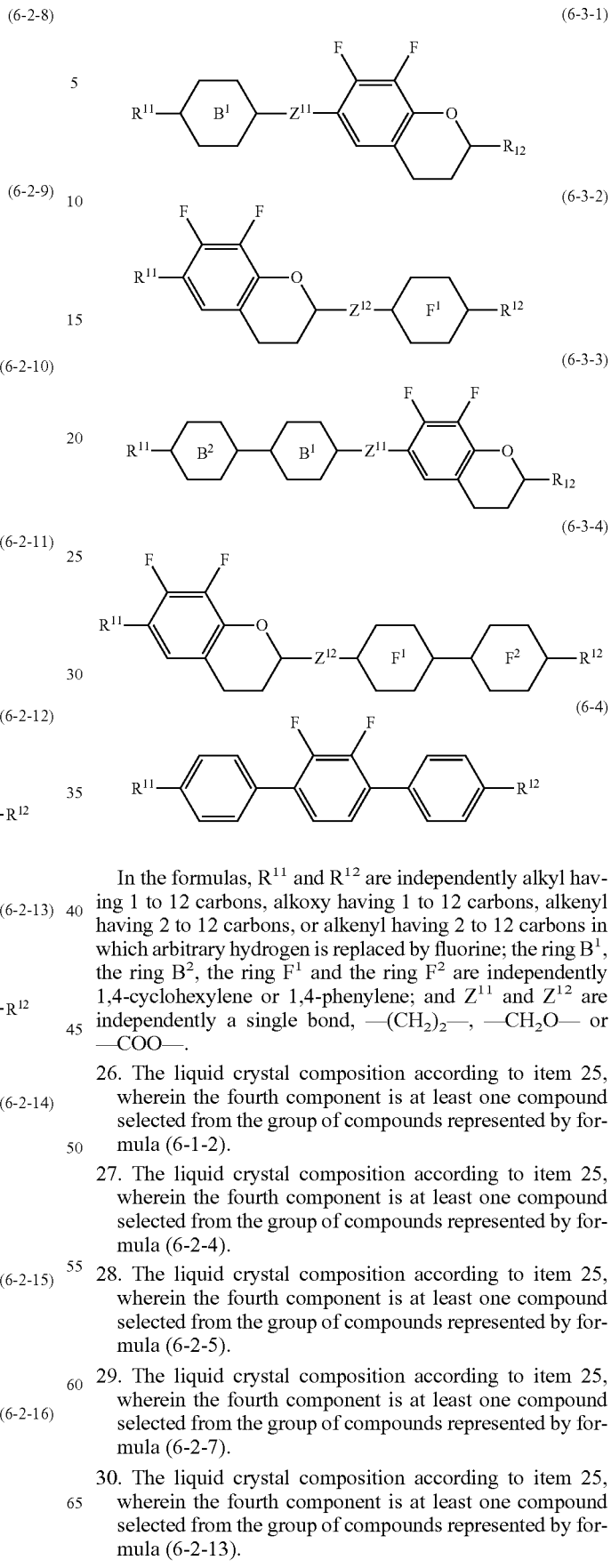

In the formulas, $R^{11}$ and $R^{12}$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; the ring $B^1$, the ring $B^2$, the ring $F^1$ and the ring $F^2$ are independently 1,4-cyclohexylene or 1,4-phenylene; and $Z^{11}$ and $Z^{12}$ are independently a single bond, —(CH$_2$)$_2$—, —CH$_2$O— or —COO—.

26. The liquid crystal composition according to item 25, wherein the fourth component is at least one compound selected from the group of compounds represented by formula (6-1-2).

27. The liquid crystal composition according to item 25, wherein the fourth component is at least one compound selected from the group of compounds represented by formula (6-2-4).

28. The liquid crystal composition according to item 25, wherein the fourth component is at least one compound selected from the group of compounds represented by formula (6-2-5).

29. The liquid crystal composition according to item 25, wherein the fourth component is at least one compound selected from the group of compounds represented by formula (6-2-7).

30. The liquid crystal composition according to item 25, wherein the fourth component is at least one compound selected from the group of compounds represented by formula (6-2-13).

31. The liquid crystal composition according to item 25, wherein the fourth component is at least one compound selected from the group of compounds represented by formula (6-2-15).
32. The liquid crystal composition according to any one of items 24 to 31, wherein the ratio of the fourth component is in the range of 5% by weight to 50% by weight based on the weight of the liquid crystal composition excluding the first component.
33. The liquid crystal composition according to any one of items 8 to 32, further including at least one compound selected from the group of compounds represented by formula (7-1) to formula (7-4) as a fifth component.

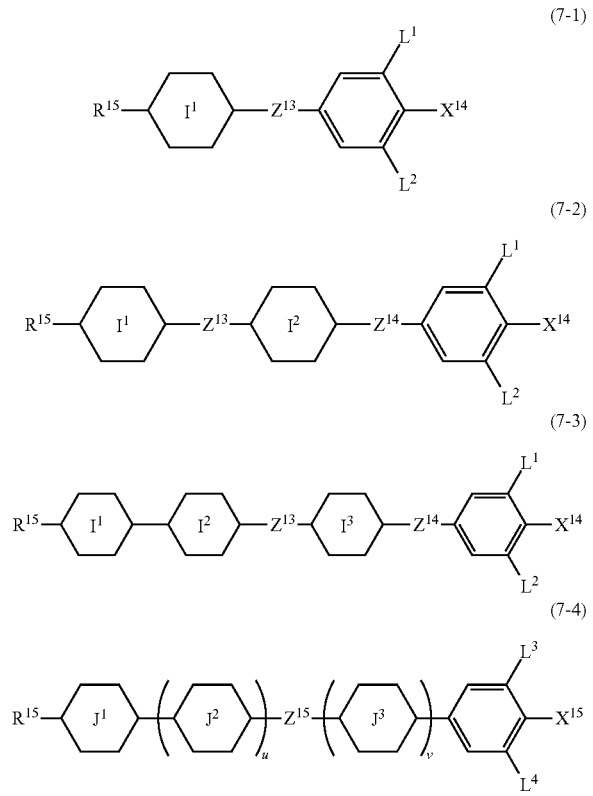

In the formulas, $R^{15}$ is alkyl having 1 to 12 carbons or alkenyl having 2 to 12 carbons, and in the alkyl and alkenyl, arbitrary hydrogen may be replaced by fluorine, and arbitrary —$CH_2$— may be replaced by —O—; $X^{14}$ is fluorine, chlorine, —$OCF_3$, —$OCHF_2$, —$CF_3$, —$CHF_2$, —$CH_2F$, —$OCF_2CHF_2$ or —$OCF_2CHFCF_3$; $X^{15}$ is —C≡N or —C≡C—C≡N; the ring $I^1$, the ring $I^2$, the ring $I^3$, the ring $J^1$, the ring $J^2$ and the ring $J^3$ are independently 1,4-cyclohexylene, 1,3-dioxane-2,5-diyl, pyrimidine-2,5-diyl, tetrahydropyran-2,5-diyl or 1,4-phenylene in which arbitrary hydrogen may be replaced by fluorine; $Z^{13}$ and $Z^{14}$ are independently —$(CH_2)_2$—, —$(CH_2)_4$—, —COO—, —$CF_2O$—, —$OCF_2$—, —CH═CH—, —C≡C—, —$CH_2O$— or a single bond; $Z^{15}$ is —$(CH_2)_2$—, —COO—, —$CF_2O$—, —C≡C—, —$CH_2O$— or a single bond; $L^1$, $L^2$, $L^3$ and $L^4$ are independently hydrogen or fluorine; and u is 0, 1 or 2, and v is 0 or 1.
34. The liquid crystal composition according to item 33, wherein the ratio of the fifth component is in the range of 5% by weight to 50% by weight based on the weight of the liquid crystal composition excluding the first component.
35. The liquid crystal composition according to any one of items 8 to 34, further including a polymerization initiator.
36. The liquid crystal composition according to any one of items 8 to 35, further including a polymerization inhibitor.
37. The liquid crystal composition according to any one of items 8 to 36, wherein the maximum temperature of a nematic phase is 70° C. or higher, the optical anisotropy (25° C.) at a wavelength of 589 nanometers is 0.08 or more, and the dielectric anisotropy (25° C.) at a frequency of 1 kHz is −2 or less.
38. A PSA (polymer sustained alignment) type-liquid crystal display device, wherein the device contains two substrates, where at least one of the substrates has an electrode layer, and a liquid crystal material is arranged between these two substrates, and the liquid crystal material is prepared by polymerization of the polymerizable compound that is included in liquid crystal composition according to any one of items 8 to 37.
39. The liquid crystal display device according to item 38, wherein the operating mode of the liquid crystal display device is a TN mode, a VA mode or an IPS mode, and the driving mode of the liquid crystal display device is an active matrix mode.
40. The liquid crystal display device according to item 38, wherein the operating mode of the liquid crystal display device is a VA mode.
41. The liquid crystal display device according to item 38, wherein the liquid crystal display device has a multi-domain structure, and the driving mode is a VA mode.
42. The liquid crystal display device according to item 38, wherein the operating mode of the liquid crystal display device is an OCB mode or an IPS mode.
43. A method for the production of the liquid crystal display device according to item 38, wherein a voltage is applied to the liquid crystal composition according to any one of items 8 to 37 which is arranged between the two substrates, and the polymerizable compound is polymerized by irradiation with light.

The invention further includes the following items: (1) the composition described above, further including an optically active compound; (2) the composition described above, further including an additive, such as an antioxidant, an ultraviolet light absorber and an antifoaming agent; (3) an AM device containing the composition described above; (4) a device having a mode of TN, ECB, OCB, IPS, VA or PSA and containing the composition described above; (5) a transmission-type device containing the composition described above; (6) use of the composition described above, as a composition having a nematic phase; and (7) use of the composition prepared by the addition of an optically active compound to the composition described above, as an optically active composition.

The composition of the invention will be explained in the following order. First, the constitution of component compounds in the composition will be explained. Second, main characteristics of the component compounds and main effects of these compounds on the composition will be explained. Third, a combination of components in the composition, desirable ratios of the component compounds and the basis thereof will be explained. Fourth, a desirable embodiment of the component compounds will be explained. Fifth, specific examples of the component compounds will be shown. Sixth, additives that may be mixed with the composition will be explained. Seventh, methods for synthesizing the component compounds will be explained. Last, use of the composition will be explained.

First, the constitution of component compounds in the composition will be explained. The compositions of the invention are classified into the composition A and the composition B. The composition A may further include any other liquid crystal compound, an additive and an impurity. "Any other liquid crystal compound" is a liquid crystal compound that is different from the compound (1), the compound (1-2), the compound (1-3), the compound (4), the compound (5), the compound (6-1), the compound (6-2), the compound (6-3), the compound (6-4), the compound (7-1), the compound (7-2), the compound (7-3) and the compound (7-4). Such a compound is mixed with the composition for the purpose of further adjusting characteristics of the composition. Of any other liquid crystal compound, a smaller amount of a cyano compound is desirable in view of its stability to heat or ultraviolet light. A more desirable ratio of the cyano compound is 0% by weight. The additive includes an optically active compound, an antioxidant, an ultraviolet light absorber, a coloring matter, an antifoaming agent, a polymerizable compound and a polymerization initiator. The impurity is compounds and so forth which have contaminated component compounds in a process such as their synthesis. Even in the case where the compound is liquid crystalline, it is classified into an impurity herein.

The composition B consists essentially of compounds selected from the group of the compound (1), the compound (1-2), the compound (1-3), the compound (4), the compound (5), the compound (6-1), the compound (6-2), the compound (6-3), the compound (6-4), the compound (7-1), the compound (7-2), the compound (7-3) and the compound (7-4). The term "essentially" means that the composition may include an additive and an impurity, but does not include any liquid crystal compound other than these compounds. The composition B has a smaller number of components than the composition A. The composition B is preferable to the composition A in view of cost reduction. The composition A is preferable to the composition B in view of the fact that physical properties can be further adjusted by adding any other liquid crystal compound.

Second, main characteristics of the component compounds and main effects of the compounds on the characteristics of the composition will be explained. The main characteristics of the component compounds are summarized in Table 2 on the basis of the effects of the invention. In Table 2, the symbol L stands for "large" or "high", the symbol M stands for "medium", and the symbol S stands for "small" or "low." The symbols L, M and S are classified according to a qualitative comparison among the component compounds, and 0 (zero) means that "a value is nearly zero."

TABLE 2

Characteristics of Compounds

| Compounds | Compound (4) | Compound (5) | Compound (6-1) Compound (6-2) Compound (6-3) | Compound (7-1) Compound (7-2) Compound (7-3) Compound (7-4) |
|---|---|---|---|---|
| Maximum Temperature | S-L | S-L | S-L | S-L |
| Viscosity | M | S-M | M-L | M-L |
| Optical Anisotropy | M-L | S-L | M-L | M-L |
| Dielectric Anisotropy | S-L [1] | 0 | M-L [1] | M-L |
| Specific Resistance | L | L | L | M-L |

[1] Value of dielectric anisotropy is negative and the symbol expresses the size of its absolute value.

Main effects of the component compounds on the characteristics of the composition upon mixing the component compounds with the composition are as follows. The compound (4) increases the absolute value of the dielectric anisotropy, and decreases the minimum temperature. The compound (5) decreases the viscosity, or increases the maximum temperature. The compound (6-1), the compound (6-2), the compound (6-3) and the compound (6-4) increase the absolute value of the dielectric anisotropy. The compound (7-1), the compound (7-2), the compound (7-3) and the compound (7-4) increase the optical anisotropy.

Third, a combination of the components in the composition, desirable ratios of the component compounds and the basis thereof will be explained. A combination of the components in the composition is the first, second and third components, the first, second, third and fourth components, the first, second, third, fourth and fifth components, and the first, second, third and fifth components.

A desirable ratio of the first component is 0.05% by weight or more for achieving its effect, and 10% by weight or less for avoiding a poor display based on 100% by weight of the liquid crystal composition excluding the first component. A more desirable ratio is in the range of 0.1% by weight to 2% by weight.

A desirable ratio of the second component is 10% by weight or more for increasing the absolute value of the dielectric anisotropy, and 60% by weight or less for decreasing the minimum temperature. A more desirable ratio is in the range of 10% by weight to 55% by weight. An especially desirable ratio is in the range of 15% by weight to 50% by weight.

A desirable ratio of the third component is 5% by weight or more for decreasing the viscosity or for increasing the maximum temperature, and 50% by weight or less for increasing the absolute value of the dielectric anisotropy. A more desirable ratio is in the range of 10% by weight to 45% by weight. An especially desirable ratio is in the range of 10% by weight to 40% by weight.

A desirable ratio of the fourth component is 5% by weight or more for increasing the absolute value of the dielectric anisotropy, and 50% by weight or less for decreasing the viscosity. A more desirable ratio is in the range of 5% by weight to 45% by weight. An especially desirable ratio is in the range of 5% by weight to 40% by weight.

A desirable ratio of the fifth component is 5% by weight or more for increasing the dielectric anisotropy, and 50% by weight or less for decreasing the viscosity. A more desirable ratio is in the range of 5% by weight to 45% by weight. An especially desirable ratio is in the range of 5% by weight to 40% by weight.

Fourth, a desirable embodiment of the component compounds will be explained.

Desirable G is formula (2) since solubility in a liquid crystal composition is excellent. Desirable G is formula (3) since liquid crystallinity is excellent.

Desirable $R^1$ is alkyl having 1 to 5 carbons, hydrogen, chlorine or fluorine, and especially desirable $R^1$ is hydrogen, methyl, chlorine or fluorine. Desirable $R^2$ is alkyl having 1 to 5 carbons, hydrogen, chlorine or fluorine, and especially desirable $R^2$ is hydrogen or fluorine.

Desirable A is 1,4-cyclohexylene, 1,4-cyclohexenylene, 1,4-phenylene, naphthalene-2,6-diyl, tetrahydropyran-2,5-diyl, 1,3-dioxane-2,5-diyl, pyrimidine-2,5-diyl or pyridine-2,5-diyl, and in these rings, arbitrary hydrogen may be replaced by fluorine. Especially desirable A is 1,4-phenylene, 2-fluoro-1,4-phenylene, 2,3-difluoro-1,4-phenylene, naphthalene-2,6-diyl or 3-fluoro-naphthalene-2,6-diyl.

Desirable X is a single bond —COO— or —O—; n is an integer from 0 to 8. An especially desirable combination of X and n is that X is a single bond and n is 0. Another example of an especially desirable combination of X and n is that X is —O— and n is an integer from 1 to 4. An undesirable combination is that X is —O— and n is 0 in view of stability of the compound. Desirable Z is hydrogen, fluorine, chlorine, methyl or —CF$_3$—. Especially desirable Z is hydrogen or methyl.

Desirable A$^1$ is 1,4-cyclohexylene, 1,4-cyclohexenylene, 1,4-phenylene, naphthalene-2,6-diyl, tetrahydropyran-2,5-diyl, 1,3-dioxane-2,5-diyl, pyrimidine-2,5-diyl or pyridine-2,5-diyl, and in these rings, arbitrary hydrogen may be replaced by fluorine. Especially desirable A$^1$ is 1,4-phenylene, 2-fluoro-1,4-phenylene, 2,3-difluoro-1,4-phenylene, naphthalene-2,6-diyl or 3-fluoro-naphthalene-2,6-diyl. Desirable X$^1$ is a single bond, —COO— or —O—; and n$^1$ is an integer from 0 to 8. An especially desirable combination of X$^1$ and n$^1$ is that X$^1$ is a single bond and n$^1$ is 0. Another example of an especially desirable combination of X$^1$ and n$^1$ is that X$^1$ is —O— and n$^1$ is an integer from 1 to 4. An undesirable combination is that X$^1$ is —O— and n$^1$ is 0 in view of the stability of the compound. Desirable Z$^1$ is hydrogen, fluorine, chlorine, methyl or —CF$_3$. Especially desirable Z$^1$ is hydrogen or methyl.

Desirable R$^3$ or R$^4$ is alkyl having 1 to 5 carbons, hydrogen, chlorine or fluorine. Especially desirable R$^3$ or R$^4$ is methyl or hydrogen. Desirable X$^2$ is a single bond —COO— or —O—; and n$^2$ is an integer from 0 to 8. An especially desirable combination of X$^2$ and n$^2$ is that X$^2$ is a single bond and n$^2$ is 0. Another example of an especially desirable combination of X$^2$ and n$^2$ is that X$^2$ is —O— and n$^2$ is an integer from 1 to 4. An undesirable combination is that X$^2$ is —O— and n$^2$ is 0 in view of the stability of the compounds. Desirable Z$^2$ is hydrogen, fluorine, chlorine, methyl or —CF$_3$—. Especially desirable Z$^2$ is hydrogen or methyl.

R$^{11}$, R$^{12}$, R$^{13}$ and R$^{14}$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine. Desirable R$^{11}$ and R$^{12}$ are each alkyl having 1 to 12 carbons for increasing the stability to ultraviolet light or heat, or alkoxy having 1 to 12 carbons for increasing the absolute value of the dielectric anisotropy. Desirable R$^{13}$ and R$^{14}$ are each alkyl having 1 to 12 carbons for increasing the stability to ultraviolet light or heat, or alkenyl having 2 to 12 carbons for decreasing the minimum temperature.

R$^{15}$ is alkyl having 1 to 12 carbons or alkenyl having 2 to 12 carbons, and in the alkyl and alkenyl, arbitrary hydrogen may be replaced by fluorine, and arbitrary —CH$_2$— may be replaced by —O—. Desirable R$^{15}$ is alkyl having 1 to 12 carbons for increasing the stability to ultraviolet light or heat, or alkenyl having 2 to 12 carbons for decreasing the minimum temperature.

Desirable alkyl is methyl, ethyl, propyl, butyl, pentyl, hexyl, heptyl or octyl. More desirable alkyl is ethyl, propyl, butyl, pentyl or heptyl for decreasing the viscosity.

Desirable alkoxy is methoxy, ethoxy, propoxy, butoxy, pentyloxy, hexyloxy or heptyloxy. More desirable alkoxy is methoxy or ethoxy for decreasing the viscosity.

Desirable alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. More desirable alkenyl is vinyl, 1-propenyl, 3-butenyl or 3-pentenyl for decreasing the viscosity. A desirable configuration of —CH═CH— in the alkenyl depends on the position of the double bond. Trans is preferable in the alkenyl such as 1-propenyl, 1-butenyl, 1-pentenyl, 1-hexenyl, 3-pentenyl and 3-hexenyl for decreasing the viscosity for instance. Cis is preferable in the alkenyl such as 2-butenyl, 2-pentenyl and 2-hexenyl. In the alkenyl, straight-chain alkenyl is preferable to branched-chain alkenyl.

Desirable examples of alkenyl in which arbitrary hydrogen is replaced by fluorine are 2,2-difluorovinyl, 3,3-difluoro-2-propenyl, 4,4-difluoro-3-butenyl, 5,5-difluoro-4-pentenyl and 6,6-difluoro-5-hexenyl. More desirable examples are 2,2-difluorovinyl and 4,4-difluoro-3-butenyl for decreasing the viscosity.

The ring B and the ring F are independently 1,4-cyclohexylene or 1,4-phenylene; and arbitrary two of the ring B are the same or different when k, r or p is 2 or 3, and arbitrary two of the ring F are the same or different when q is 2 or 3. Desirable ring B or ring F is each 1,4-cyclohexylene for decreasing the viscosity.

The ring C and the ring D are independently 1,4-cyclohexylene, 1,4-phenylene, 2-fluoro-1,4-phenylene or 2,5-difluoro-1,4-phenylene, and arbitrary two of the ring C may be the same or different when j is 2 or 3. Desirable ring C or ring D is each 1,4-cyclohexylene for decreasing the viscosity.

The ring E is independently tetrahydropyran-2,5-diyl, 1,4-cyclohexylene, 1,4-phenylene, 2,3-difluoro-1,4-phenylene or 2-fluoro-1,4-phenylene, and arbitrary two of the ring E may be the same or different when t is 2 or 3. Desirable ring E is tetrahydropyran-2,5-diyl for increasing the absolute value of the dielectric anisotropy. The tetrahydropyran-2,5-diyl is

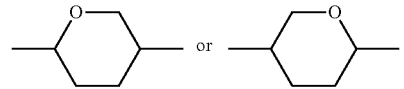

and preferably

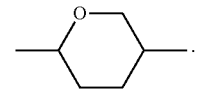

The ring B$^1$, the ring B$^2$, the ring F$^1$ and the ring F$^2$ are independently 1,4-cyclohexylene or 1,4-phenylene. Especially desirable ring B$^1$, ring B$^2$, ring F$^1$ or ring F$^2$ is 1,4-cyclohexylene for decreasing the viscosity.

The ring I$^1$, the ring I$^2$, the ring I$^3$, the ring J$^1$, the ring J$^2$ and the ring J$^3$ are independently 1,4-cyclohexylene, 1,3-dioxane-2,5-diyl, pyrimidine-2,5-diyl, tetrahydropyran-2,5-diyl or 1,4-phenylene in which arbitrary hydrogen may be replaced by fluorine, and two of the ring J$^2$ may be the same or different when u is 2.

Desirable ring I$^1$, ring I$^2$, ring I$^3$, ring J$^1$, ring J$^2$ or ring J$^3$ is 1,4-cyclohexylene for decreasing the viscosity, and 1,4-phenylene in which arbitrary hydrogen may be replaced by fluorine for increasing the dielectric anisotropy.

Z$^{11}$ and Z$^{12}$ are independently a single bond, ethylene, methyleneoxy or carbonyloxy; and arbitrary two of Z$^{11}$ may be the same or different when k, j, r, t or p is 2 or 3, and arbitrary two of Z$^{12}$ may be the same or different when q is 2 or 3. Desirable is each a single bond for decreasing the viscosity, or methyleneoxy for increasing the absolute value of the dielectric anisotropy. Desirable Z$^{12}$ is each a single bond for decreasing the viscosity.

Z$^{13}$ and Z$^{14}$ are independently —(CH$_2$)$_2$—, —(CH$_2$)$_4$—, —COO—, —CF$_2$O—, —CH═CH—, —C≡C—, —CH$_2$O— or a single bond. Desirable Z$^{13}$ or Z$^{14}$ is each a single bond for decreasing the viscosity and —CF$_2$O— for increasing the dielectric anisotropy.

$Z^{15}$ is —(CH$_2$)$_2$—, —COO—, —CF$_2$O—, —C≡C—, —CH$_2$O— or a single bond. Desirable $Z^{15}$ is a single bond for decreasing the viscosity, and —CF$_2$O— for increasing the dielectric anisotropy.

One of $X^{11}$ and $X^{12}$ is fluorine, and the other is chlorine. Desirable $X^{11}$ or $X^{12}$ is that $X^{11}$ is fluorine and $X^{12}$ is chlorine for decreasing the minimum temperature.

$X^{13}$ is hydrogen or methyl, and at least one of the ring E is tetrahydropyran-2,5-diyl, 2,3-difluoro-1,4-phenylene or 2-fluoro-1,4-phenylene when $X^{13}$ is hydrogen. Desirable $X^{13}$ is hydrogen for increasing the absolute value of the dielectric anisotropy.

$X^{14}$ is fluorine, chlorine, —OCF$_3$, —OCHF$_2$, —CF$_3$, —CHF$_2$, —CH$_2$F, —OCF$_2$CHF$_2$ or —OCF$_2$CHFCF$_3$. Desirable $X^{14}$ is fluorine for decreasing the viscosity.

$X^{15}$ is —C≡N or —C≡C—C≡N. Desirable $X^{15}$ is —C≡N for decreasing the viscosity.

$L^1$, $L^2$, $L^3$ and $L^4$ are independently hydrogen or fluorine. Desirable $L^1$, $L^2$, $L^3$ or $L^4$ is fluorine for increasing the dielectric anisotropy.

k, j, r and t are independently 1, 2 or 3. Desirable k is 1 for increasing the absolute value of the dielectric anisotropy. Desirable j is 1 for decreasing the viscosity. Desirable r and t are each 2 for decreasing the minimum temperature.

p and q are independently 0, 1, 2 or 3, and the sum of p and q is 3 or less. Desirable p is 2 for increasing the maximum temperature. Desirable q is 0 for decreasing the minimum temperature.

u is 0, 1 or 2, and v is 0 or 1. Desirable u is 1 for increasing the maximum temperature, and desirable v is 0 for decreasing the viscosity.

Fifth, specific examples of the component compounds will be shown. In the desirable compounds described below, $R^{16}$ is straight-chain alkyl having 1 to 12 carbons or straight-chain alkoxy having 1 to 12 carbons. $R^{17}$ is straight-chain alkyl having 1 to 12 carbons or straight-chain alkenyl having 2 to 12 carbons. $R^{18}$ is straight-chain alkyl having 1 to 12 carbons, straight-chain alkenyl having 2 to 12 carbons or straight-chain alkoxy having 1 to 12 carbons. With regard to the configuration of 1,4-cyclohexylene in these compounds, trans is preferable to cis for increasing the maximum temperature.

Desirable compound (4) is the compound (4-1-1) to the compound (4-7-1). More desirable compound (4) is the compound (4-1-1), the compound (4-3-1), the compound (4-4-1), the compound (4-6-1) and the compound (4-7-1). Especially desirable compound (4) is the compound (4-1-1), the compound (4-4-1) and the compound (4-7-1). Desirable compound (5) is the compound (5-1-1) to the compound (5-13-1). More desirable compound (5) is the compound (5-1-1), the compound (5-3-1), the compound (5-5-1), the compound (5-7-1), the compound (5-9-1), the compound (5-10-1) and the compound (5-13-1). Especially desirable compound (5) is the compound (5-1-1), the compound (5-5-1), the compound (5-7-1) and the compound (5-13-1). Desirable compound (6-1) is the compound (6-1-1-1) to the compound (6-1-3-1). More desirable compound (6-1) is the compound (6-1-2-1). Desirable compound (6-2) is the compound (6-2-1-1) to the compound (6-2-16-1). More desirable compound (6-2) is the compound (6-2-1-1), the compound (6-2-3-1), the compound (6-2-5-1), the compound (6-2-6-1), the compound (6-2-7-1), the compound (6-2-13-1) and the compound (6-2-15-1). Especially desirable compound (6-2) is the compound (6-2-1-1), the compound (6-2-5-1) and the compound (6-2-7-1). Desirable compound (6-3) is the compound (6-3-1-1) to the compound (6-3-1-4), the compound (6-3-2-1) to the compound (6-3-2-2), the compound (6-3-3-1) to the compound (6-3-3-5) and the compound (6-3-4-1) to the compound (6-3-4-2). More desirable compound (6-3) is the compound (6-3-1-1), the compound (6-3-1-3), the compound (6-3-3-1), the compound (6-3-3-3) and the compound (6-3-4-1). Especially desirable compound (6-3) is the compound (6-3-1-3) and the compound (6-3-3-3). Desirable compound (6-4) is the compound (6-4-1).

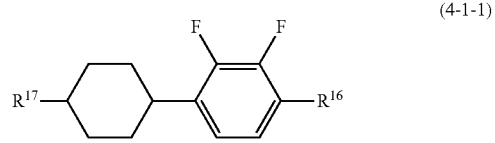

(4-1-1)

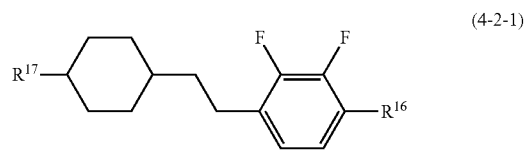

(4-2-1)

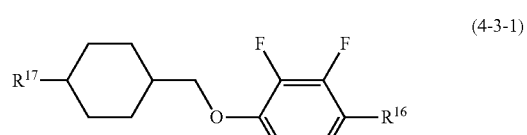

(4-3-1)

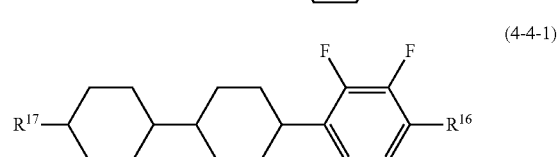

(4-4-1)

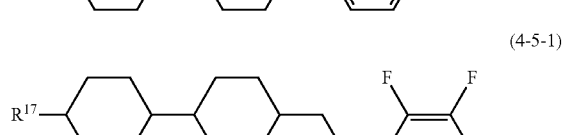

(4-5-1)

(4-6-1)

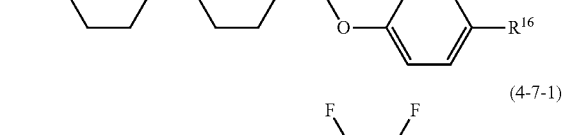

(4-7-1)

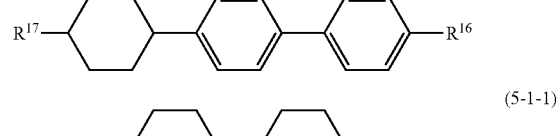

(5-1-1)

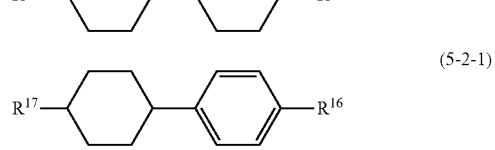

(5-2-1)

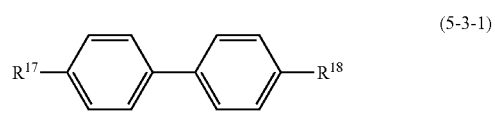

(5-3-1)

(5-4-1) 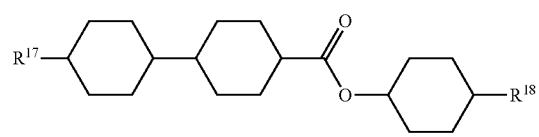
(5-5-1) 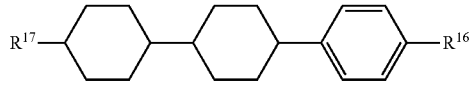
(5-6-1) 
(5-7-1) 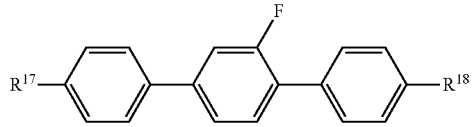
(5-8-1) 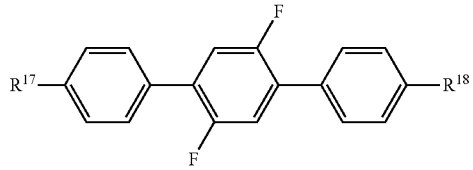
(5-9-1) 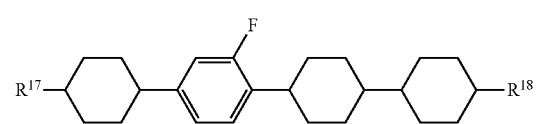
(5-10-1) 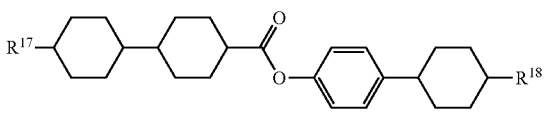
(5-11-1) 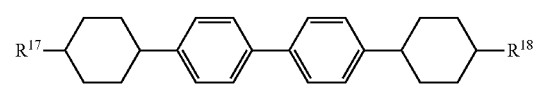
(5-12-1) 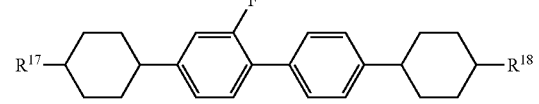
(5-13-1) 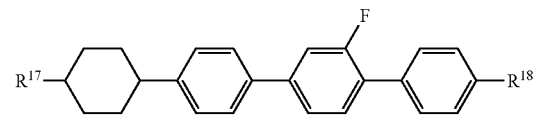
(6-1-1-1) 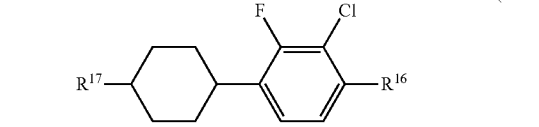
(6-1-2-1) 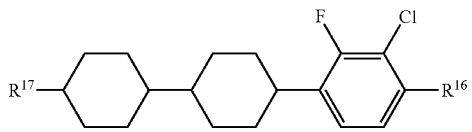
(6-1-3-1) 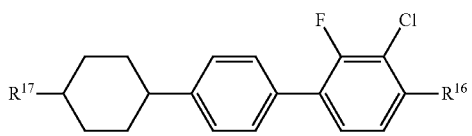
(6-2-1-1) 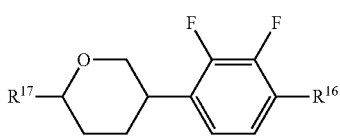
(6-2-2-1) 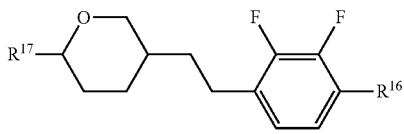
(6-2-3-1) 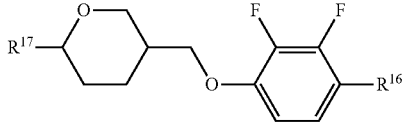
(6-2-4-1) 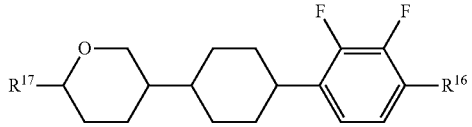
(6-2-5-1) 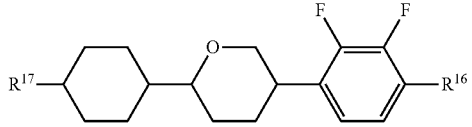
(6-2-6-1) 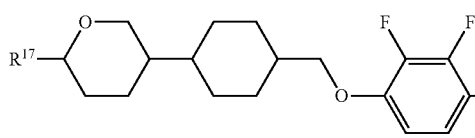
(6-2-7-1) 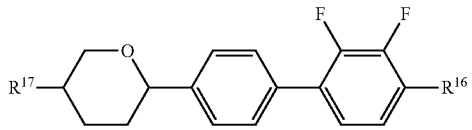
(6-2-8-1) 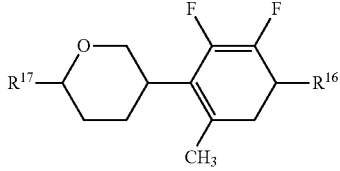

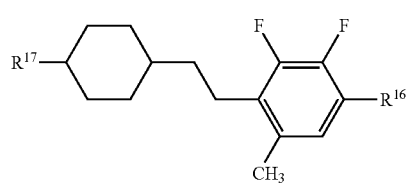
(6-2-9-1)
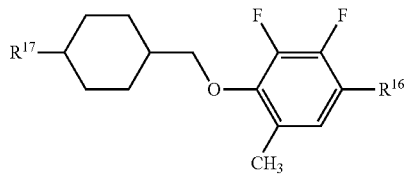
(6-2-10-1)
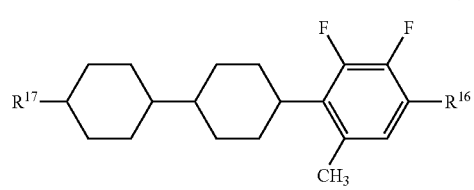
(6-2-11-1)
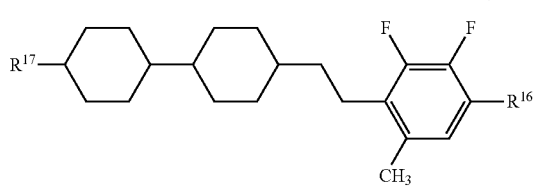
(6-2-12-1)
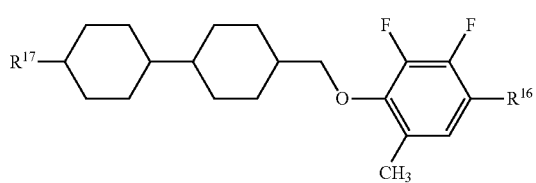
(6-2-13-1)
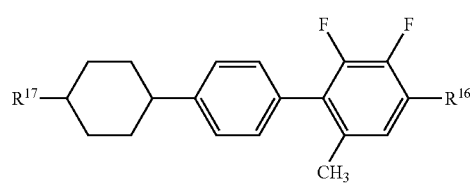
(6-2-14-1)
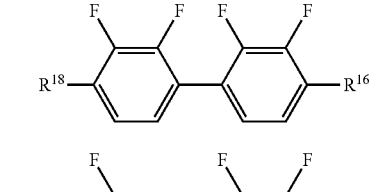
(6-2-15-1)
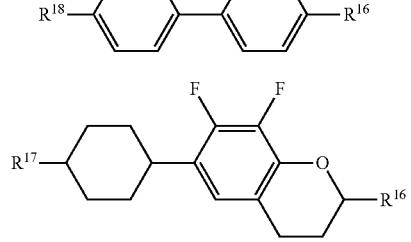
(6-2-16-1)
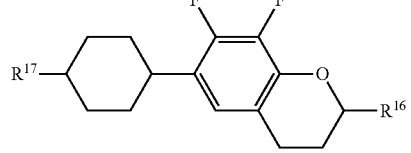
(6-3-1-1)
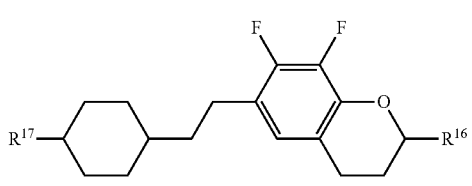
(6-3-1-2)
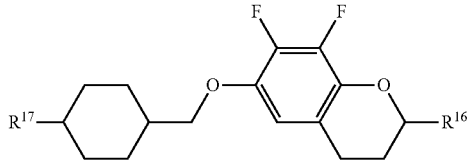
(6-3-1-3)
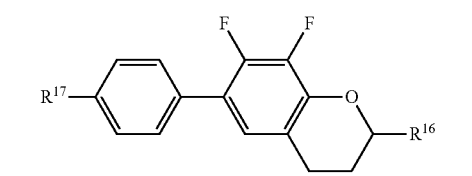
(6-3-1-4)
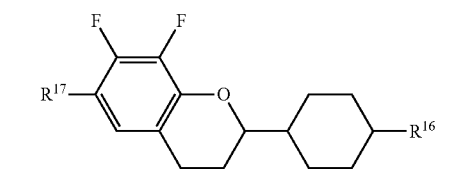
(6-3-2-1)
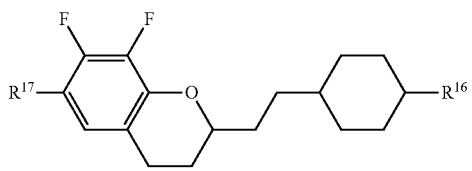
(6-3-2-2)
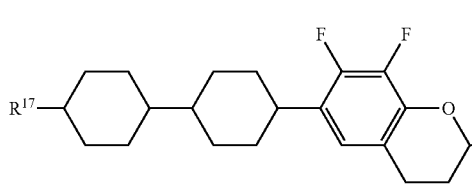
(6-3-3-1)
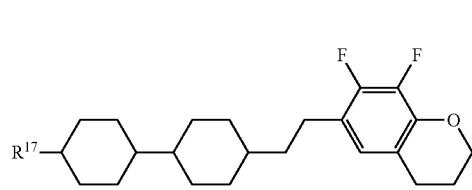
(6-3-3-2)
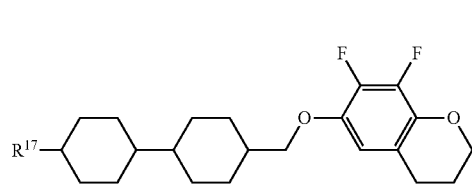
(6-3-3-3)
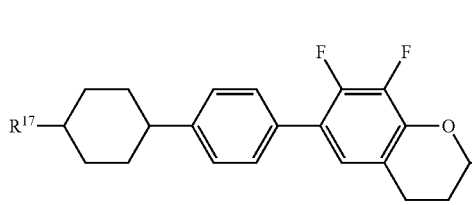
(6-3-3-4)

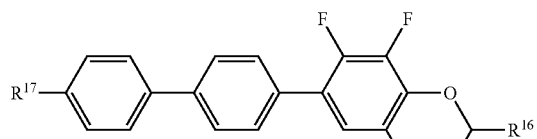
(6-3-3-5)

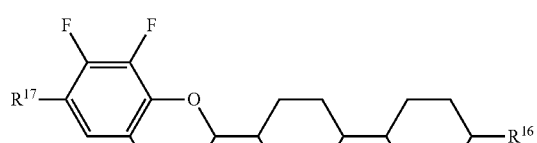
(6-3-4-1)

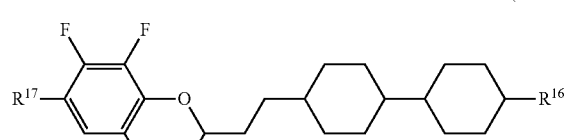
(6-3-4-2)

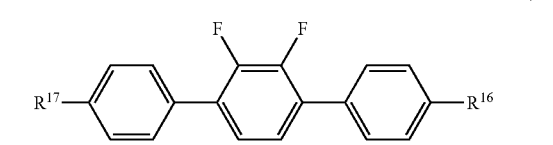
(6-4-1)

Sixth, additives which may be mixed with the composition will be explained. Such additives include an optically active compound, an antioxidant, an ultraviolet light absorber, a coloring matter, an antifoaming agent, a polymerization initiator and a polymerization inhibitor. The optically active compound is mixed with the composition for the purpose of inducing a helical structure and giving a twist angle in liquid crystals. Examples of such compounds include the compound (8-1) to the compound (8-4). A desirable ratio of the optically active compound is 5% by weight or less, and a more desirable ratio is in the range of 0.01% by weight to 2% by weight.

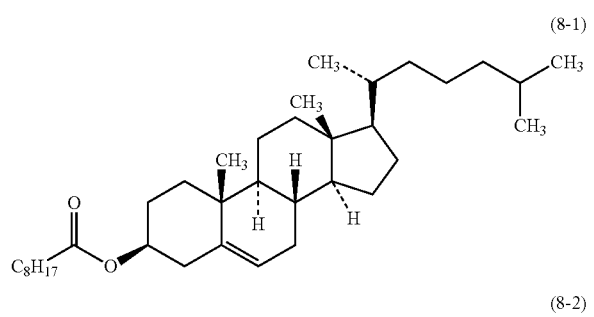
(8-1)

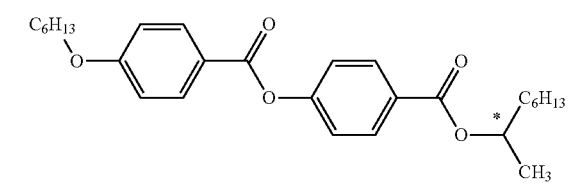
(8-2)

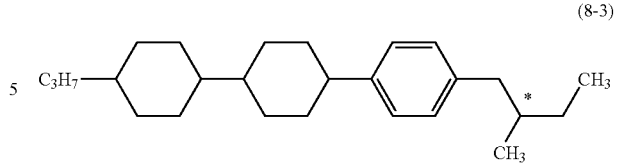
(8-3)

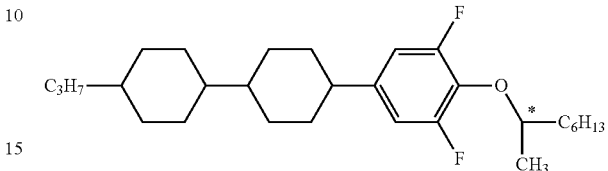
(8-4)

An antioxidant is mixed with the composition in order to prevent a decrease in specific resistance that is caused by heating under air, or to maintain a large voltage holding ratio at room temperature and also at a high temperature after the device has been used for a long time.

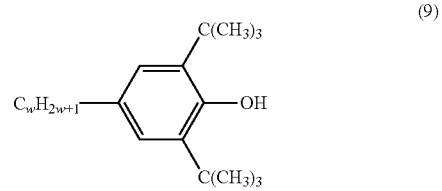
(9)

Desirable examples of the antioxidant include the compound (9) where w is an integer from 1 to 9. In the compound (9), desirable w is 1, 3, 5, 7 or 9. More desirable w is 1 or 7. The compound (9) where w is 1 is effective in preventing a decrease in specific resistance that is caused by heating under air, because it has a large volatility. The compound (9) where w is 7 is effective in maintaining a large voltage holding ratio at room temperature and also at a high temperature even after the device has been used for a long time, because it has a small volatility. A desirable ratio of the antioxidant is 50 ppm or more for achieving its effect, and is 600 ppm or less for avoiding a decrease in the maximum temperature or avoiding an increase in the minimum temperature. A more desirable ratio is in the range of 100 ppm to 300 ppm.

Desirable examples of the ultraviolet light absorber include a benzophenone derivative, a benzoate derivative and a triazole derivative. A light stabilizer such as an amine having steric hindrance is also desirable. A desirable ratio of the ultraviolet light absorber or the light stabilizer is 50 ppm or more for achieving its effect and is 10,000 ppm or less for avoiding a decrease in the maximum temperature or avoiding an increase in the minimum temperature. A more desirable ratio is in the range of 100 ppm to 10,000 ppm.

A dichroic dye such as an azo dye or an anthraquinone dye is mixed with the composition for adjusting to a device having a GH (guest host) mode. A desirable ratio of the coloring matter is in the range of 0.01% by weight to 10% by weight.

An antifoaming agent such as dimethyl silicone oil or methyl phenyl silicone oil is mixed with the composition for preventing foam formation. A desirable ratio of the antifoaming agent is 1 ppm or more for achieving its effect, and is 1,000 ppm or less for avoiding a poor display. A more desirable ratio is in the range of 1 ppm to 500 ppm.

A polymerization initiator is mixed to initiate chain polymerization as a substance required for an easy generation of radicals or ions. For example, a polymerization initiator, Irgacure 651 (registered trademark), Irgacure 184 (registered trademark) or Darocurel 173 (registered trademark) available from Ciba Japan K. K. is suitable for radical polymerization. The polymerization initiator is mixed preferably in the range of 0.1% by weight to 5% by weight, and most preferably in the range of 1% by weight to 3% by weight based on a polymerizable compound.

A monomer is smoothly reacted with radicals formed from a polymerization initiator or a monomer in a radical polymerization system to give stable radicals or neutral compounds, and thus a polymerization inhibitor is mixed for the purpose of termination of the polymerization. The polymerization inhibitor is classified into some types according to its structure. One of them is a radical that itself is stable, such as tri-p-nitrophenylmethyl and di-p-fluorophenylamine and another is a radical that is changed to a stable radical by the reaction with a radical present in a polymerization system, and is exemplified by a compound of nitro, nitroso, amino, polyhydroxy or the like. Examples of the last include hydroquinone and dimethoxybenzene. Desirable ratio of the polymerization inhibitor is 5 ppm or more for achieving its effect, and 1,000 ppm or less for avoiding a poor display. A more desirable ratio is in the range of 5 ppm to 500 ppm.

Seventh, methods for synthesizing the component compounds will be explained. Methods for synthesizing the polymerizable compounds represented by formula (1-2) and formula (1-3) will be explained.

The compound (1-2-a), that is, X' is a single bond, $m^1$ is 0 and $n^1$ is 0 in formula (1-2), is prepared according to the process in Scheme 1.

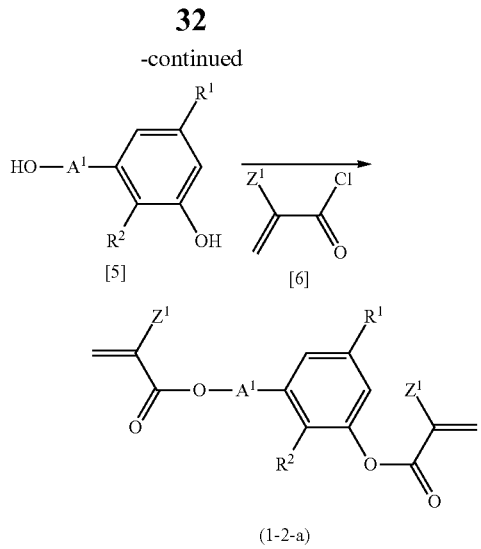

In the formulas, $R^1$, $R^2$, $A^1$ and $Z^1$ have the same meanings as described previously, and J is Cl, Br or I.

The anisole derivative [1] is lithiated with n-butyllithium and then treated with triisopropyl borate to give the corresponding boronic acid [2]. The boronic acid [2] is reacted with the compound [3] in the presence of a palladium catalyst to give the compound [4], according to Suzuki-Miyaura cross coupling. The compound [4] is reacted with boron tribromide to give the corresponding phenol [5]. Last, esterification of the phenol [5] with acrylic acid chloride derivative [6] gives the compound (1-2-a).

The compound (1-2-b), that is, $X^1$ is a single bond, $m^1$ is 1 and $n^1$ is 0 in formula (1-2), is prepared according to the process in Scheme 2.

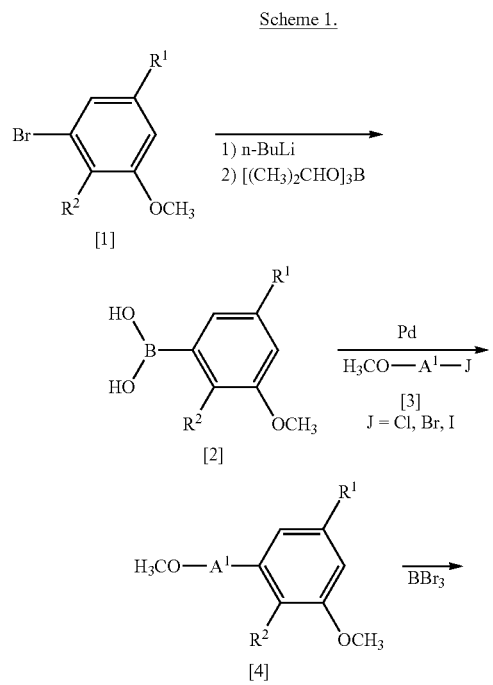

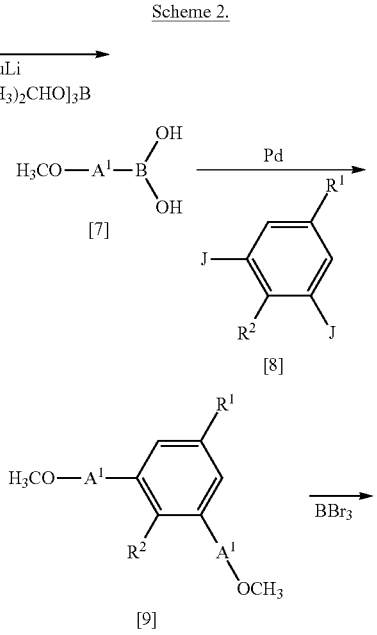

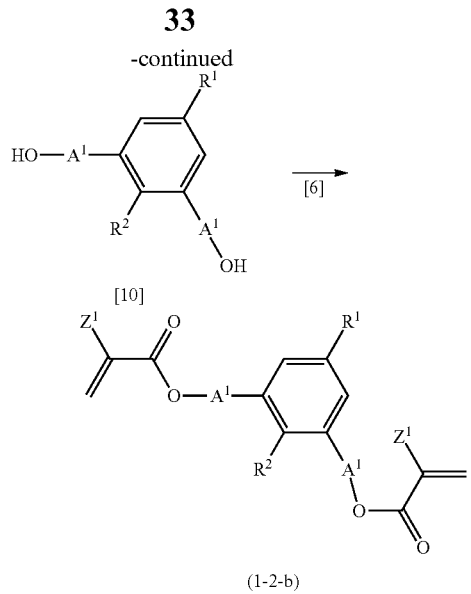

(1-2-b)

In the formulas, $R^1$, $R^2$, $A^1$, $Z^1$ and J have the same meanings as described previously.

The halogenated anisole derivative [3] is lithiated with n-butyllithium, and then reacted with triisopropyl borate to give the corresponding boronic acid [7]. Boronic acid [7] is reacted with the compound [8] in the presence of a palladium catalyst to give the compound [9] according to Suzuki-Miyaura cross-coupling. The compound [9] is reacted with boron tribromide to give the corresponding phenol [10]. Last, esterification of the phenol [10] with acrylic acid chloride derivative [6] gives the compound (1-2-b).

The compound (1-2-c), that is, $X^1$ is —O—, $m^1$ is 1 and $n^1$ is an integer from 1 to 8 in formula (1-2), is prepared according to the process in Scheme 3.

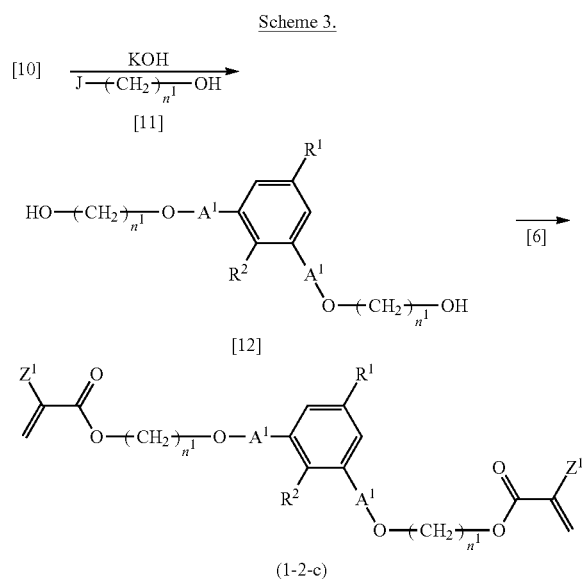

Scheme 3.

(1-2-c)

In the formulas, $R^1$, $R^2$, $A^1$, $Z^1$ and J have the same meanings as described previously.

Esterification of the phenol [10] with the halogenated alcohol having carbons of n1 in the presence of potassium hydroxide gives the diol [12]. Esterification of the resulting [12] with acrylic acid chloride derivative [6] gives the compound (1-2-c).

The compound (1-2-d), that is, $X^1$ is —O—, $m^1$ is 0 and $n^1$ is an integer from 1 to 8 in formula (1-2), is prepared according to the process in Scheme 4.

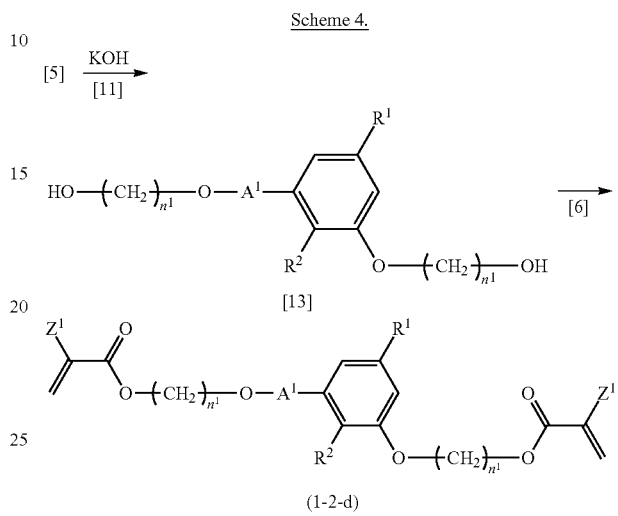

Scheme 4.

(1-2-d)

In the formulas, $R^1$, $R^2$, $A^1$ and $Z^1$ have the same meanings as described previously.

Etherification of the phenol [5] with the halogenated alcohol [11] having carbons of n1 in the presence of potassium hydroxide gives the diol [13]. Esterification of the resulting [13] with acrylic acid chloride derivative [6] gives the compound (1-2-d).

The compound (1-3-a), that is, $X^2$ is a single bond and $n^2$ is an integer of 0 in formula (1-3), is prepared according to the process in Scheme 5.

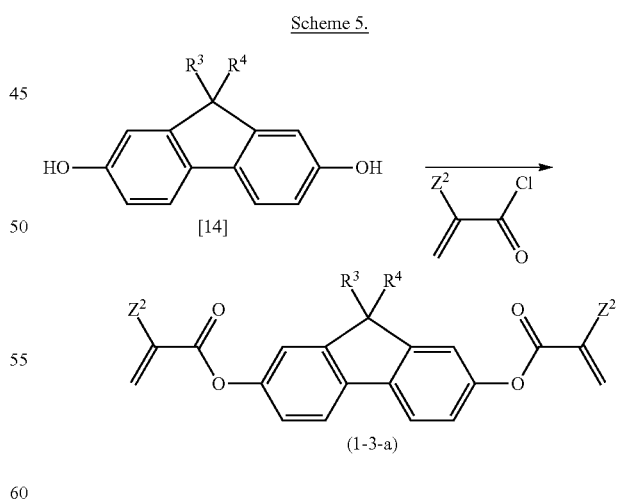

Scheme 5.

(1-3-a)

In the formulas, $R^3$, $R^4$ and $Z^2$ have the same meanings as described previously.

Esterification of the biphenol [14] with acrylic acid chloride derivative [6] gives the compound (1-3-a).

The compound (1-3-b), that is, $X^2$ is —O— and $n^2$ is an integer from 1 to 8 in formula (1-3), is prepared according to the process in Scheme 6.

Scheme 6.

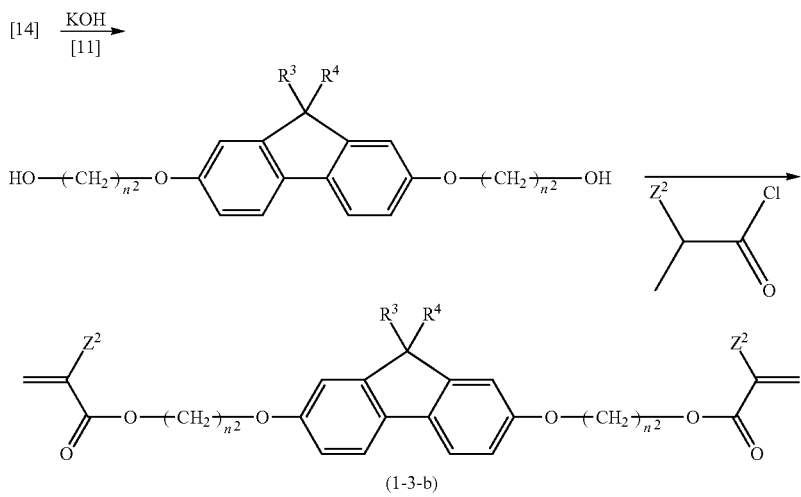

In the formulas, $R^3$, $R^4$ and $Z^2$ have the same meanings as described previously.

Etherification of the phenol [14] with the halogenated alcohol [11] having carbons of n1 in the presence of potassium hydroxide gives the diol [15]. Esterification of the resulting [15] with acrylic acid chloride derivative [6] gives the compound (1-3-b).

The compounds (1-2-1) to (1-2-60) and the compounds (1-3-1) to (1-3-36) are prepared according to the methods described above.

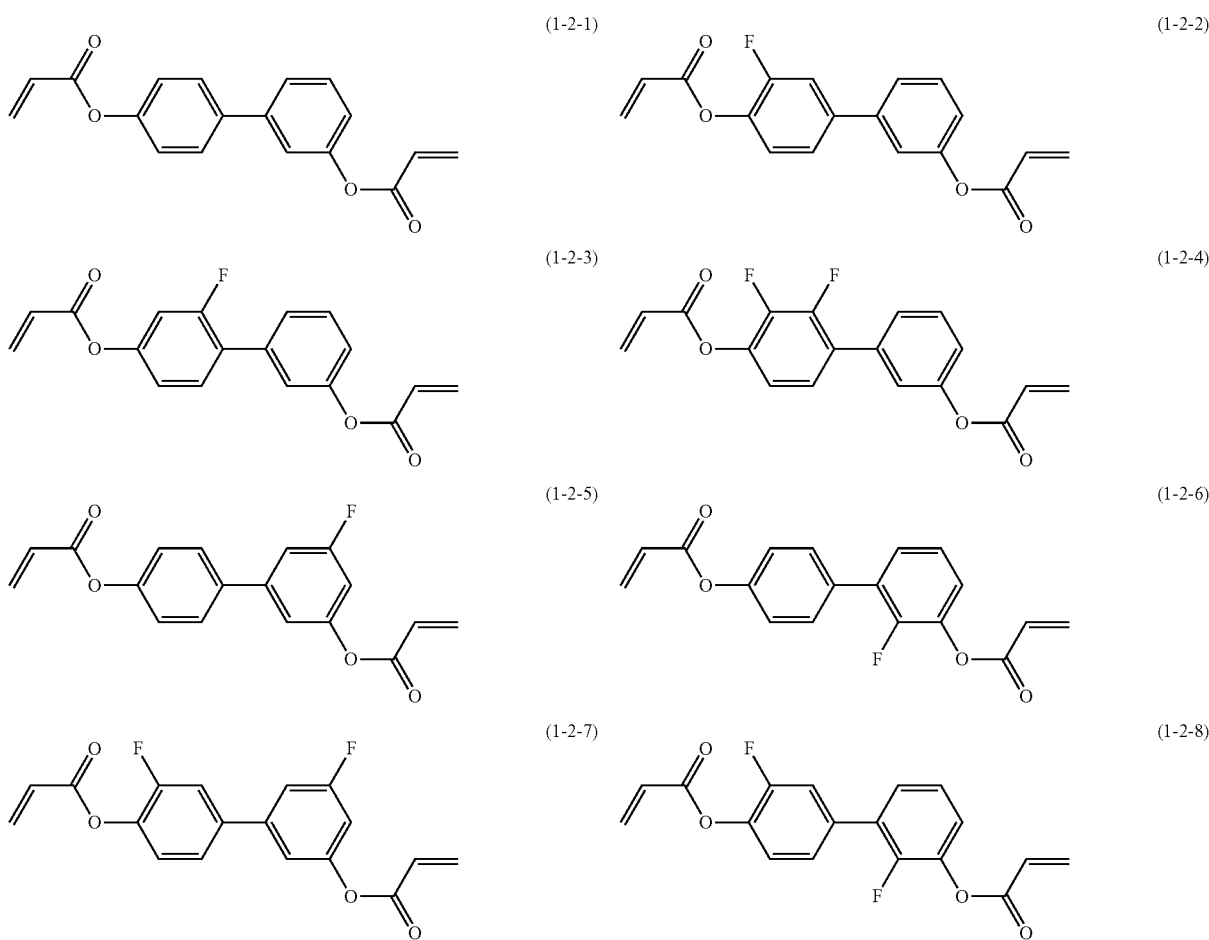

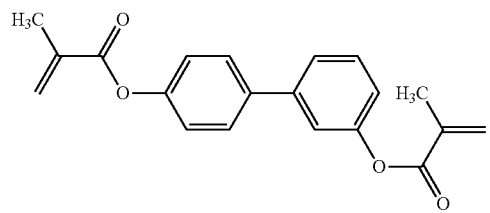
(1-2-9)
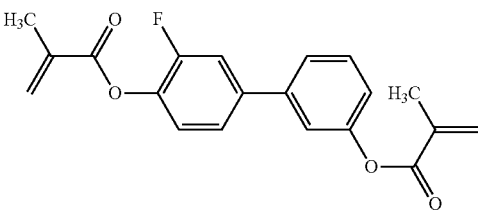
(1-2-10)
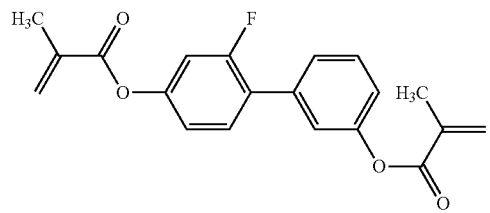
(1-2-11)
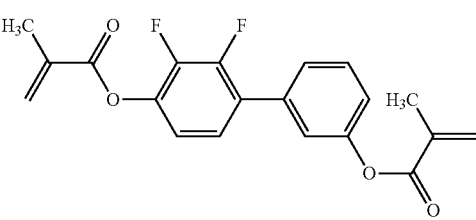
(1-2-12)
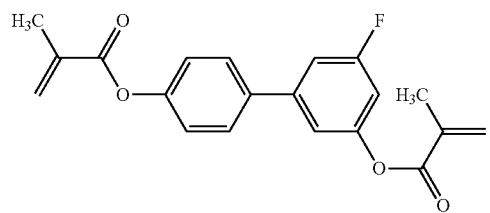
(1-2-13)
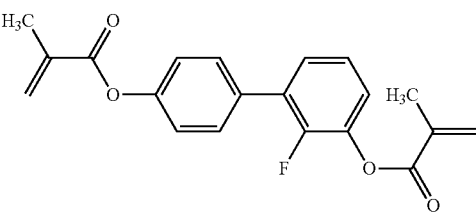
(1-2-14)
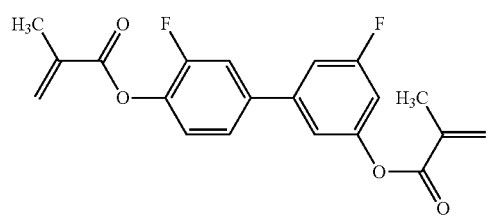
(1-2-15)
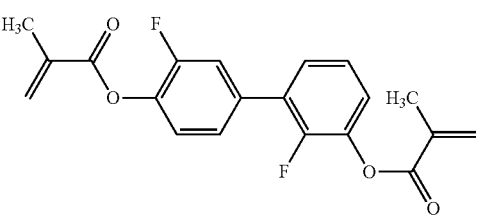
(1-2-16)
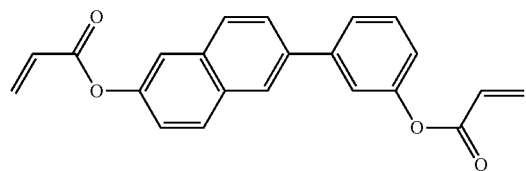
(1-2-17)
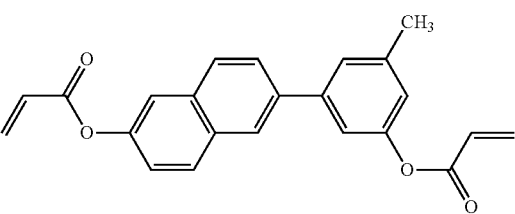
(1-2-18)
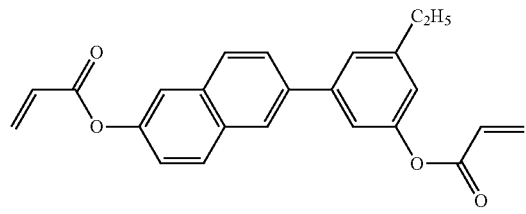
(1-2-19)
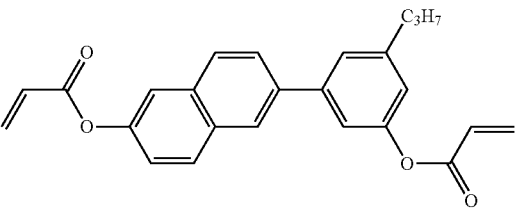
(1-2-20)
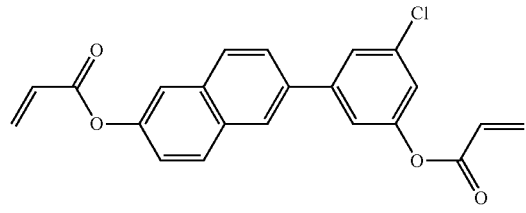
(1-2-21)
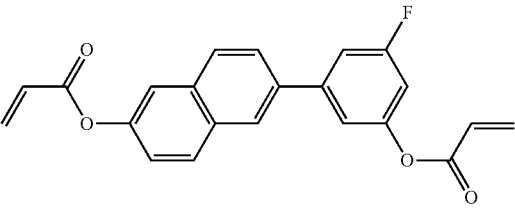
(1-2-22)

-continued
(1-2-23)
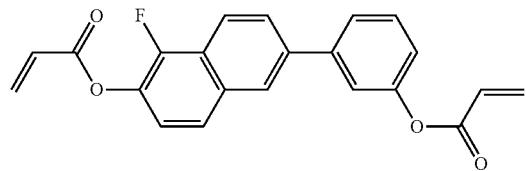
(1-2-24)
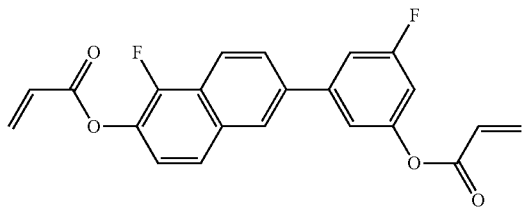
(1-2-25)
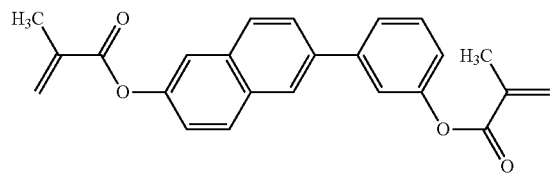
(1-2-26)
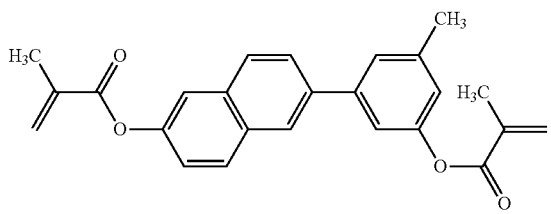
(1-2-27)
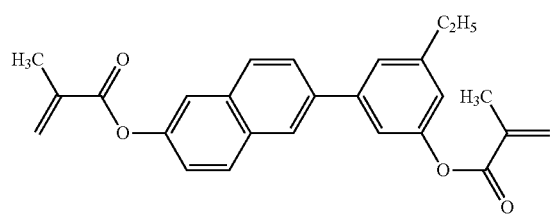
(1-2-28)
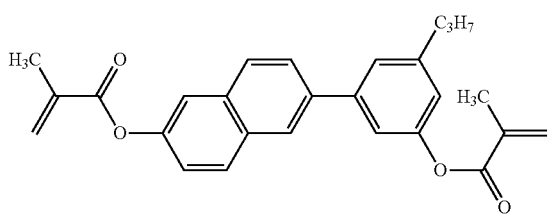
(1-2-29)
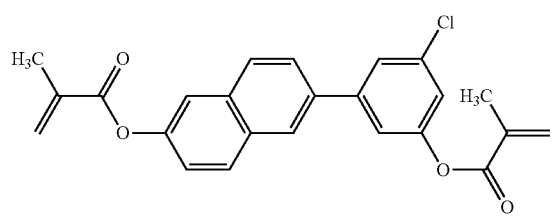
(1-2-30)
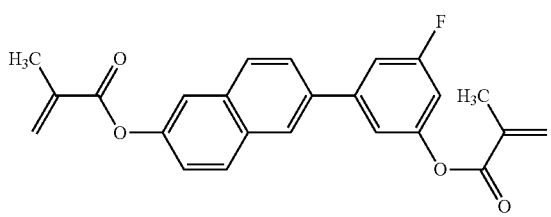
(1-2-31)
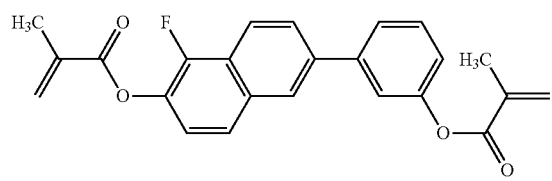
(1-2-32)
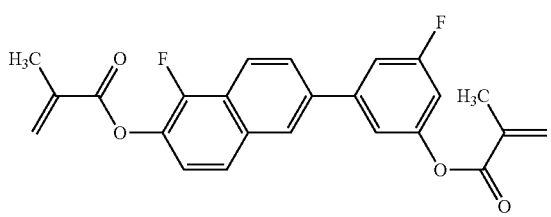
(1-2-33)
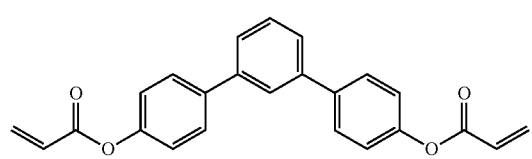
(1-2-34)
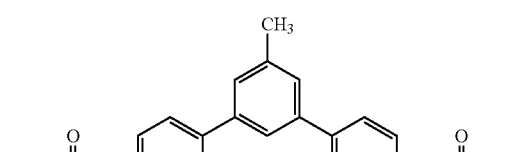
(1-2-35)
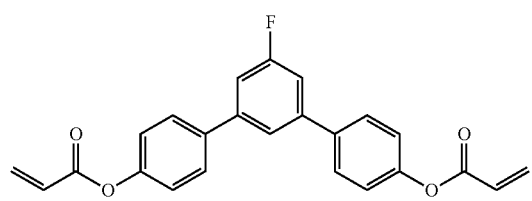
(1-2-36)
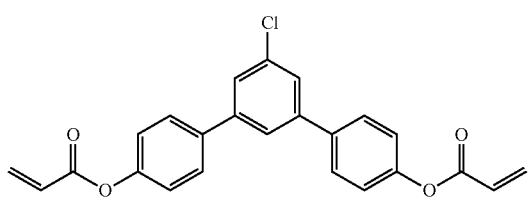

-continued
(1-2-37)
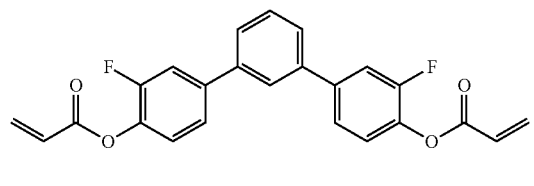
(1-2-38)
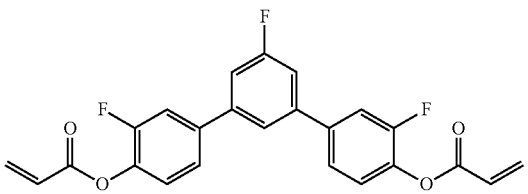
(1-2-39)
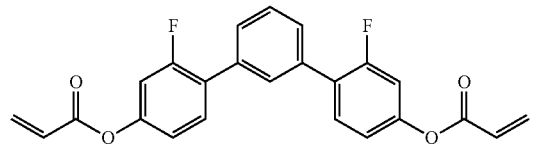
(1-2-40)
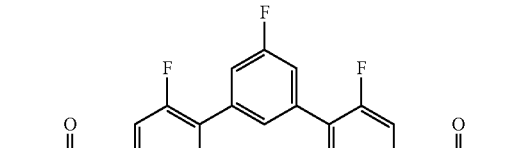
(1-2-41)
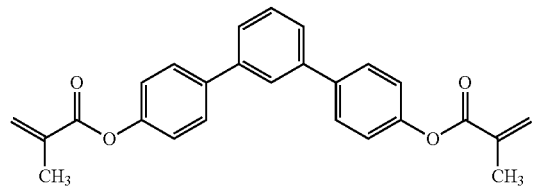
(1-2-42)
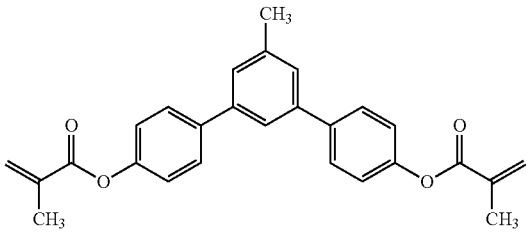
(1-2-43)
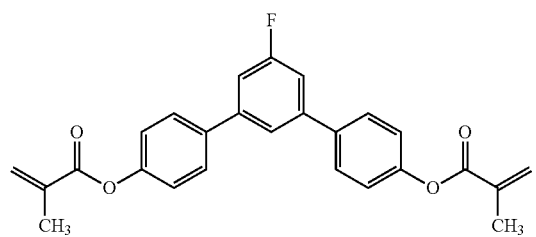
(1-2-44)
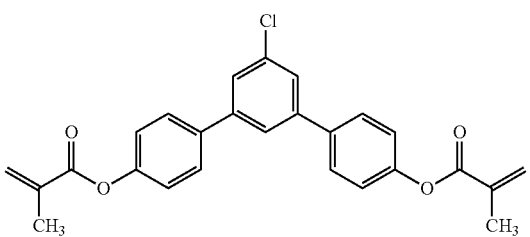
(1-2-45)
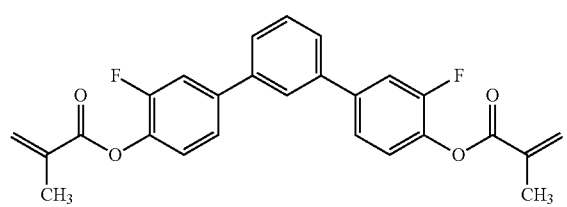
(1-2-46)
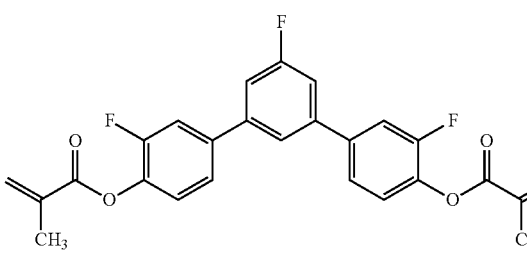
(1-2-47)
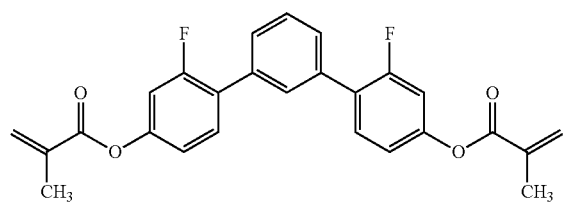
(1-2-48)
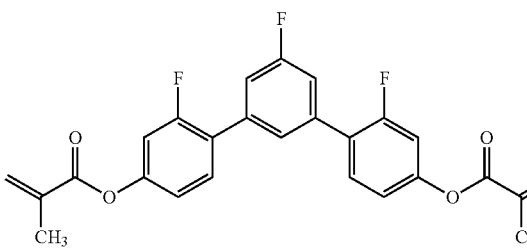

-continued
(1-2-49) 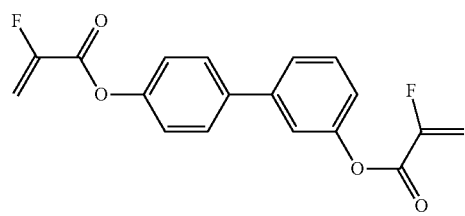
(1-2-50) 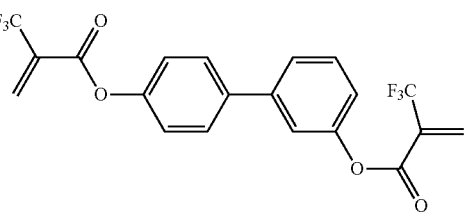
(1-2-51) 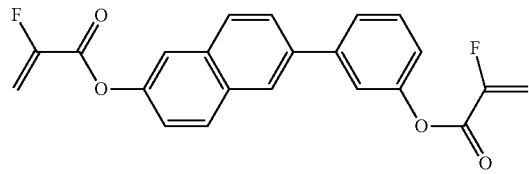
(1-2-52) 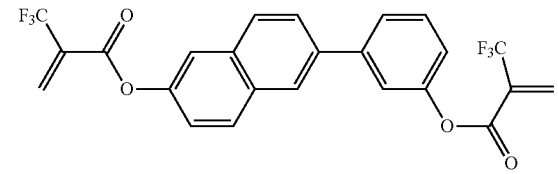
(1-2-53) 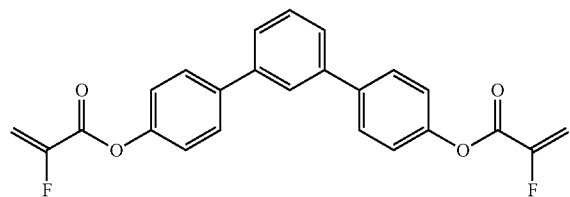
(1-2-54) 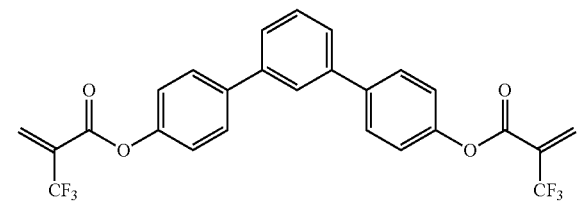
(1-2-55) 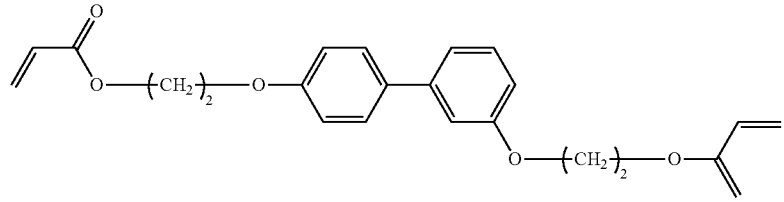
(1-2-56) 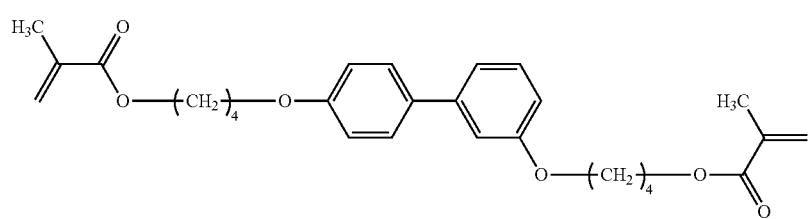
(1-2-57) 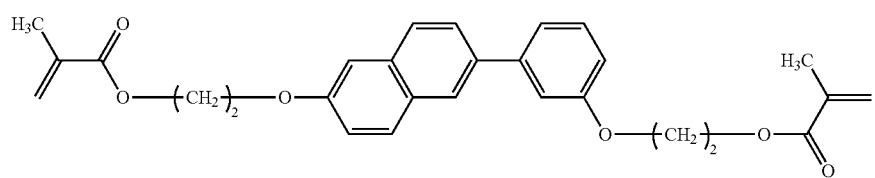
(1-2-58) 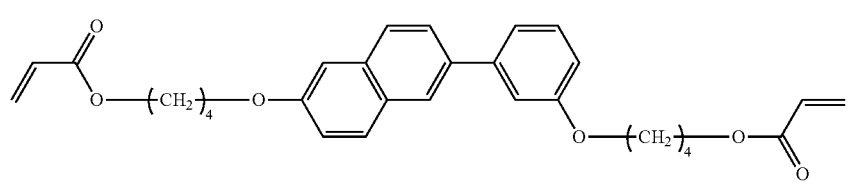

-continued
(1-2-59)
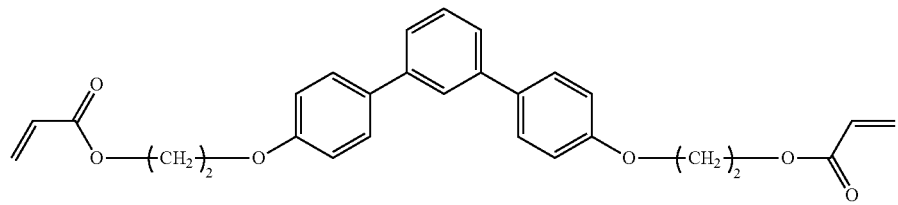
(1-2-60)
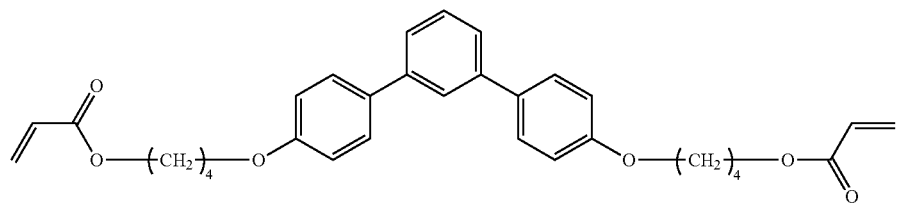
(1-3-1)
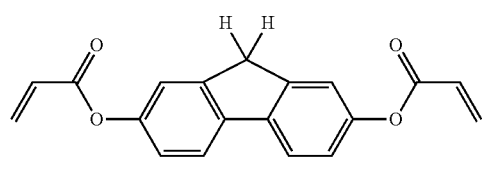
(1-3-2)
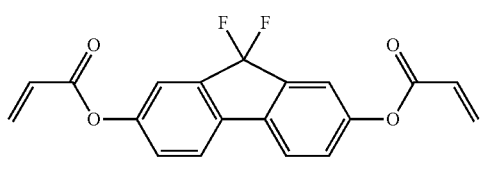
(1-3-3)
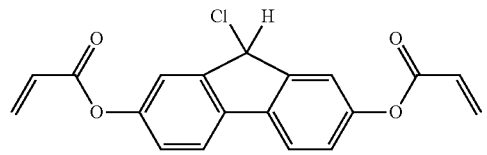
(1-3-4)
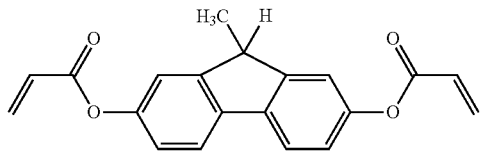
(1-3-5)
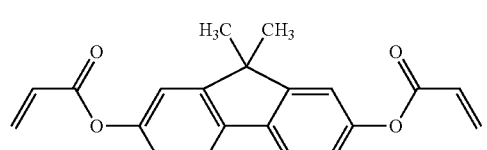
(1-3-6)
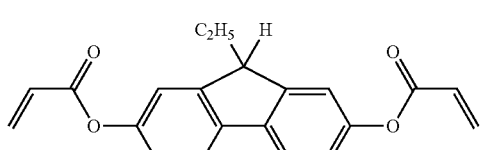
(1-3-7)
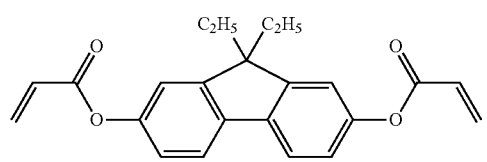
(1-3-8)
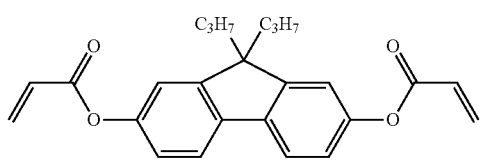
(1-3-9)
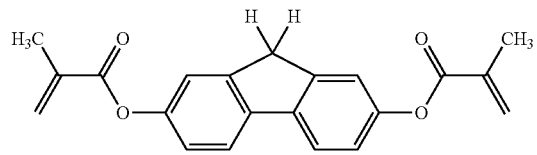
(1-3-10)
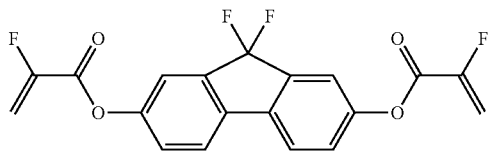
(1-3-11)
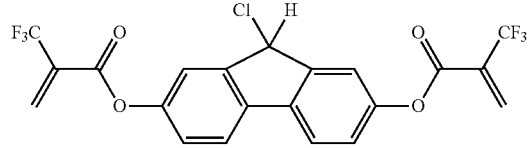
(1-3-12)
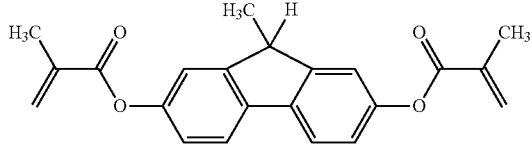
(1-3-13)
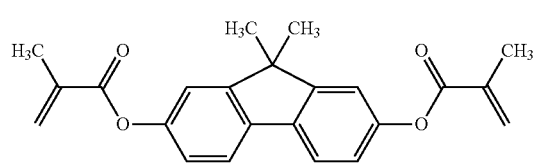
(1-3-14)
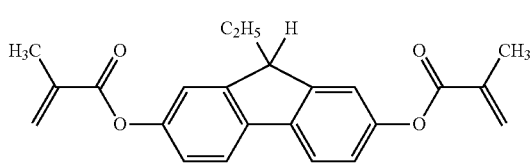

-continued
(1-3-15)
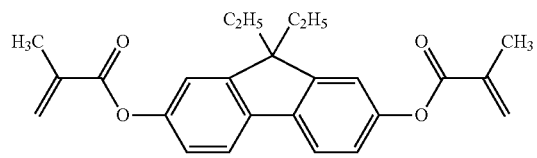
(1-3-16)
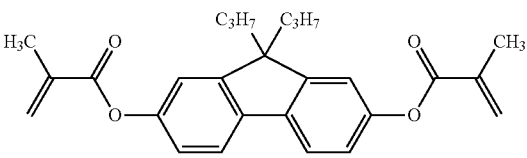
(1-3-17)
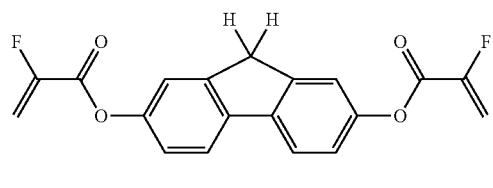
(1-3-18)
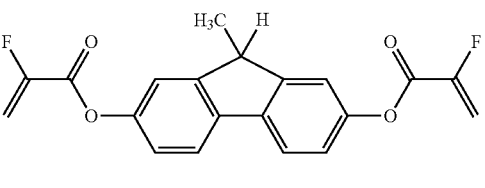
(1-3-19)
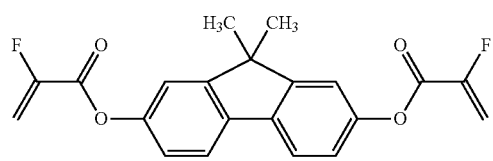
(1-3-20)
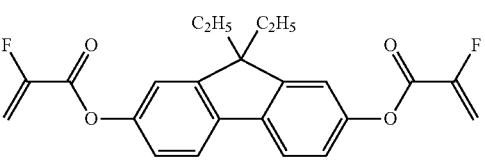
(1-3-21)
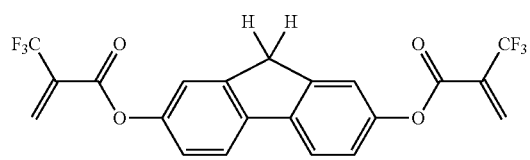
(1-3-22)
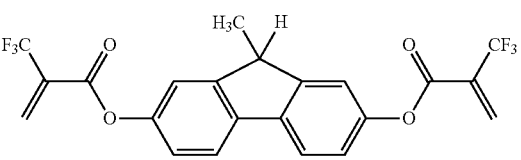
(1-3-23)
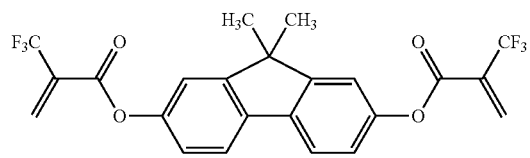
(1-3-24)
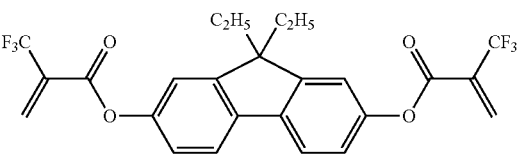
(1-3-25)
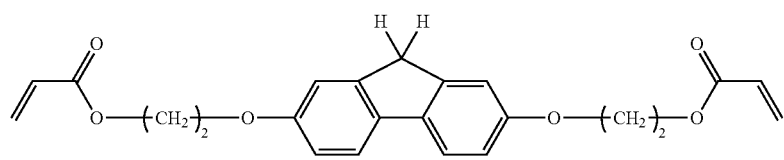
(1-3-26)
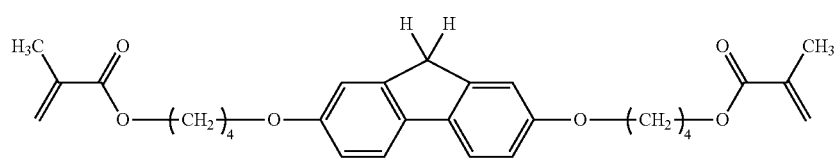
(1-3-27)
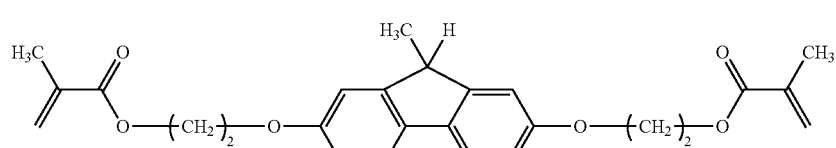
(1-3-28)
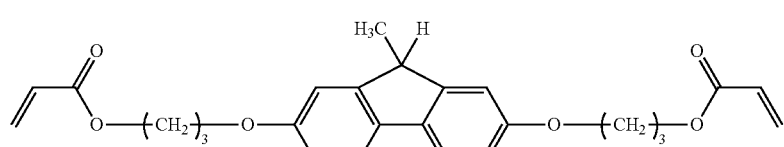

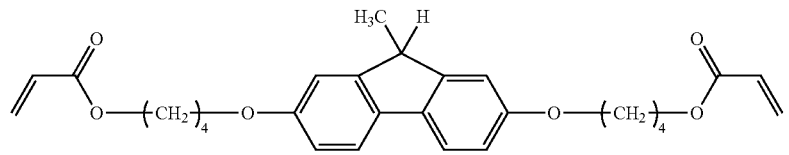

(1-3-29)

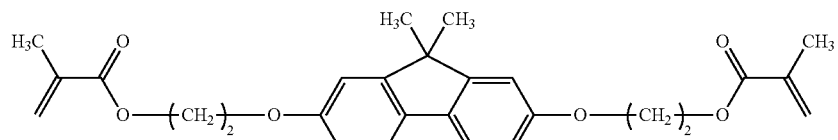

(1-3-30)

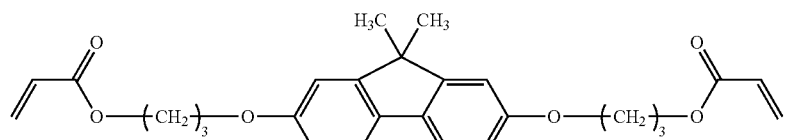

(1-3-31)

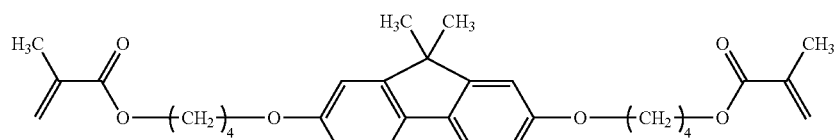

(1-3-32)

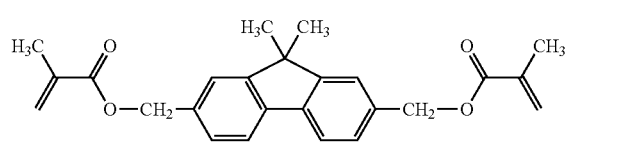

(1-3-33)

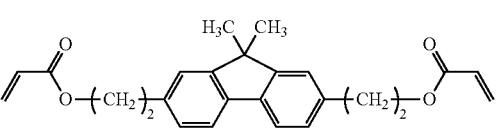

(1-3-34)

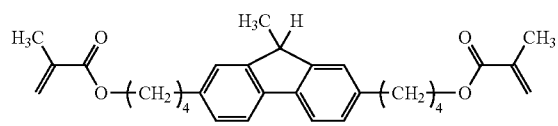

(1-3-35)

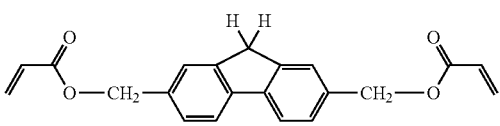

(1-3-36)

Next, methods for synthesizing the component compounds will be explained. These compounds can be prepared by known methods. The synthetic methods will be exemplified as follows. The compound (4-1), the compound (4-2) and the compound (4-4-1) are prepared by the method described in JP H02-503441 A (1990). The compound (5-1-1) and the compound (5-5-1) are prepared by the method described in JP S59-176221 A (1984). The compound (6-3-2-1) is prepared by the method described in JP 2005-035986 A (2005). An antioxidant is commercially available. The compound where w is 1 in formula (9) is available from Sigma-Aldrich Corporation. The compound (9) where w is 7 or the like is synthesized according to the method described in U.S. Pat. No. 3,660,505.

Compounds whose synthetic methods are not described above can be prepared according to the methods described in books such as Organic Syntheses (John Wiley & Sons, Inc.), Organic Reactions (John Wiley & Sons, Inc.), Comprehensive Organic Synthesis (Pergamon Press), New Experimental Chemistry Course (Shin Jikken Kagaku Kouza, in Japanese; Maruzen Co., Ltd.). The composition is prepared according to known methods using the compounds thus obtained. For example, the component compounds are mixed and dissolved in each other by heating.

A voltage is applied to the polymerizable compound, which is included in a liquid crystal composition that is located between substrates contained in a liquid crystal display device, and is polymerized (or crosslinked) in the display device. A desirable polymerization method is thermal polymerization or photopolymerization for example, and preferably photopolymerization. More desirable method is polymerization in the longer wavelength range, in which compounds such as formula (4) to formula (7-4), those of which are components of the liquid crystal composition, do not decompose. One or more polymerization initiators can be added if necessary. Conditions for polymerization and suitable types of the initiator are known to a person skilled in the art, and are described in the literature. The polymerizable compound of the invention is excellent in view of a smooth reaction without any initiator. Accordingly, a poor display caused by the photoinitiator or by its decomposition products remained in the system can be decreased, and a long service life of the product can be attained. The polymerizable compound of the invention may be solely used or may be mixed with another polymerizable compound. Another polymerizable compound that can be mixed includes a commercially available monomer or a well-known monomer, for example a known monofunctional or polyfunctional liquid crystal monomer that is suitable for use in a liquid crystal display device, described in JP 2004-123829 A (2004) or the like.

The liquid crystal display device of the invention has two substrates equipped with a transparent electrode and a alignment film for orienting liquid crystal molecules, where the polymerizable compound is included in the liquid crystal composition that is arranged between these substrates, and the device is produced via a polymerization step of the polymerizable compound while a voltage is applied between opposing transparent electrodes of the substrates.

The liquid crystal display device of the invention corresponds to a conventional structure of a PSA display device such as a device described in prior art cited initially. The device is suitable for a VA mode-display device with protrusion, and especially for a VA device having slit-type electrodes. The structure of a suitable and desirable cell for use in PSA-VA is described in US 2006/66793 for example.

Last, use of the composition will be explained. Most of the compositions have a minimum temperature of −10° C. or lower, a maximum temperature of 70° C. or higher, and an optical anisotropy in the range of 0.07 to 0.20. A device containing this composition has a large voltage holding ratio. The composition is suitable for an AM device. The composition is suitable especially for an AM device having a transmission type. The composition having an optical anisotropy in the range of 0.08 to 0.25 may be prepared by adjusting ratios of the component compounds or by mixing with any other liquid crystal compound. The composition can be used as a composition having a nematic phase, or as an optically active composition by the addition of an optically active compound.

The composition can be used for an AM device. It can also be used for a PM device. The composition can also be used for the AM device and the PM device having a mode such as PC, TN, STN, ECB, OCB, IPS, VA or PSA. It is especially desirable to use the composition for the PSA-AM device. These devices may be of a reflection type, a transmission type or a semi-transmission type. It is desirable to use the composition for a device having the transmission type. It can be used for an amorphous silicon-TFT device or a polycrystal silicon-TFT device.

EXAMPLES

The invention will be explained below in more detail by way of examples. The invention is not limited to the examples. The term "%" means "% by weight," unless otherwise noted.

Compounds obtained by synthesis were identified with proton nuclear magnetic resonance spectroscopy ($^1$H-NMR), high-pressure liquid chromatography (HPLC), ultraviolet-visible spectroscopy (UV/Vis) and so forth. The melting points of the compounds were determined with differential scanning calorimetry (DSC). First, each analytical method will be explained.

$^1$H-NMR Analysis: A model DRX-500 apparatus (made by Bruker BioSpin Corporation) was used for measurement. Samples prepared in the examples and so forth were dissolved in deuterated solvents such as $CDCl_3$ in which the samples were soluble, and the measurement was carried out under the conditions of room temperature, 500 MHz and twenty-four times of accumulation. In the explanation of the resulting nuclear magnetic resonance spectra, the symbols s, d, t, q and m stand for a singlet, a doublet, a triplet, a quartet and a multiplet, respectively. Tetramethylsilane (TMS) was used as the standard reference material for the zero point of the chemical shift (δ values).

HPLC analysis: A measurement apparatus was a Model Prominence LC-20AD with SPD-20A detector made by Shimadzu Corporation. The column was YMC-Pack ODS-A made by YMC Co., Ltd. (length 150 mm, bore 4.6 mm, particle size 5 µm). Eluent was acetonitrile/water (80/20 by volume), and flow rate was adjusted to 1 mL/minute. A detector such as a UV detector, a RI detector and a CORONA detector was properly used. When the UV detector was used, the wavelength for detection was set at 254 nm.

A sample was dissolved in acetonitrile to give a 0.1% by weight solution, and then 1 µL of the resulting solution was injected into the sample injector. A recorder was a Model C-R7A plus made by Shimadzu Corporation. The resulting chromatogram showed the retention time of peaks and the peak areas corresponding to the component compounds.

The ratio of the peak areas in the chromatogram obtained by means of HPLC analysis corresponds to the ratio of component compounds. In general, the percentage by weight of each component compound in an analytical sample is not completely the same as the percentage of each peak area in the analytical sample. In the invention, however, the percentage by weight of the component compound in the analytical sample corresponds substantially to the percentage of the peak area in the analytical sample, because the correction coefficient is essentially 1 (one) when the columns described above are used. This is because there is no significant difference among the correction coefficients of the liquid crystal compounds that are components. An internal standard method using chromatograms is used in order to determine the composition ratio of the liquid crystal compounds in the liquid crystal composition more accurately by means of the chromatograms. The component of liquid crystal compounds (test-component) weighed accurately in a fixed amount and a liquid crystal compound serving as a standard (standard reference material) are analyzed simultaneously by means of gas chromatography, and the relative intensity is calculated in advance from the ratio of the peak area of the test-component to that of the standard reference material. Then, the composition ratio of the liquid crystal compounds in the liquid crystal composition can be determined more accurately by means of the gas-chromatographic analysis using the correction method based on the relative intensity of the peak area of each component to that of the standard reference material.

UV/Vis analysis: Measurement apparatus used was a Model PharmaSpec UV-1700 made by Shimadzu Corporation. The wavelength for detection was set at 190 nm to 700 nm.

A sample was dissolved in acetonitrile to give a 0.01 mmol/L solution, and was measured in a quartz cell (optical path length: 1 cm).

DSC measurement: A sample was heated and then cooled at a rate of 3° C. per minute using a differential scanning calorimeter, a Model DSC-7 System or Diamond DSC System made by PerkinElmer, Inc. The starting point of an endothermic peak or an exothermic peak caused by a phase change of the sample was obtained by means of the extrapolation, and thus the melting point was determined.

Example 1

Preparation of 3,4'-bis(acryloyloxy)biphenyl (1-2-1)

The compound (1-2-1), that is, $R^1$ and $R^2$ are hydrogen, $A^1$ is 1,4-phenylene, $X^1$ is each a single bond, $n^1$ is each 0, $m^1$ is 0, and $Z^1$ is each hydrogen in formula (1-2), was prepared according to the process in Scheme 1 described above.

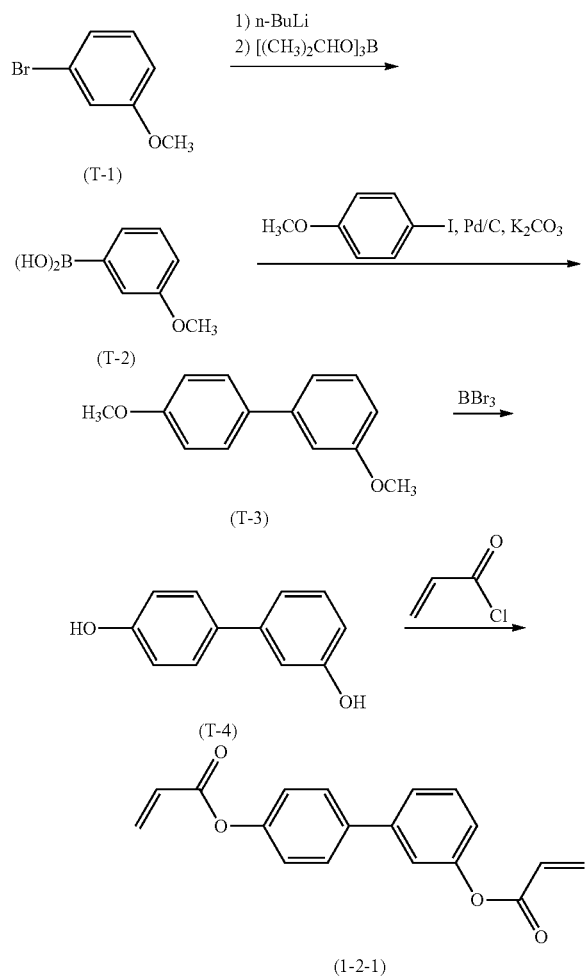

First Step: Preparation of 3-methoxyphenylboronic acid (T-2)

n-Butyllithium in n-hexane (925.0 mL, 1.59 M) was added dropwise to a mixture of THF (1,000 mL) and 1-bromo-3-methoxybenzene (T-1) (250.0 g, 1.34 mol) at −70° C. under an atmosphere of nitrogen. After the addition had been completed, the reaction mixture was stirred at the same temperature for 1 hour. Triisopropyl borate (300.9 g, 1.60 mol) was added dropwise, and then the mixture was warmed slowly to room temperature. The stirring was continued at room temperature for 18 hours, and the reaction mixture was poured into 6M-hydrochloric acid. The mixture was extracted with ethyl acetate (500 mL) four times, and the organic layer was washed with water. After the organic layer had been dried over anhydrous magnesium sulfate, the organic solvent was distilled off under reduced pressure. The residue was sufficiently washed with heptane to leave colorless solids (156.1 g) of 3-methoxyphenylboronic acid (T-2).

Second Step: Preparation of 3,4'-dimethoxybiphenyl (T-3)

A mixture of a mixed solvent (toluene/ethanol/water=1.5/1.5/1; 900 ml), the compound (T-2) (48.6 g, 319.6 mmol), 1-iodo-4-methoxybenzene (68.0 g, 290.6 mmol), 5% palladium on carbon (3.40 g), potassium carbonate (60.2 g, 435.9 mmol) and tetrabutylammonium bromide (23.4 g, 72.7 mmol) was refluxed with stirring for 15 hours under an atmosphere of nitrogen. The resulting reaction mixture was extracted with toluene (400 mL) three times, and the organic layers were washed with water. After the organic layer had been dried over anhydrous magnesium sulfate, the organic solvent was distilled off under reduced pressure. The residue was purified by silica gel chromatography (eluent: toluene), and then by recrystallization from a mixed solvent of heptane, methanol and ethyl acetate to give colorless crystals (57.8 g) of 3,4'-dimethoxybiphenyl (T-3).

Third Step: Preparation of biphenyl-3,4'-diol (T-4)

Boron tribromide (150.0 g, 598.8 mmol) was added dropwise to a mixture of dichloromethane (500 mL) and the compound (T-3) (49.3 g, 230.3 mmol) in an ice bath under an atmosphere of nitrogen, and then the mixture was warmed slowly to room temperature. The stirring was continued at room temperature for 24 hours, and the reaction mixture was poured into water. The mixture was extracted with ethyl acetate (300 mL) three times, and the organic layer was washed with water. After the organic layer had been dried over anhydrous magnesium sulfate, the organic solvent was distilled off under reduced pressure. The residue was purified by silica gel chromatography (eluent: ethyl acetate), and then by recrystallization from a mixed solvent of ethyl acetate and chloroform to give colorless crystals (37.3 g) of biphenyl-3,4'-diol (T-4).

Fourth Step: Preparation of 3,4'-bis(acryloyloxy)biphenyl (1-2-1)

Acryloyl chloride (12.6 g, 139.2 mmol) was added dropwise to a mixture of dichloromethane (100 mL), the compound (T-4) (10.0 g, 53.7 mmol), triethylamine (14.1 g, 139.3 mmol) and 2,6-di-tert-butyl-p-cresol (11.8 mg, 0.0537 mmol) in an ice bath under an atmosphere of nitrogen, and then the mixture was warmed slowly to room temperature. The stirring was continued at room temperature for 16 hours, and the reaction mixture was poured into water. The organic layer was wished with 1M-hydrochloric acid, aqueous 1M-sodium hydroxide solution and water. After the organic layer had been dried over anhydrous magnesium sulfate, the organic solvent was distilled off under reduced pressure. The residue was purified by silica gel chromatography (eluent: toluene/ethyl acetate=95/5 by volume), and then by recrystallization from a mixed solvent of heptane and ethanol to give colorless crystals (9.29 g) of 3,4'-bis(acryloyloxy)biphenyl (1-2-1).

Melting point: 63.6° C.

$^1$H-NMR (CDCl$_3$; δ ppm): 7.61-7.59 (m, 2H), 7.48-7.44 (m, 2H), 7.34-7.33 (m, 1H), 7.23-7.20 (m, 2H), 7.14-7.12 (m, 1H), 6.65 (t, 1H), 6.62 (t, 1H), 6.37 (dd, 1H), 6.33 (dd, 1H), 6.05 (d, 1H) and 6.03 (d, 1H).

Example 2

Preparation of 3,4'-bis(methacryloyloxy)biphenyl (1-2-9)

The compound (1-2-9), that is, $R^1$ and $R^2$ are hydrogen, $A^1$ is 1,4-phenylene, $X^1$ is each a single bond, $n^1$ is each 0, $m^1$ is 0, and $Z^1$ is each methyl in formula (1-2), was prepared according to the process in Scheme 1 described above.

(1-2-9)

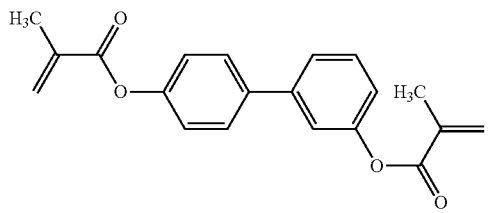

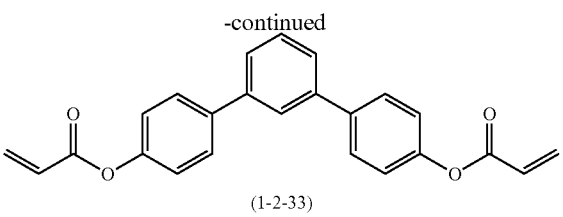

(1-2-33)

The preparation was carried out in the same manner as in Example 1, except that methacryloyl chloride was used instead of acryloyl chloride in the fourth step, and colorless crystals of 3,4'-bis(methacryloyloxy)biphenyl (1-2-9) were obtained.

Melting point: 65.0° C.

$^1$H-NMR (CDCl$_3$; δ ppm): 7.61-7.59 (m, 2H), 7.48-7.44 (m, 2H), 7.33-7.32 (m, 1H), 7.21-7.18 (m, 2H), 7.13-7.10 (m, 1H), 6.39-6.37 (m, 2H), 5.79-5.77 (m, 2H) and 2.08 (dd, 6H).

Example 3

Preparation of 4,4"-bis(acryloyloxy)-(1,1':3',1")-terphenyl (1-2-33)

The compound (1-2-33), that is, $R^1$ and $R^2$ are hydrogen, $A^1$ is each 1,4-phenylene, $X^1$ is each a single bond, $n^1$ is each 0, $m^1$ is 1, and $Z^1$ is each hydrogen in formula (1-2), was prepared according to the process in Scheme 2 described above.

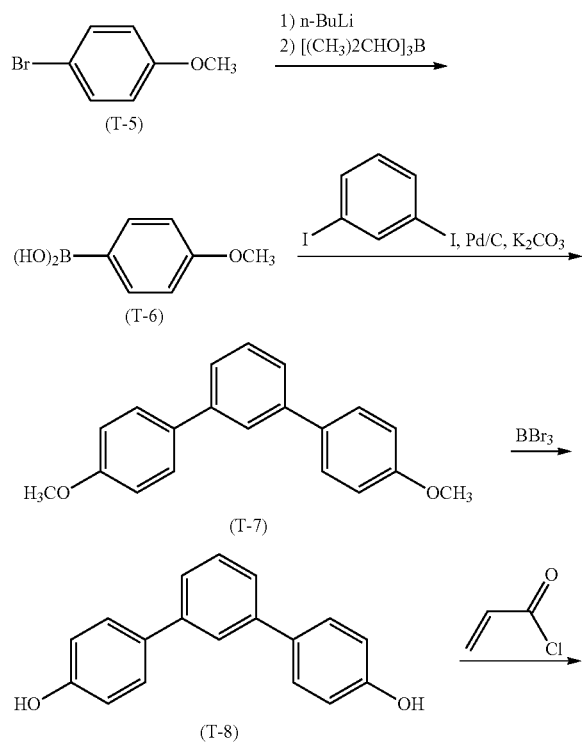

First Step: Preparation of 4-methoxyphenylboronic acid (T-5)

n-Butyllithium in n-hexane (925.0 mL, 1.59 M) was added dropwise to a mixture of THF (1,000 mL) and 1-bromo-4-methoxybenzene (T-5) (250.0 g, 1.34 mol) at −70° C. under an atmosphere of nitrogen. After the addition had been completed, the reaction mixture was stirred at the same temperature for 1 hour. Triisopropyl borate (300.9 g, 1.60 mol) was added dropwise, and then the mixture was warmed slowly to room temperature. The stirring was continued at room temperature for 18 hours, and the reaction mixture was poured into 6M-hydrochloric acid. The mixture was extracted with ethyl acetate (500 mL) four times, and the organic layer was washed with water. After the organic layer had been dried over anhydrous magnesium sulfate, the organic solvent was distilled off under reduced pressure. The residue was sufficiently washed with heptane to leave colorless solids (143.8 g) of 4-methoxyphenylboronic acid (T-6).

Second Step: Preparation of 4,4"-dimethoxy-(1,1':3',1")-terphenyl (T-7)

A mixture of a mixed solvent (toluene/ethanol/water=5/5/1; 1,600 ml), the compound (T-6) (75.9 g, 499.4 mmol), 1,3-diiodobenzene (75.0 g, 227.3 mmol), 5% palladium on carbon (3.75 g), potassium carbonate (94.1 g, 681.0 mmol) and tetrabutylammonium bromide (18.29 g, 56.7 mmol) was refluxed with stirring for 15 hours under an atmosphere of nitrogen. The resulting reaction mixture was cooled to room temperature, and deposits were collected by filtration. The deposits were recrystallized from a mixed solvent of THF and ethyl acetate to give colorless crystals (61.0 g) of 4,4"-dimethoxy-(1,1':3',1")-terphenyl (T-7).

Third Step: Preparation of 4,4"-dihydroxy-(1,1':3',1")-terphenyl (T-8)

Boron tribromide (150.0 g, 598.8 mmol) was added dropwise to a mixture of dichloromethane (1,200 mL) and the compound (T-7) (58.0 g, 199.6 mmol) in an ice bath under an atmosphere of nitrogen, and then the mixture was warmed slowly to room temperature. The stirring was continued at room temperature for 24 hours, and the reaction mixture was poured into water. The mixture was extracted with ethyl acetate (300 mL) three times, and the organic layer was washed with water. After the organic layer had been dried over anhydrous magnesium sulfate, the organic solvent was distilled off under reduced pressure. The residue was purified by silica gel chromatography (eluent: ethyl acetate), and then by recrystallization from a mixed solvent of ethyl acetate and chloroform to give colorless crystals (34.1 g) of 4,4"-dihydroxy-(1,1':3',1")-terphenyl (T-8).

Fourth Step: Preparation of 4,4"-bis(acryloyloxy)-(1,1':3',1")-terphenyl (1-2-33)

Acryloyl chloride (8.97 g, 99.1 mmol) was added dropwise to a mixture of dichloromethane (100 mL), the compound (T-8) (10.0 g, 38.1 mmol), triethylamine (10.0 g, 99.1 mmol) and 2,6-di-tert-butyl-p-cresol (8.4 mg, 0.0381 mmol) in an ice bath under an atmosphere of nitrogen, and then the mixture was warmed slowly to room temperature. The stirring was continued at room temperature for 16 hours, and the reaction mixture was poured into water. The organic layer was wished with 1M-hydrochloric acid, aqueous 1M-sodium hydroxide solution and water. After the organic layer had been dried over anhydrous magnesium sulfate, the organic solvent was distilled off under reduced pressure. The residue was purified by silica gel chromatography (eluent: toluene), and then by recrystallization from a mixed solvent of ethanol and ethyl acetate to give colorless crystals (4.73 g) of 4,4"-bis(acryloyloxy)-(1,1':3',1")-terphenyl (1-2-33).

Melting point: 106.3° C.

$^1$H-NMR (CDCl$_3$; δ ppm): 7.76 (t, 1H), 7.67-7.64 (m, 2H), 7.57 (t, 1H), 7.55 (d, 1H), 7.51 (dd, 1H), 7.25-7.22 (m, 2H), 6.66 (d, 1H), 6.63 (d, 1H), 6.38 (d, 1H), 6.34 (d, 1H), 6.06 (d, 1H) and 6.03 (d, 1H).

Example 4

Preparation of 4,4"-bis(methacryloyloxy)-(1,1':3',1")-terphenyl (1-2-41)

The compound (1-2-41), that is, $R^1$ and $R^2$ are hydrogen, $A^1$ is each 1,4-phenylene, $X^1$ is each a single bond, $n^1$ is each 0, $m^1$ is 1, and $Z^1$ is each methyl in formula (1-2), was prepared according to the process in Scheme 2 described above.

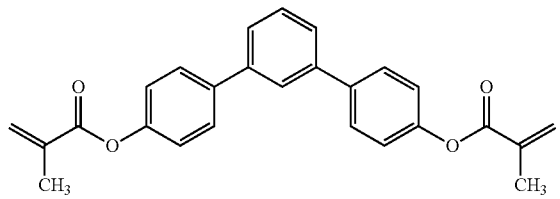

(1-2-41)

The preparation was carried out in the same manner as in Example 3, except that methacryloyl chloride was used instead of acryloyl chloride in the fourth step, and colorless crystals of 4,4"-bis(methacryloyloxy)-(1,1':3',1")-terphenyl (1-2-41) were obtained.

Melting point: 104.1° C.

$^1$H-NMR (CDCl$_3$; δ ppm): 7.76 (t, 1H), 7.67-7.64 (m, 2H), 7.57 (t, 1H), 7.55 (d, 1H), 7.51 (dd, 1H), 7.23-7.21 (m, 2H), 6.39-6.38 (m, 2H), 5.79-7.78 (m, 2H) and 2.09 (t, 6H).

Example 5

Preparation of 2-acryloyloxy-6-(3-acryloyloxyphenyl)naphthalene (1-2-17)

The compound (1-2-17), that is, $R^1$ and $R^2$ are hydrogen, $A^1$ is naphthalene-2,6-diyl, $X^1$ is each a single bond, $n^1$ is each 0, $m^1$ is 0, and $Z^1$ is each hydrogen in formula (1-2), was prepared according to the process in Scheme 1 described above.

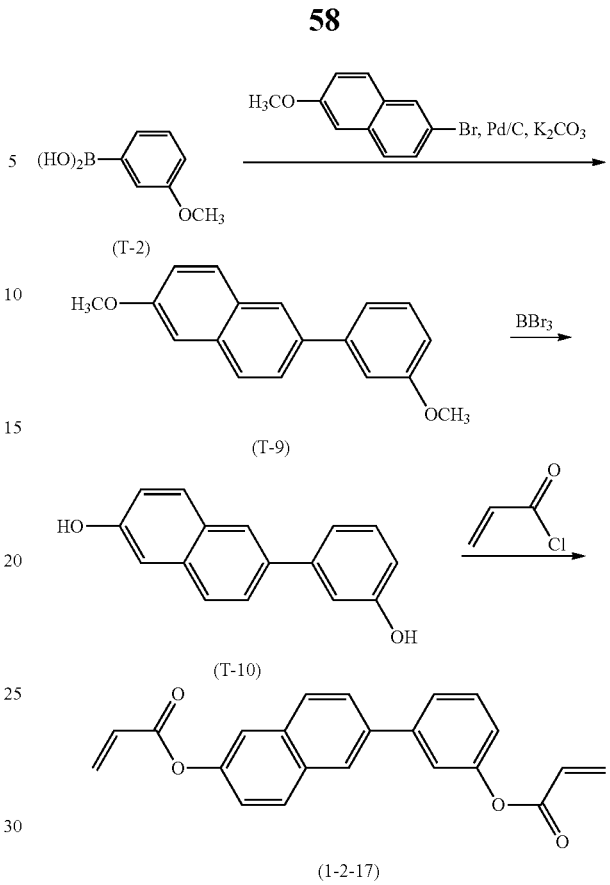

First Step: Preparation of 2-methoxy-6-(3-methoxyphenyl)naphthalene (T-9)

A mixture of a mixed solvent (toluene/ethanol/water=2.5/2.5/1; 500 ml), the compound (T-2) (48.6 g, 319.6 mmol), 2-bromo-6-methoxynaphthalene (42.9 g, 181.0 mmol), 5% palladium on carbon (2.15 g), potassium carbonate (37.5 g, 271.5 mmol) and tetrabutylammonium bromide (14.6 g, 45.3 mmol) was refluxed with stirring for 15 hours under an atmosphere of nitrogen. The resulting reaction mixture was extracted with toluene (300 mL) three times, and the organic layer was washed with water. After the organic layer had been dried over anhydrous magnesium sulfate, the organic solvent was distilled off under reduced pressure. The residue was purified by silica gel chromatography (eluent: toluene), and then by recrystallization from a mixed solvent of heptane, methanol and ethyl acetate to give colorless crystals (45.0 g) of 2-methoxy-6-(3-methoxyphenyl)naphthalene (T-9).

Second Step: Preparation of 6-(3-hydroxyphenyl)-2-naphthol (T-10)

Boron tribromide (125.0 g, 499.0 mmol) was added dropwise to a mixture of dichloromethane (500 mL) and the compound (T-9) (50.7 g, 191.9 mmol) in an ice bath under an atmosphere of nitrogen, and then the mixture was warmed slowly to room temperature. The stirring was continued at room temperature for 24 hours, and the reaction mixture was poured into water. The mixture was extracted with ethyl acetate (300 mL) three times, and the organic layer was washed with water. After the organic layer had been dried over anhydrous magnesium sulfate, the organic solvent was distilled off under reduced pressure. The residue was purified by silica gel chromatography (eluent: ethyl acetate), and then by recrystallization from a mixed solvent of ethyl acetate and chloroform to give colorless crystals (39.9 g) of 6-(3-hydroxyphenyl)-2-naphthol (T-10).

Third Step: Preparation of 2-acryloyloxy-6-(3-acryloyloxyphenyl)naphthalene (1-2-17)

Acryloyl chloride (9.96 g, 110.0 mmol) was added dropwise to a mixture of dichloromethane (100 mL), the compound (T-10) (10.0 g, 42.3 mmol), triethylamine (11.1 g, 110.1 mmol) and 2,6-di-tert-butyl-p-cresol (9.4 mg, 0.0427 mmol) in an ice bath under an atmosphere of nitrogen, and then the mixture was warmed slowly to room temperature. The stirring was continued at room temperature for 16 hours, and the reaction mixture was poured into water. The organic layer was wished with 1M-hydrochloric acid, aqueous 1M-sodium hydroxide solution and water. After the organic layer had been dried over anhydrous magnesium sulfate, the organic solvent was distilled off under reduced pressure. The residue was purified by silica gel chromatography (eluent: toluene), and then by recrystallization from a mixed solvent of ethanol, ethyl acetate and dichloromethane to give colorless crystals (5.85 g) of 2-acryloyloxy-6-(3-acryloyloxyphenyl)naphthalene (1-2-17).

Melting point: 75.4° C.

$^1$H-NMR (CDCl$_3$; δ ppm): 8.04 (d, 1H), 7.91 (d, 1H), 7.88 (d, 1H), 7.74 (dd, 1H), 7.64 (d, 1H), 7.60-7.58 (m, 1H), 7.50 (t, 1H), 7.48 (t, 1H), 7.30 (dd, 1H), 7.16 (ddd, 1H), 6.68 (dd, 1H), 6.42 (dd, 1H), 6.42-6.34 (m, 2H), 6.06 (dd, 1H) and 6.04 (dd, 1H).

Example 6

Preparation of 2-methacryloyloxy-6-(3-methacryloyloxyphenyl)naphthalene (1-2-25)

The compound (1-2-25), that is, R$^1$ and R$^2$ are hydrogen, A$^1$ is naphthalene-2,6-diyl, X$^1$ is each a single bond, n$^1$ is each 0, m$^1$ is 0, and Z$^1$ is each methyl in formula (1-2), was prepared according to the process in Scheme 1 described above.

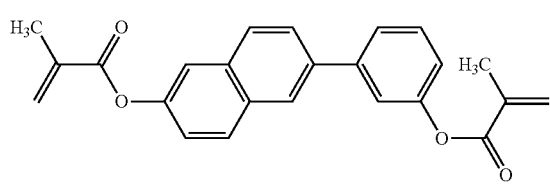

(1-2-25)

The preparation was carried out in the same manner as in Example 5, except that methacryloyl chloride was used instead of acryloyl chloride in the third step, and colorless crystals of 2-methacryloyloxy-6-(3-methacryloyloxyphenyl)naphthalene (1-2-25) were obtained.

Melting point: 87.4° C.

$^1$H-NMR (CDCl$_3$; δ ppm): 8.05 (d, 1H), 7.91 (d, 1H), 7.87 (d, 1H), 7.75 (dd, 1H), 7.62 (d, 1H), 7.60-7.58 (m, 1H), 7.50 (t, 1H), 7.48 (t, 1H), 7.30 (dd, 1H), 7.15 (ddd, 1H), 6.42-6.41 (m, 1H), 6.41-6.40 (m, 1H), 5.81-5.79 (m, 2H), 2.11 (t, 3H) and 2.10 (t, 3H).

Example 7

Preparation of 2,7-bis(acryloyloxy)-9-methylfluorene (1-3-4)

The compound (1-3-4), that is, R$^3$ is methyl, R$^4$ is hydrogen, X$^2$ is each a single bond, n$^2$ is each 0, and Z$^2$ is each hydrogen in formula (1-3), was prepared according to the process in Scheme 5 described above.

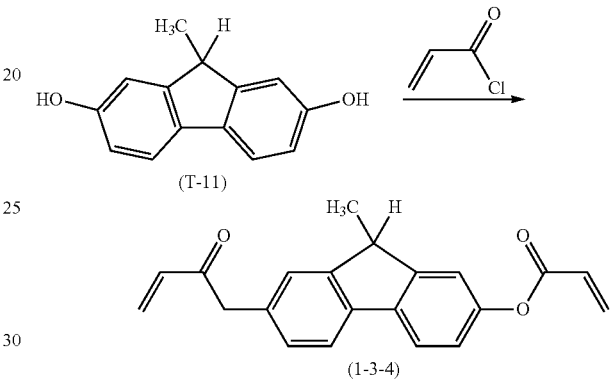

(T-11)

(1-3-4)

Acryloyl chloride (55.4 g, 612.1 mmol) was added dropwise to a mixture of dichloromethane (500 mL), 2,7-dihydroxy-9-methylfluorene (T-11) (50.0 g, 235.6 mmol), triethylamine (61.7 g, 609.7 mmol) and 2,6-di-tert-butyl-p-cresol (52.0 mg, 0.24 mmol) in an ice bath under an atmosphere of nitrogen, and then the mixture was warmed slowly to room temperature. The stirring was continued at room temperature for 16 hours, and the reaction mixture was poured into water. The organic layer was wished with 1M-hydrochloric acid, aqueous 1M-sodium hydroxide solution and water. After the organic layer had been dried over anhydrous magnesium sulfate, the organic solvent was distilled off under reduced pressure. The residue was purified by silica gel chromatography (eluent: toluene), and then by recrystallization from a mixed solvent of dichloromethane and ethanol to give colorless crystals (34.2 g) of 2,7-bis(acryloyloxy)-9-methylfluorene (1-3-4).

Melting point: 137.6° C.

$^1$H-NMR (CDCl$_3$; δ ppm): 7.71 (d, 2H), 7.28 (d, 2H), 7.13 (dd, 2H), 6.64 (dd, 2H), 6.36 (dd, 2H), 6.04 (dd, 2H), 3.97 (q, 1H) and 1.52 (d, 3H).

Example 8

Preparation of 2,7-bis(methacryloyloxy)-9-methylfluorene (1-3-12)

The compound (1-3-12), that is, R$^3$ is methyl, R$^4$ is hydrogen, X$^2$ is each a single bond, n$^2$ is each 0, and Z$^2$ is each methyl in formula (1-3), was prepared according to the process in Scheme 5 described above.

(1-3-12)

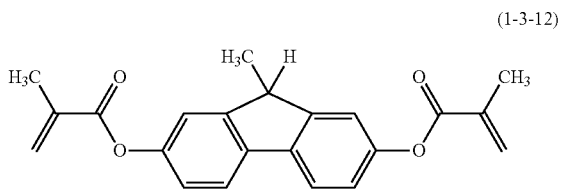 [SMILES: C=C(C)C(=O)Oc1ccc2c(c1)C(C)c1cc(OC(=O)C(=C)C)ccc1-2]

The preparation was carried out in the same manner as in Example 7, except that methacryloyl chloride was used instead of acryloyl chloride, and colorless crystals of 2,7-bis(methacryloyloxy)-9-methylfluorene (1-3-12) were obtained.

Melting point: 127.2° C.

$^1$H-NMR (CDCl$_3$; δ ppm): 7.71 (d, 2H), 7.27 (d, 2H), 7.12 (dd, 2H), 3.96 (q, 1H), 6.38 (s, 2H), 5.78 (t, 2H), 2.09 (s, 6H) and 1.52 (d, 3H).

Example 9

Preparation of 2,7-bis(acryloyloxy)-9,9-dimethylfluorene (1-3-5)

The compound (1-3-5), that is, R$^3$ and R$^4$ are methyl, X$^2$ is each a single bond, n$^2$ is each 0, and Z$^2$ is each hydrogen in formula (1-3), was prepared according to the process in Scheme 5 described above.

(1-3-5)

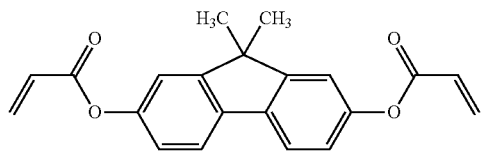

The preparation was carried out in the same manner as in Example 7, except that 2,7-dihydroxy-9,9-dimethylfluorene was used instead of 2,7-dihydroxy-9-methylfluorene, and colorless crystals of 2,7-bis(acryloyloxy)-9,9-dimethylfluorene (1-3-5) were obtained.

Melting point: 111.1° C.

1H-NMR (CDCl$_3$; δ ppm): 7.68 (d, 2H), 7.20 (d, 2H), 7.11 (dd, 2H), 6.63 (dd, 2H), 6.36 (dd, 2H), 6.04 (dd, 2H) and 1.48 (s, 6H).

Example 10

Preparation of 2,7-bis(methacryloyloxy)-9,9-dimethylfluorene (1-3-13)

The compound (1-3-13), that is, R$^3$ and R$^4$ are methyl, X$^2$ is each a single bond, n$^2$ is each 0, and Z$^2$ is each methyl in formula (1-3), was prepared according to the process in Scheme 5 described above.

(1-3-13)

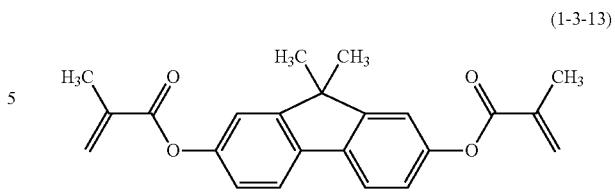

The preparation was carried out in the same manner as in Example 7, except that 2,7-dihydroxy-9,9-dimethylfluorene was used instead of 2,7-dihydroxy-9-methylfluorene, and colorless crystals of 2,7-bis(methacryloyloxy)-9,9-dimethylfluorene (1-3-13) were obtained.

Melting point: 146.0° C.

$^1$H-NMR (CDCl$_3$; δ ppm): 7.68 (dd, 2H), 7.19 (d, 2H), 7.09 (dd, 2H), 6.38 (s, 2H), 5.77-5.78 (m, 2H), 2.09 (s, 6H) and 1.48 (s, 6H).

Comparative Example 1

Preparation of 4,4'-bis(methacryloyloxy)biphenyl (R-1)

(R-1)

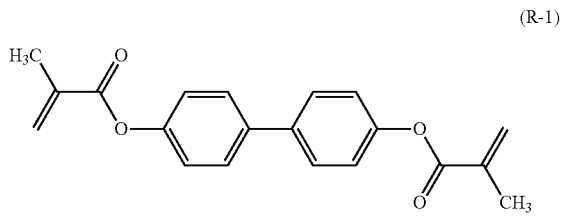 [SMILES: C=C(C)C(=O)Oc1ccc(-c2ccc(OC(=O)C(=C)C)cc2)cc1]

The preparation was carried out in the same manner as in Example 7, except that 4,4'-dihydroxybiphenyl was used instead of 2,7-dihydroxy-9-methylfluorene, and colorless crystals of 4,4'-bis(methacryloyloxy)biphenyl (R-1) were obtained.

Melting point: 152.7° C.

$^1$H-NMR (CDCl$_3$; δ ppm): 7.60-7.57 (m, 4H), 7.21-7.18 (m, 4H), 6.38 (s, 2H), 5.78 (t, 2H) and 2.09 (s, 6H).

Comparative Example 2

2,7-Bis(methacryloyloxy)naphthalene (R-2)

(R-2)

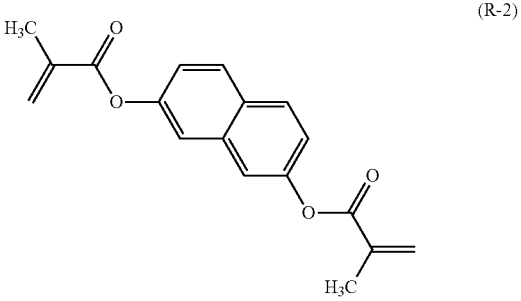 [SMILES: C=C(C)C(=O)Oc1ccc2ccc(OC(=O)C(=C)C)cc2c1]

The preparation was carried out in the same manner as in Example 7, except that 2,7-dihydroxynaphthalene was used was used instead of 2,7-dihydroxy-9-methylfluorene, and colorless crystals of 2,7-bis(methacryloyloxy)naphthalene (R-2) were obtained.

Melting point: 71.9° C.
$^1$H-NMR (CDCl$_3$; δ ppm): 7.87 (d, 2H), 7.59 (d, 2H), 7.26 (dd, 2H), 6.41 (s, 2H), 5.81-5.79 (m, 2H) and 2.10 (s, 6H).

Example 11

Comparison-1

Solubility in Liquid Crystal Composition

1% by weight of the polymerizable compound (R-1) in Comparative example 1 was added to the liquid crystal composition C, and the dissolution at 25° C. was tried. The results were that the crystals remained in the liquid crystal composition and all of the compound was not dissolved.

1% by weight of polymerizable compound (1-2-9) in Example 2 was added to the liquid crystal composition C, and the dissolution at 25° C. was tried. The results were that all of the compound (1-2-9) was dissolved. It was found by this comparison that the compound of the invention was easily dissolved in the liquid crystal composition.

The components of the liquid crystal composition C was as follows.

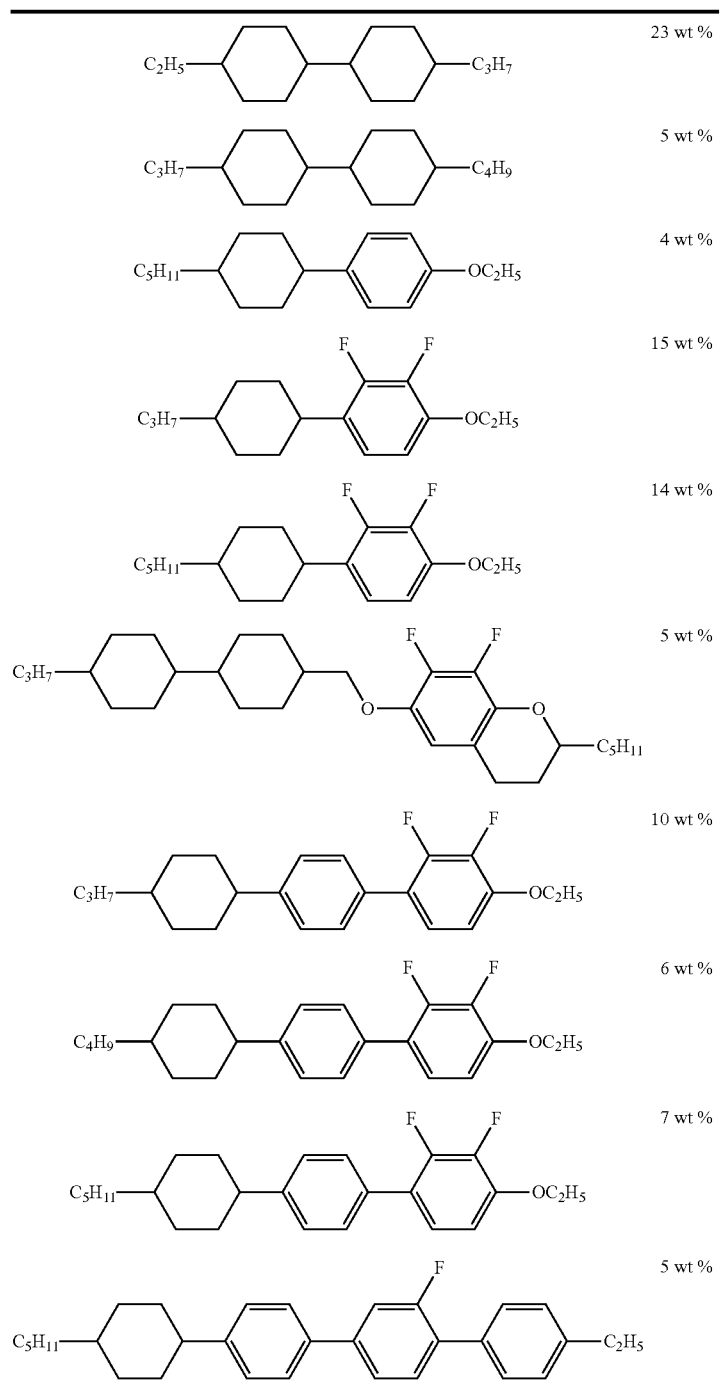

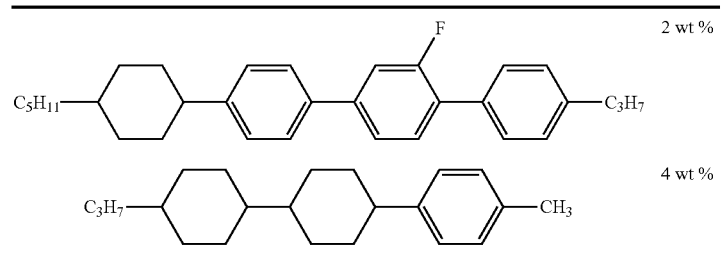

Example 12

Comparison-2

Solubility in Liquid Crystal Composition 0.3% by weight of each of the polymerizable compound (R-1) in Comparative example 1, and the polymerizable compounds (1-2-9), (1-2-41), (1-2-25), (1-3-13) and (1-3-12) of the invention was added to the liquid crystal composition C, and the mixture was heated at 50° C. for 30 minutes. The liquid crystal composition dissolving each compound was allowed to stand under the following conditions.

(1) Solubility-1: at room temperature for 2 days.
(2) Solubility-2: at −20° C. for 10 days.

Then, deposits of crystals were observed visually. The results were shown in Table 3. In Table 3, the symbol "○" means that crystals were not observed, the symbol "×" means that crystals were observed, and the symbol "–" means that the experiment was not carried out.

TABLE 3

| | Comparison-2: Solubility in liquid composition | | |
|---|---|---|---|
| Formula number | Structure | Solubility-1 (at room temperature for 2 days) | Solubility-2 (at −20° C. for 10 days) |
| Comparative example (R-1) | 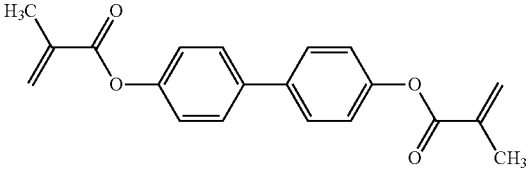 [SMILES: C=C(C)C(=O)Oc1ccc(-c2ccc(OC(=O)C(=C)C)cc2)cc1] | x | x |
| (2-9) | 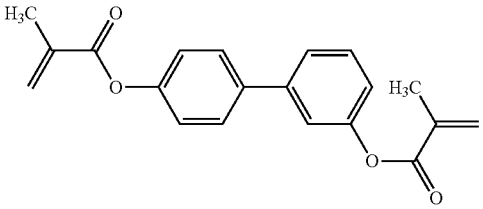 [SMILES: C=C(C)C(=O)Oc1ccc(-c2cccc(OC(=O)C(=C)C)c2)cc1] | ○ | ○ |
| (2-41) | 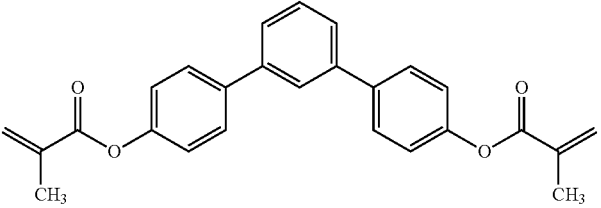 [SMILES: C=C(C)C(=O)Oc1ccc(-c2cccc(-c3ccc(OC(=O)C(=C)C)cc3)c2)cc1] | ○ | ○ |
| (2-25) | 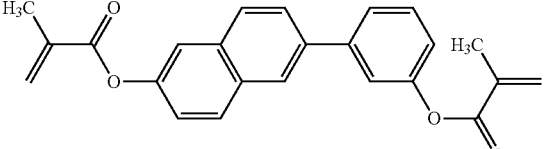 | ○ | ○ |

TABLE 3-continued

Comparison-2: Solubility in liquid composition

| Formula number | Structure | Solubility-1 (at room temperature for 2 days) | Solubility-2 (at −20° C. for 10 days) |
|---|---|---|---|
| (3-13) | [structure: fluorene with 9,9-dimethyl substituents and two methacrylate ester groups at 2,7-positions] | ◯ | — |
| (3-12) | [structure: fluorene with 9-methyl, 9-H substituents and two methacrylate ester groups at 2,7-positions] | ◯ | — |

Accordingly, the polymerizable compound of the invention had an excellent solubility in the liquid crystal composition C.

Example 13

Figure 2:
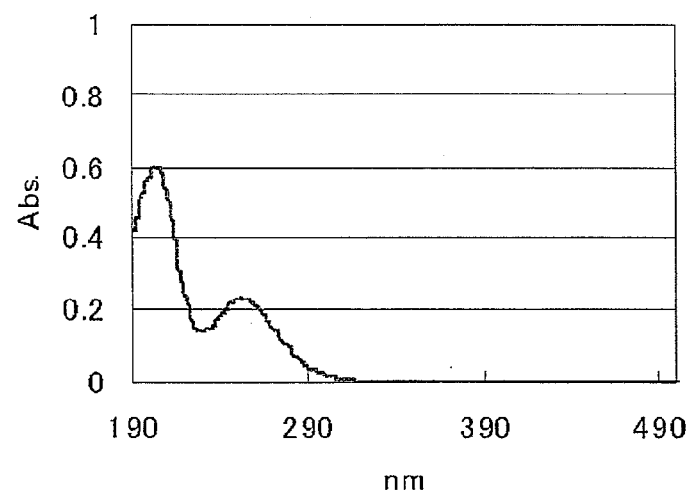
FIG. 2: UV/Vis spectrum of the compound (1-2-9) obtained in Example 2.
Figure 3:
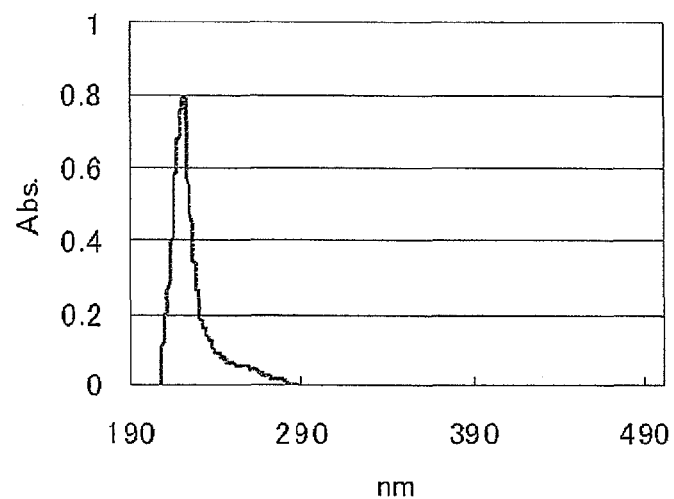
FIG. 3: UV/Vis spectrum of the compound (1-2-17) obtained in Example 5.
Figure 4:
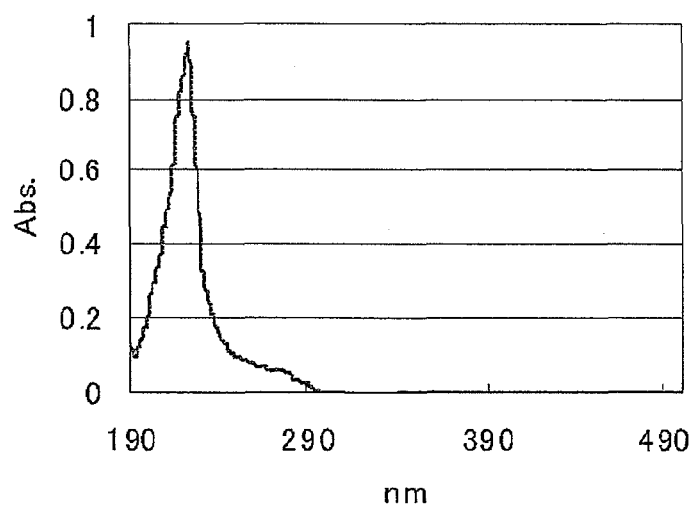
FIG. 4: UV/Vis spectrum of the compound (1-2-25) obtained in Example 6.
Figure 5:
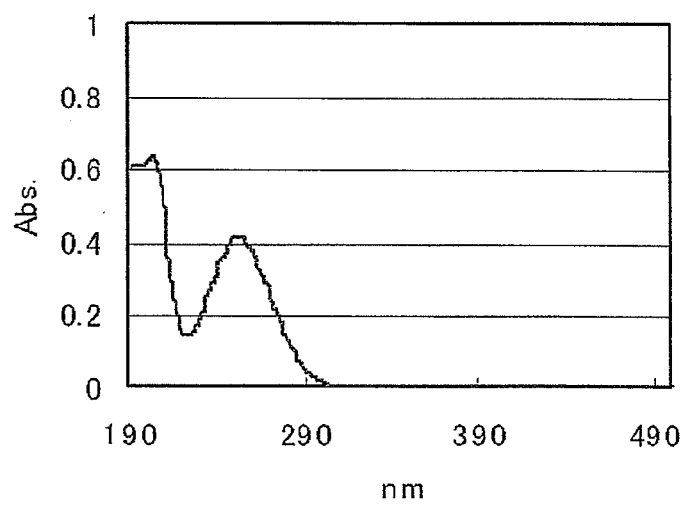
FIG. 5: UV/Vis spectrum of the compound (1-2-33) obtained in Example 3.
Figure 6:
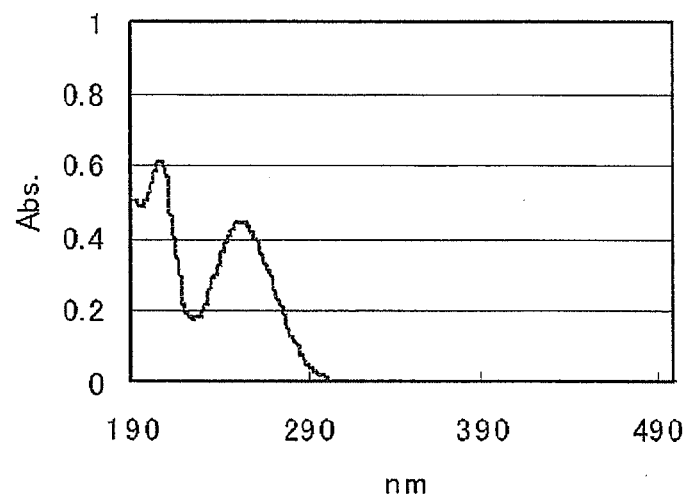
FIG. 6: UV/Vis spectrum of the compound (1-2-41) obtained in Example 4.
Figure 7:
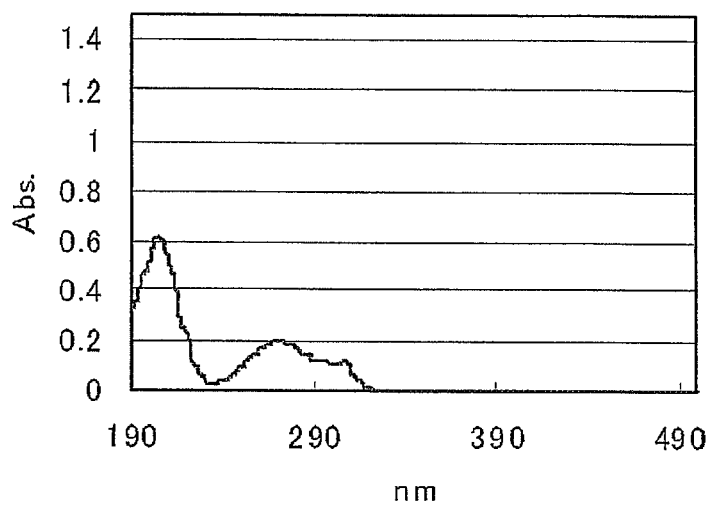
FIG. 7: UV/Vis spectrum of the compound (1-3-4) obtained in Example 7.
Figure 8:
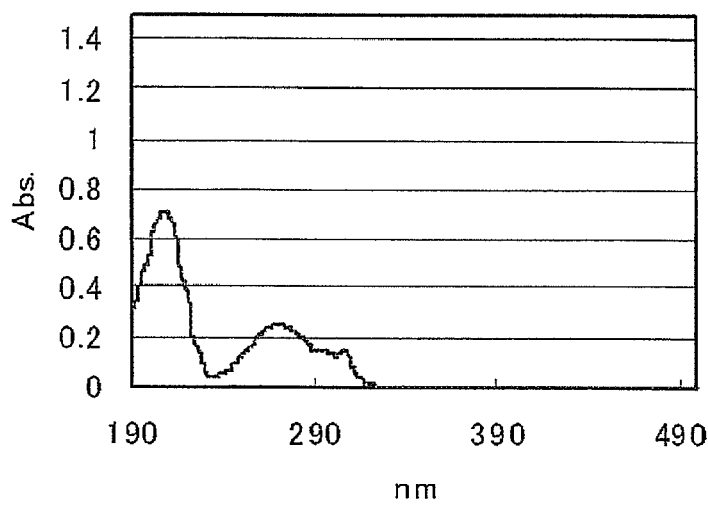
FIG. 8: UV/Vis spectrum of the compound (1-3-5) obtained in Example 9.
Figure 9:
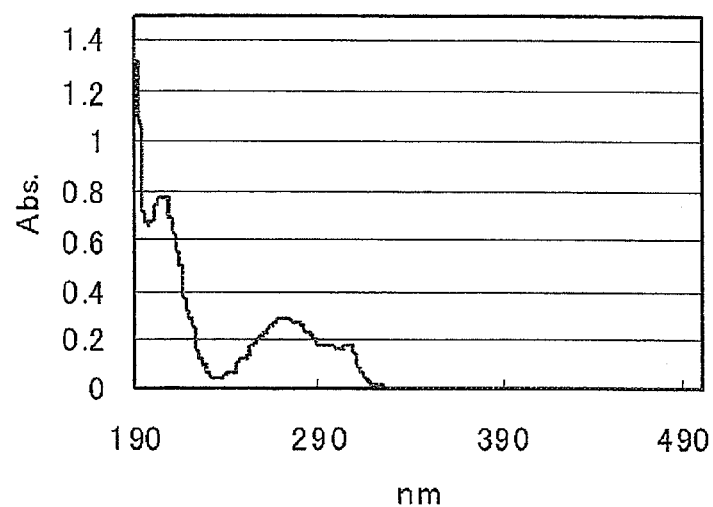
FIG. 9: UV/Vis spectrum of the compound (1-3-12) obtained in Example 8.
Figure 10:
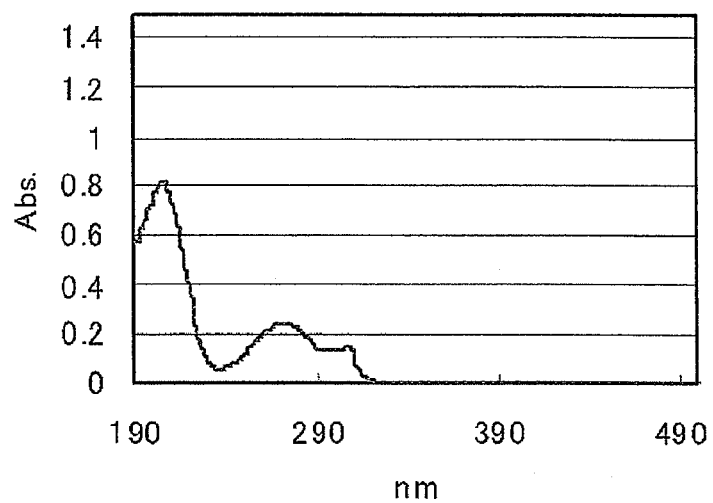
FIG. 10: UV/Vis spectrum of the compound (1-3-13) obtained in Example 10.
Figure 11:
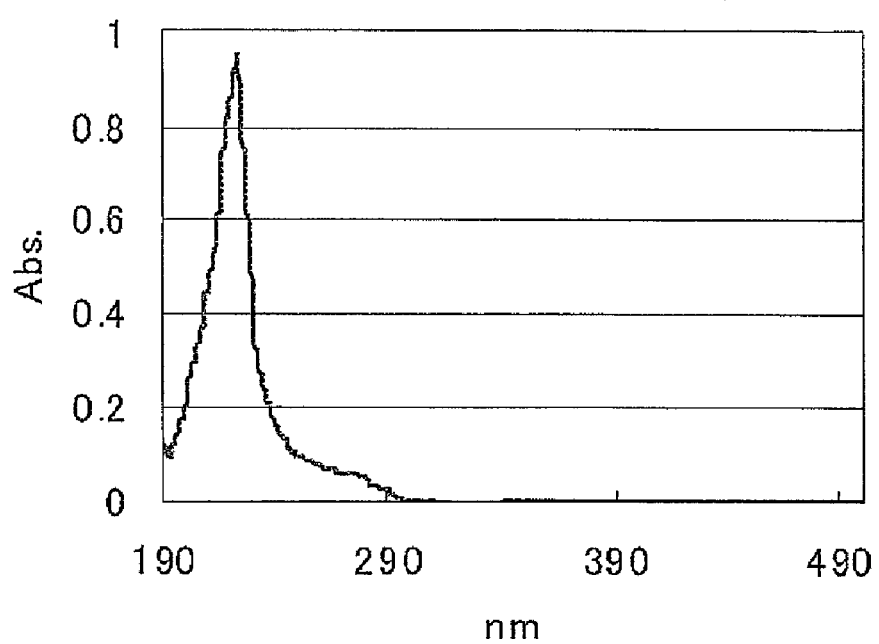
FIG. 11: UV/Vis spectrum of the compound (R-2) obtained in Comparative example 2.

UV/Vis spectra, FIG. 1 to FIG. 11, of the compound (R-2) in Comparative example and the compounds (1-2-1), (1-2-9), (1-2-17), (1-2-25), (1-2-33), (1-2-41), (1-3-4), (1-3-5), (1-3-12) and (1-2-13) in Example were compared.

The compound in Comparative example has no large absorption in the range of 250 nm or more. On the other hand, all of the compounds prepared in Examples have a large absorption in the range of 250 nm or more. Accordingly, the polymerizable compound of the invention exhibits a high polymerizability caused by irradiation with ultraviolet in the longer wavelength range.

A composition and a compound were a subject for measurement in order to evaluate the characteristics of the composition and the compound that will be included in the composition. When the subject for measurement was a composition, the composition itself was measured as a sample, and the value obtained was described here. When a subject for measurement was a compound, a sample for measurement was prepared by mixing 15% by weight of the compound and 85% by weight of mother liquid crystals. The characteristic values of the compound were calculated from values obtained by measurement, according to the method of extrapolation. That is to say that (extrapolated value)=[(measured value of a sample for measurement)−0.85×(measured value of mother liquid crystals)]/0.15. When a smectic phase (or crystals) separated out in this ratio at 25° C., the ratio of the compound to the mother liquid crystals was changed step by step in the order of (10% by weight/90% by weight), (5% by weight/95% by weight) and (1% by weight/99% by weight). The values of the maximum temperature, the optical anisotropy, the viscosity and the dielectric anisotropy with regard to the compound were obtained by this extrapolation method.

The components and the ratios of the liquid crystal composition D were as follows.

$C_3H_7$—⟨cyclohexyl⟩—COO—⟨phenyl⟩—$OC_2H_5$   17.2 wt %

$C_3H_7$—⟨cyclohexyl⟩—COO—⟨phenyl⟩—$OC_4H_9$   27.6 wt %

$C_4H_9$—⟨cyclohexyl⟩—COO—⟨phenyl⟩—$OC_2H_5$   20.7 wt %

$C_5H_{11}$—⟨cyclohexyl⟩—COO—⟨phenyl⟩—$OCH_3$   20.7 wt %

$C_5H_{11}$—⟨cyclohexyl⟩—COO—⟨phenyl⟩—$OC_2H_5$   13.8 wt %

The values of Characteristics were measured according to the following methods. Most methods are described in the Standards of Electronic Industries Association of Japan, EIAJ•ED-2521 A or the modified methods.

Maximum Temperature of a Nematic Phase (NI; ° C.): A sample was placed on a hot plate in a melting point apparatus equipped with a polarizing microscope and was heated at the rate of 1° C. per minute. The temperature was measured when part of the sample began to change from a nematic phase to an isotropic liquid. A higher limit of the temperature range of a nematic phase may be abbreviated to "the maximum temperature."

Minimum Temperature of a Nematic Phase (Tc; ° C.): A sample having a nematic phase was put in glass vials and then kept in freezers at temperatures of 0° C., −10° C., −20° C., −30° C. and −40° C. for 10 days, and then the liquid crystal phases were observed. For example, when the sample maintained the nematic phase at −20° C. and changed to crystals or a smectic phase at −30° C., Tc was expressed as ≦−20° C. A lower limit of the temperature range of a nematic phase may be abbreviated to "the minimum temperature."

Viscosity (bulk viscosity; η; measured at 20° C.; mPa·s): Viscosity was measured by use of an E-type viscometer.

Optical Anisotropy (refractive index anisotropy; Δn; measured at 25° C.): Measurement was carried out by use of an Abbe refractometer with a polarizing plate mounted on the ocular, using light at a wavelength of 589 nanometers. The surface of the main prism was rubbed in one direction, and then a sample was dropped on the main prism. A refractive index (n∥) was measured when the direction of polarized light was parallel to that of the rubbing. A refractive index (n⊥) was measured when the direction of polarized light was perpendicular to that of the rubbing. The value of optical anisotropy was calculated from the equation: Δn=n∥–n⊥.

Dielectric Anisotropy (Δ∈; measured at 25° C.): The value of dielectric anisotropy was calculated from the equation: Δ∈=∈∥–∈⊥. Dielectric constants (∈∥ and ∈⊥) were measured as follows.

(1) Measurement of a dielectric constant (∈∥): A solution of octadecyltriethoxysilane (0.16 mL) in ethanol (20 mL) was applied to a thoroughly cleaned glass substrate. The glass substrate was rotated with a spinner, and then heated at 150° C. for one hour. A sample was poured into a VA device in which the distance between the two glass substrates (cell gap) was 4 micrometers, and then the device was sealed with an adhesive curable on irradiation with ultraviolet light. Sine waves (0.5 V, 1 kHz) were applied to the device, and a dielectric constant (∈∥) in the major axis direction of liquid crystal molecules was measured after 2 seconds.

(2) Measurement of a dielectric constant (∈⊥): A polyimide solution was applied to a thoroughly cleaned glass substrate. The glass substrate was burned, and then the resulting alignment film was subjected to rubbing treatment. A sample was poured into a TN device in which the distance between the two glass substrates (cell gap) was 9 micrometers and the twist angle was 80 degrees. Sine waves (0.5 V, 1 kHz) were applied to the device, and a dielectric constant (∈⊥) in the minor axis direction of liquid crystal molecules was measured after 2 seconds.

Threshold Voltage (Vth; measured at 25° C.; V): Measurement was carried out with an LCD evaluation system Model LCD-5100 made by Otsuka Electronics Co., Ltd. The light source was a halogen lamp. A sample was poured into a VA device having a normally black mode, in which the distance between the two glass substrates (cell gap) was 4 micrometers and the rubbing direction was antiparallel, and then the device was sealed with an adhesive curable on irradiation with ultraviolet light. A voltage to be applied to the device (60 Hz, rectangular waves) was stepwise increased in 0.02 V increments from 0 V up to 20 V. During the increase, the device was irradiated with light in the perpendicular direction, and the amount of light passing through the device was measured. A voltage-transmittance curve was prepared, in which the maximum amount of light corresponded to 100% transmittance and the minimum amount of light corresponded to 0% transmittance. The threshold voltage was voltage at 10% transmittance.

Voltage Holding Ratio (VHR-1; measured at 25° C.; %): A TN device used for measurement had a polyimide-alignment film, and the distance between the two glass substrates (cell gap) was 5 micrometers. A sample was poured into the device, and then the device was sealed with an adhesive curable on irradiation with ultraviolet light. A pulse voltage (60 microseconds at 5 V) was applied to the TN device and the device was charged. A decreasing voltage was measured for 16.7 milliseconds with a high-speed voltmeter, and the area A between the voltage curve and the horizontal axis in a unit cycle was obtained. The area B was an area without the decrease. The voltage holding ratio was the percentage of the area A to the area B.

Voltage Holding Ratio (VHR-2; measured at 80° C.; %): A TN device used for measurement had a polyimide-alignment film, and the distance between the two glass substrates (cell gap) was 5 micrometer. A sample was poured into the device, and then the device was sealed with an adhesive curable on irradiation with ultraviolet light. A pulse voltage (60 microseconds at 5 V) was applied to the TN device and the device was charged. A decreasing voltage was measured for 16.7 milliseconds with a high-speed voltmeter and the area A between the voltage curve and the horizontal axis in a unit cycle was obtained. The area B was an area without the decrease. The voltage holding ratio was a percentage of the area A to the area B.

Voltage Holding Ratio (VHR-3; measured at 25° C.; %): The stability to ultraviolet light was evaluated by measuring a voltage holding ratio after irradiation with ultraviolet light. A composition having a large VHR-3 has a high stability to ultraviolet light. A TN device used for measurement had a polyimide-alignment film and the cell gap was 5 micrometers. A sample was poured into this device, and then the device was irradiated with light for 20 minutes. The light source was an ultra high-pressure mercury lamp USH-500D (made by Ushio, Inc.), and the distance between the device and the light source was 20 centimeters. In the measurement of VHR-3, a decreasing voltage was measured for 16.7 milliseconds. The value of VHR-3 is preferably 90% or more, and more preferably 95% or more.

Voltage Holding Ratio (VHR-4; measured at 25° C.; %): A TN device into which a sample was poured was heated in a constant-temperature bath at 80° C. for 500 hours, and then the stability to heat was evaluated by measuring the voltage holding ratio. A composition having a large VHR-4 has a high stability to heat. In the measurement of VHR-4, a decreasing voltage was measured for 16.7 milliseconds.

Response Time (τ; measured at 25° C.; millisecond): Measurement was carried out with an LCD evaluation system Model LCD-5100 made by Otsuka Electronics Co., Ltd. The light source was a halogen lamp. The low-pass filter was set at 5 kHz. A sample was poured into a PVA device having a homeotropic alignment film and having a normally black mode, in which the cell gap between the two glass substrates was 4 micrometers, and the rubbing direction was antiparallel. Then, the device was sealed with an adhesive curable on irradiation with ultraviolet light.

A voltage that is somewhat higher than that of the threshold voltage was applied to the device for about 1 minute. Rectangular waves (60 Hz, 10 V, 0.5 second) were applied to the device. The device was simultaneously irradiated with light in the perpendicular direction, and the amount of light passing through the device was measured. The maximum amount of light corresponded to 100% transmittance, and the minimum amount of light corresponded to 0% transmittance. The response time was the period of time required for the change from 0% to 90% transmittance (rise time; millisecond).

Specific Resistance (ρ; measured at 25° C.; Ω cm): A sample of 1.0 milliliter was poured into a vessel equipped with electrodes. DC voltage (10 V) was applied to the vessel, and the DC current was measured after 10 seconds. The specific resistance was calculated from the following equation. (specific resistance)=[(voltage)×(electric capacity of vessel)]/[(DC current)×(dielectric constant in vacuum)].

The invention will be explained in detail by way of Examples. The invention is not limited by Examples described below. The compounds described in Comparative Examples and Examples were expressed as symbols according to the definition in the following Table 4.

In Table 4, the configuration of 1,4-cyclohexylene is trans, and the configuration of a 2,5-tetrahydropyran ring is a mixture of (R,R) and (S,S). A parenthesized number next to the symbolized compound in Example corresponds to the number of a desirable compound. The symbol (–) means any other liquid crystal compound. Ratios (percentage) of liquid crystal compounds mean the percentages by weight (% by weight) based on the total weight of the liquid crystal composition. The liquid crystal composition further includes an impurity. Last, characteristics of the composition are summarized.

TABLE 4

Method of Description of Compounds using Symbols
Ra—(B$_1$)—Z$_1$— . . . Z$_n$—(B$_n$)—Rb

| 1) Left-terminal Group Ra— | Symbol |
|---|---|
| $C_nH_{2n+1}$— | n- |
| $C_nH_{2n+1}O$— | nO— |
| $C_mH_{2m+1}OC_nH_{2n}$— | mOn- |
| $CH_2$=CH— | V— |
| $C_nH_{2n+1}$—CH=CH— | nV— |
| $C_mH_{2m+1}$—CH=CH—$C_nH_{2n+1}$— | Vn- |
| $CF_2$=CH— | mVn- |
| $CF_2$=CH—$C_nH_{2n+1}$— | VFF— |
| $CH_2$=CH—$C_nH_{2n+}$— | VFFn- |
| $CH_2$=CHCOO— | AC— |
| $CH_2$=C(CH$_3$)COO— | MAC— |
| 2) Right-terminal Group Rb— | Symbol |
| —$C_nH_{2n+1}$ | -n |
| —$OC_nH_{2n+1}$ | —On |
| —CH=CH$_2$ | —V |
| —CH=CH—$C_nH_{2n+1}$ | —Vn |
| —$C_nH_{2n+1}$—CH=CH$_2$ | -nV |
| —CH=CF$_2$ | —VFF |
| —COOCH$_3$ | —EMe |
| —OCOCH=CH$_2$ | —AC |
| —OCOC(CH$_3$)=CH$_2$ | —MAC |
| 3) Bonding Group —Z$_n$— | Symbol |
| —C$_2$H$_4$— | 2 |
| —COO— | E |
| —CH=CH— | V |
| —C≡C— | T |
| —CF$_2$O— | X |
| —CH$_2$O— | 1O |
| —SiH$_2$— | Si |
| 4) Ring Structure —B$_n$— | Symbol |

  H

  Dh

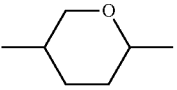  dh

  B

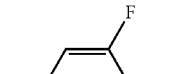  B(F)

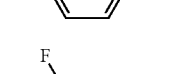  B(2F)

TABLE 4-continued

Method of Description of Compounds using Symbols
Ra—(B$_1$)—Z$_1$— . . . Z$_n$—(B$_n$)—Rb

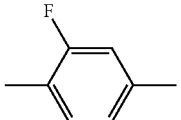  B(2F,5F)

  B(2F,3F)

  B(2F,3F,6Me)

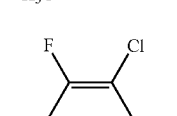  B(2F,3Cl)

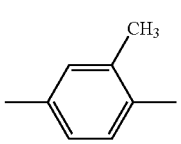  B(Me)

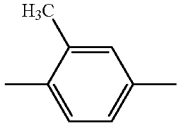  B(2Me)

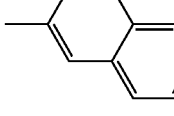  Np

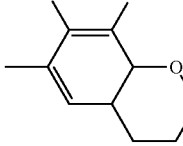  Cro(7F,8F)

5) Examples of Description

Example 1.

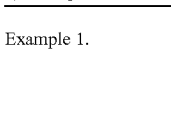

V2-BB(F)B-1

TABLE 4-continued

Method of Description of Compounds using Symbols
Ra—(B₁)—Z₁— ... Z$_n$—(B$_n$)—Rb Example 2.

3-HB(2F,3F)-O2

$C_3H_7$—(cyclohexyl)—(difluorophenyl with F, F)—$OC_2H_5$

Example 3.

3-HHB-1

$C_3H_7$—(cyclohexyl)—(cyclohexyl)—(phenyl)—$CH_3$

Example 4.

AC-BB-AC $CH_2$=CHOO—(phenyl)—(phenyl)—OCOCH=$CH_2$

Comparative Composition Example 1

The following is a liquid crystal composition that does not include the first component of the invention and the dielectric anisotropy is negative. The components and characteristics of the composition were as follows:

| | | |
|---|---|---|
| V-HB(2F,3F)-O2 | (4-1-1) | 15% |
| V-HB(2F,3F)-O4 | (4-1-1) | 10% |
| 2-HBB(2F,3F)-O2 | (4-7-1) | 1% |
| 3-HBB(2F,3F)-O2 | (4-7-1) | 10% |
| 5-HBB(2F,3F)-O2 | (4-7-1) | 10% |
| 2-HH-3 | (5-1-1) | 27% |
| 3-HB-O2 | (5-2-1) | 2% |
| 3-HHB-1 | (5-5-1) | 6% |
| 3-HHB-3 | (5-5-1) | 5% |
| 3-HHB-O1 | (5-5-1) | 3% |
| 2-HHB(2F,3Cl)-O2 | (6-1-2-1) | 2% |
| 3-HHB(2F,3Cl)-O2 | (6-1-2-1) | 3% |
| 4-HHB(2F,3Cl)-O2 | (6-1-2-1) | 3% |
| 5-HHB(2F,3Cl)-O2 | (6-1-2-1) | 3% |

NI=74.7° C.; Tc≦−20° C.; Δn=0.090; Δ∈=−2.9; Vth=2.16 V; VHR-1=99.1%; VHR-2=98.1%; VHR-3=98.1%. The response time in the PVA device described in this specification: τ=7.7 ms.

Example M1

| | | |
|---|---|---|
| V-HB(2F,3F)-O2 | (4-1-1) | 15% |
| V-HB(2F,3F)-O4 | (4-1-1) | 10% |
| 2-HBB(2F,3F)-O2 | (4-7-1) | 1% |
| 3-HBB(2F,3F)-O2 | (4-7-1) | 10% |
| 5-HBB(2F,3F)-O2 | (4-7-1) | 10% |
| 2-HH-3 | (5-1-1) | 27% |
| 3-HB-O2 | (5-2-1) | 2% |
| 3-HHB-1 | (5-5-1) | 6% |
| 3-HHB-3 | (5-5-1) | 5% |
| 3-HHB-O1 | (5-5-1) | 3% |
| 2-HHB(2F,3Cl)-O2 | (6-1-2-1) | 2% |
| 3-HHB(2F,3Cl)-O2 | (6-1-2-1) | 3% |
| 4-HHB(2F,3Cl)-O2 | (6-1-2-1) | 3% |
| 5-HHB(2F,3Cl)-O2 | (6-1-2-1) | 3% |

0.3% by weight of the compound (1-2-9) which was the first component of the invention was added to 100% by weight of the preceding composition.

NI=74.7° C.; Tc≦−20° C.; Δn=0.090; Δ∈=−2.9; Vth=2.16V; VHR-1=99.2%; VHR-2=98.5%; VHR-3=98.6%. The response time in the PVA device described in this specification: τ=4.0 ms.

Example M2

| | | |
|---|---|---|
| 3-H2B(2F,3F)-O2 | (4-2-1) | 17% |
| 5-H2B(2F,3F)-O2 | (4-2-1) | 16% |
| 3-HBB(2F,3F)-O2 | (4-7-1) | 12% |
| 4-HBB(2F,3F)-O2 | (4-7-1) | 6% |
| 5-HBB(2F,3F)-O2 | (4-7-1) | 10% |
| 2-HH-3 | (5-1-1) | 20% |
| 3-HH-4 | (5-1-1) | 4% |
| 5-HB-O2 | (5-2-1) | 4% |
| 3-HHB-1 | (5-5-1) | 4% |
| 5-HBB(F)B-2 | (5-13-1) | 7% |

0.3% by weight of the compound (1-2-9) which was the first component of the invention was added to 100% by weight of the preceding composition.

NI=78.2° C.; Tc≦−20° C.; Δn=0.101; Δ∈=−3.1; Vth=2.33 V; VHR-1=99.2%; VHR-2=98.6%; VHR-3=98.8%. The response time in the PVA device described in this specification: τ=4.2 ms.

Example M3

| | | |
|---|---|---|
| V-HB(2F,3F)-O2 | (4-1-1) | 11% |
| V-HB(2F,3F)-O4 | (4-1-1) | 10% |
| 3-H2B(2F,3F)-O2 | (4-2-1) | 15% |
| 5-H2B(2F,3F)-O2 | (4-2-1) | 5% |
| 3-HBB(2F,3F)-O2 | (4-7-1) | 10% |
| 4-HBB(2F,3F)-O2 | (4-7-1) | 6% |
| 5-HBB(2F,3F)-O2 | (4-7-1) | 6% |
| 3-HH-4 | (5-1-1) | 14% |
| 3-HHB-1 | (5-5-1) | 4% |
| 3-HHB-3 | (5-5-1) | 5% |
| 3-HHB-O1 | (5-5-1) | 3% |
| 5-HBB(F)B-2 | (5-13-1) | 6% |
| 5-HBB(F)B-3 | (5-13-1) | 5% |

0.5% by weight of the compound (1-2-41) which was the first component of the invention was added to 100% by weight of the preceding composition.

NI=86.0° C.; Tc≦−20° C.; Δn=0.118; Δ∈=−3.6; Vth=2.20 V; VHR-1=99.0%; VHR-2=98.6%; VHR-3=98.8%. The response time in the PVA device described in this specification: τ=5.5 ms.

Example M4

| V-HB(2F,3F)-O2 | (4-1-1) | 13% |
|---|---|---|
| V-HB(2F,3F)-O4 | (4-1-1) | 13% |
| 3-HBB(2F,3F)-O2 | (4-7-1) | 10% |
| 4-HBB(2F,3F)-O2 | (4-7-1) | 6% |
| 5-HBB(2F,3F)-O2 | (4-7-1) | 8% |
| 2-HH-5 | (5-1-1) | 8% |
| 3-HH-4 | (5-1-1) | 14% |
| 5-HB-O2 | (5-2-1) | 8% |
| 3-HHB-1 | (5-5-1) | 3% |
| 3-HHB-3 | (5-5-1) | 4% |
| 3-HHB-O1 | (5-5-1) | 2% |
| 3-HHEBH-3 | (5-10-1) | 2% |
| 3-HHEBH-5 | (5-10-1) | 2% |
| 5-HBB(F)B-2 | (5-13-1) | 2% |
| 3-HH1OCro(7F,8F)-5 | (6-3-3-3) | 5% |

0.3% by weight of the compound (1-2-41) which was the first component of the invention was added to 100% by weight of the preceding composition.

NI=85.4° C.; Tc≦−20° C.; Δn=0.100; Δ∈=−3.2; Vth=2.24 V; VHR-1=99.2%; VHR-2=98.6%; VHR-3=98.8%. The response time in the PVA device described in this specification: τ=5.4 ms.

Example M5

| V-HB(2F,3F)-O2 | (4-1-1) | 10% |
|---|---|---|
| V-HB(2F,3F)-O4 | (4-1-1) | 10% |
| 3-H2B(2F,3F)-O2 | (4-2-1) | 13% |
| 5-H2B(2F,3F)-O2 | (4-2-1) | 12% |
| 3-HBB(2F,3F)-O2 | (4-7-1) | 11% |
| 4-HBB(2F,3F)-O2 | (4-7-1) | 4% |
| 5-HBB(2F,3F)-O2 | (4-7-1) | 9% |
| 3-HH-4 | (5-1-1) | 2% |
| 3-HHEH-3 | (5-4-1) | 2% |
| 3-HHEH-5 | (5-4-1) | 2% |
| 4-HHEH-3 | (5-4-1) | 2% |
| 4-HHEH-5 | (5-4-1) | 2% |
| 3-HHB-1 | (5-5-1) | 4% |
| 3-HHB-3 | (5-5-1) | 7% |
| 3-HHB-O1 | (5-5-1) | 4% |
| 3-HHEBH-3 | (5-10-1) | 3% |
| 3-HHEBH-5 | (5-10-1) | 3% |

0.3% by weight of the compound (1-2-25) which was the first component of the invention was added to 100% by weight of the preceding composition.

NI=90.9° C.; Tc≦−20° C.; Δn=0.105; Δ∈=−4.4; Vth=2.03 V; VHR-1=99.3%; VHR-2=98.6%; VHR-3=98.9%. The response time in the PVA device described in this specification: τ=5.7 ms.

Example M6

| V-HB(2F,3F)-O2 | (4-1-1) | 11% |
|---|---|---|
| V-HB(2F,3F)-O4 | (4-1-1) | 10% |
| 3-HBB(2F,3F)-O2 | (4-7-1) | 11% |
| 4-HBB(2F,3F)-O2 | (4-7-1) | 4% |
| 5-HBB(2F,3F)-O2 | (4-7-1) | 7% |
| 2-HH-3 | (5-1-1) | 17% |
| 3-HH-4 | (5-1-1) | 8% |
| 3-HH-5 | (5-1-1) | 4% |
| 5-HB-O2 | (5-2-1) | 6% |
| 3-HHB-1 | (5-5-1) | 5% |
| 3-HHB-3 | (5-5-1) | 6% |
| 3-HHB-O1 | (5-5-1) | 3% |
| 3-HH1OCro(7F,8F)-5 | (6-3-3-3) | 8% |

0.3% by weight of the compound (1-2-25) which was the first component of the invention was added to 100% by weight of the preceding composition.

NI=79.2° C.; Tc≦−20° C.; Δn=0.092; Δ∈=−2.9; Vth=2.30 V; VHR-1=99.3%; VHR-2=98.5%; VHR-3=98.5%. The response time in the PVA device described in this specification: τ=4.0 ms.

Example M7

| V-HB(2F,3F)-O2 | (4-1-1) | 13% |
|---|---|---|
| V-HB(2F,3F)-O4 | (4-1-1) | 13% |
| 3-HBB(2F,3F)-O2 | (4-7-1) | 6% |
| 4-HBB(2F,3F)-O2 | (4-7-1) | 6% |
| 5-HBB(2F,3F)-O2 | (4-7-1) | 6% |
| 2-HH-3 | (5-1-1) | 26% |
| 5-HB-O2 | (5-2-1) | 5% |
| 3-HHB-1 | (5-5-1) | 4% |
| 3-HHB-3 | (5-5-1) | 7% |
| 3-HHB-O1 | (5-5-1) | 4% |
| 5-HBB(F)B-2 | (5-13-1) | 5% |
| 3-HH1OCro(7F,8F)-5 | (6-3-3-3) | 5% |

0.3% by weight of the compound (1-2-9) which was the first component of the invention was added to 100% by weight of the preceding composition.

NI=75.0° C.; Tc≦−20° C.; Δn=0.095; Δ∈=−2.7; Vth=2.29 V; VHR-1=99.3%; VHR-2=98.5%; VHR-2=98.5%. The response time in the PVA device described in this specification: τ=3.7 ms.

Example M8

| V-HB(2F,3F)-O2 | (4-1-1) | 14% |
|---|---|---|
| V-HB(2F,3F)-O4 | (4-1-1) | 13% |
| 3-HBB(2F,3F)-O2 | (4-7-1) | 10% |
| 4-HBB(2F,3F)-O2 | (4-7-1) | 4% |
| 5-HBB(2F,3F)-O2 | (4-7-1) | 5% |
| 2-HH-3 | (5-1-1) | 26% |
| 4-HHEH-3 | (5-4-1) | 3% |
| 4-HHEH-5 | (5-4-1) | 3% |
| 3-HHB-1 | (5-5-1) | 6% |
| 3-HHB-3 | (5-5-1) | 6% |
| 3-HHB-O1 | (5-5-1) | 3% |
| 3-HH1OCro(7F,8F)-5 | (6-3-3-3) | 7% |

0.3% by weight of the compound (1-3-13) which was the first component of the invention was added to 100% by weight of the preceding composition.

NI=75.6° C.; Δn=0.090; Δ∈=−3.1; Vth=2.07 V; VHR-1=99.2%; VHR-2=98.5%; VHR-3=98.5%. The response time in the PVA device described in this specification: τ=4.3 ms.

Example M9

| | | |
|---|---|---|
| 3-H2B(2F,3F)-O2 | (4-2-1) | 15% |
| 5-H2B(2F,3F)-O2 | (4-2-1) | 15% |
| 2-HBB(2F,3F)-O2 | (4-7-1) | 3% |
| 3-HBB(2F,3F)-O2 | (4-7-1) | 9% |
| 5-HBB(2F,3F)-O2 | (4-7-1) | 9% |
| 2-HH-5 | (5-1-1) | 3% |
| 3-HH-4 | (5-1-1) | 15% |
| 3-HH-5 | (5-1-1) | 4% |
| 3-HB-O2 | (5-2-1) | 12% |
| 3-HHB-1 | (5-5-1) | 3% |
| 3-HHB-3 | (5-5-1) | 4% |
| 3-HHB-O1 | (5-5-1) | 3% |
| 3-HHB(2F,3Cl)-O2 | (6-1-2-1) | 5% |

0.3% by weight of the compound (1-3-13) which was the first component of the invention was added to 100% by weight of the preceding composition.

NI=76.1° C.; Δn=0.098; Δ∈=−2.8; Vth=2.39 V; VHR-1=99.2%; VHR-2=98.5%; VHR-3=98.5%. The response time in the PVA device described in this specification: τ=4.4 ms.

Example M10

| | | |
|---|---|---|
| 3-H2B(2F,3F)-O2 | (4-2-1) | 17% |
| 5-H2B(2F,3F)-O2 | (4-2-1) | 17% |
| V-HH-3 | (5-1-1) | 27% |
| V-HHB-1 | (5-5-1) | 10% |
| 2-BB(F)B-3 | (5-7-1) | 2% |
| 3-HHB(2F,3Cl)-O2 | (6-1-2-1) | 4% |
| 4-HHB(2F,3Cl)-O2 | (6-1-2-1) | 3% |
| 5-HHB(2F,3Cl)-O2 | (6-1-2-1) | 3% |
| 3-HBB(2F,3Cl)-O2 | (6-1-3-1) | 8% |
| 5-HBB(2F,3Cl)-O2 | (6-1-3-1) | 9% |

0.3% by weight of the compound (1-3-12) which was the first component of the invention was added to 100% by weight of the preceding composition.

NI=70.3° C.; Δn=0.095; Δ∈=−2.8; Vth=2.34 V; VHR-1=99.2%; VHR-2=98.6%; VHR-3=98.6%. The response time in the PVA device described in this specification: τ=4.3 ms.

Example M11

| | | |
|---|---|---|
| V-HB(2F,3F)-O2 | (4-1-1) | 10% |
| V-HHB(2F,3F)-O2 | (4-4-1) | 15% |
| V2-HHB(2F,3F)-O2 | (4-4-1) | 15% |
| V-HH-3 | (5-1-1) | 25% |
| 1V-HH-3 | (5-1-1) | 8% |
| V-HHB-1 | (5-5-1) | 5% |
| 2-BB(F)B-3 | (5-7-1) | 10% |
| 3-HCro(7F,8F)-5 | (6-3-1-1) | 3% |
| 2O-Cro(7F,8F)H-3 | (6-3-2) | 3% |
| 3-HHCro(7F,8F)-5 | (6-3-3-1) | 3% |
| 2O-Cro(7F,8F)HH-5 | (6-3-4) | 3% |

0.3% by weight of the compound (1-3-12) which was the first component of the invention was added to 100% by weight of the preceding composition.

NI=76.3° C.; Tc≦−20° C.; Δn=0.096; Δ∈=−3.1; Vth=2.27 V; VHR-1=99.1%; VHR-2=98.5%; VHR-3=98.6%. The response time in the PVA device described in this specification: τ=5.9 ms.

Example M12

| | | |
|---|---|---|
| V2-HB(2F,3F)-O2 | (4-1-1) | 15% |
| V-HBB(2F,3F)-O2 | (4-7-1) | 12% |
| V-HH-3 | (5-1-1) | 30% |
| V2-HHB-1 | (5-5-1) | 10% |
| 3-BB(F)B-2V | (5-7-1) | 8% |
| 3-H1OCro(7F,8F)-5 | (6-3-1-3) | 5% |
| 5-H1OCro(7F,8F)-4 | (6-3-1-3) | 5% |
| 3-HH1OCro(7F,8F)-5 | (6-3-3-3) | 4% |
| 5-HH1OCro(7F,8F)-5 | (6-3-3-3) | 6% |
| 3-BBCro(7F,8F)-5 | (6-3-3-5) | 5% |

0.3% by weight of the compound (1-2-1) which was the first component of the invention was added to 100% by weight of the preceding composition.

NI=78.3° C.; Tc≦−20° C.; Δn=0.111; Δ∈=−3.0; Vth=2.30 V; VHR-1=99.2%; VHR-2=98.5%; VHR-3=98.6%. The response time in the PVA device described in this specification: τ=5.9 ms.

Example M13

| | | |
|---|---|---|
| V-HB(2F,3F)-O2 | (4-1-1) | 10% |
| V-HHB(2F,3F)-O2 | (4-4-1) | 10% |
| 1V-HHB(2F,3F)-O2 | (4-4-1) | 5% |
| 1V2-HHB(2F,3F)-O2 | (4-4-1) | 5% |
| V2-HBB(2F,3F)-O2 | (4-7-1) | 10% |
| 2-HH-3 | (5-1-1) | 22% |
| 3-HH-O1 | (5-1-1) | 3% |
| 7-HB-1 | (5-2-1) | 5% |
| 3-HHEH-5 | (5-4-1) | 3% |
| V-HHB-1 | (5-5-1) | 7% |
| V2-BB(F)B-1 | (5-7-1) | 5% |
| 5-HBB(F)B-3 | (5-13-1) | 5% |
| 3-H2Cro(7F,8F)-5 | (6-3-1-2) | 5% |
| 2-Cro(7F,8F)2H-3 | (6-3-2-2) | 5% |

0.3% by weight of the compound (1-2-1) which was the first component of the invention was added to 100% by weight of the preceding composition.

NI=81.1° C.; Tc≦−20° C.; Δn=0.100; Δ∈=−2.7; Vth=2.43 V; VHR-1=99.3%; VHR-2=98.4%; VHR-2=98.6%. The response time in the PVA device described in this specification: τ=4.2 ms.

Example M14

| | | |
|---|---|---|
| 3-HB(2F,3F)-O2 | (4-1-1) | 5% |
| V-HB(2F,3F)-O2 | (4-1-1) | 11% |
| V-HB(2F,3F)-O4 | (4-1-1) | 12% |
| V-HHB(2F,3F)-O2 | (4-4-1) | 10% |
| V-HHB(2F,3F)-O4 | (4-4-1) | 10% |
| 3-HBB(2F,3F)-O2 | (4-7-1) | 5% |
| V-HH-3 | (5-1-1) | 25% |

| | | |
|---|---|---|
| V2-BB-1 | (5-3-1) | 6% |
| 1V-HBB-2 | (5-6-1) | 4% |
| 5-HBBH-3 | (5-11-1) | 5% |
| 3-BCro(7F,8F)-5 | (6-3-1-4) | 3% |
| 3-HBCro(7F,8F)-5 | (6-3-3-4) | 4% |

0.3% by weight of the compound (1-2-33) which was the first component of the invention was added to 100% by weight of the preceding composition.

NI=70.1° C.; Tc≦−20° C.; Δn=0.100; Δ∈=−3.1; Vth=2.20 V; VHR-1=99.3%; VHR-2=98.5%; VHR-2=98.5%. The response time in the PVA device described in this specification: T=4.0 ms.

Example M15

| | | |
|---|---|---|
| V-HB(2F,3F)-O2 | (4-1-1) | 16% |
| 1V-HB(2F,3F)-O4 | (4-1-1) | 6% |
| 3-H2B(2F,3F)-O2 | (4-2-1) | 3% |
| 3-HHB(2F,3F)-O2 | (4-4-1) | 3% |
| V-HHB(2F,3F)-O2 | (4-4-1) | 10% |
| V2-HHB(2F,3F)-O2 | (4-4-1) | 7% |
| V-HBB(2F,3F)-O2 | (4-7-1) | 10% |
| V-HH-3 | (5-1-1) | 20% |
| 1V-HH-3 | (5-1-1) | 7% |
| 5-HHEBH-3 | (5-10-1) | 4% |
| 5-HB(F)BH-3 | (5-12-1) | 4% |
| 3-HH2Cro(7F,8F)-3 | (6-3-3-2) | 3% |
| 3-HH2Cro(7F,8F)-5 | (6-3-3-2) | 4% |
| 3-Cro(7F,8F)2HH-5 | (6-3-4-2) | 3% |

0.3% by weight of the compound (1-2-33) which was the first component of the invention was added to 100% by weight of the preceding composition.

NI=90.1° C.; Tc≦−20° C.; Δn=0.095; Δ∈=−3.6; Vth=1.91 V; VHR-1=99.2%; VHR-2=98.5%; VHR-3=98.6%. The response time in the PVA device described in this specification: τ=4.0 ms.

Example M16

| | | |
|---|---|---|
| V-HB(2F,3F)-O2 | (4-1-1) | 15% |
| V-HB(2F,3F)-O4 | (4-1-1) | 7% |
| 3-HBB(2F,3F)-O2 | (4-7-1) | 3% |
| V-HBB(2F,3F)-O2 | (4-7-1) | 10% |
| V2-HBB(2F,3F)-O2 | (4-7-1) | 10% |
| 2-HH-3 | (5-1-1) | 29% |
| 3-HHB-1 | (5-5-1) | 6% |
| 3-HHB-3 | (5-5-1) | 6% |
| 3-HHB-O1 | (5-5-1) | 6% |
| 3-HH1OCro(7F,8F)-5 | (6-3-3-3) | 8% |

0.3% by weight of the compound (1-2-17) which was the first component of the invention was added to 100% by weight of the preceding composition.

NI=81.0° C.; Tc≦−20° C.; Δn=0.094; Δ∈=−3.1; Vth=2.26 V; VHR-1=99.3%; VHR-2=98.5%; VHR-3=98.6%. The response time in the PVA device described in this specification: τ=4.6 ms.

Example M17

| | | |
|---|---|---|
| 3-HB(2F,3F)-O2 | (4-1-1) | 5% |
| 5-HB(2F,3F)-O2 | (4-1-1) | 5% |
| 3-HHB(2F,3F)-O2 | (4-4-1) | 5% |
| 3-HH2B(2F,3F)-O2 | (4-5-1) | 7% |
| 3-HH-VFF | (5-1) | 3% |
| V-HH-3 | (5-1-1) | 28% |
| 1V2-BB-1 | (5-3-1) | 4% |
| 3-HHEH-3 | (5-4-1) | 3% |
| V2-BB(F)B-1 | (5-7-1) | 4% |
| 3-HB(F)HH-5 | (5-9-1) | 5% |
| 5-HBB(2F,3Cl)-O2 | (6-1-3-1) | 5% |
| 3-DhBB(2F,3F)-O2 | (6-2) | 5% |
| 5-DhBB(2F,3F)-O2 | (6-2) | 4% |
| 3-DhB(2F,3F)-O2 | (6-2-1-1) | 6% |
| 5-DhB(2F,3F)-O2 | (6-2-1-1) | 6% |
| 3-Dh1OB(2F,3F)-O2 | (6-2-3-1) | 5% |

0.3% by weight of the compound (1-2-17) which was the first component of the invention was added to 100% by weight of the preceding composition.

NI=72.2° C.; Tc≦−20° C.; Δn=0.096; Δ∈=−2.4; VHR-1=99.1%; VHR-2=98.4%; VHR-3=98.5%. The response time in the PVA device described in this specification: τ=3.6 ms.

Example M18

| | | |
|---|---|---|
| 3-H1OB(2F,3F)-O2 | (4-3-1) | 5% |
| 5-H1OB(2F,3F)-O2 | (4-3-1) | 5% |
| 3-HH1OB(2F,3F)-O2 | (4-6-1) | 5% |
| 5-HH1OB(2F,3F)-O2 | (4-6-1) | 5% |
| 3-BB(2F,5F)B-2 | (5-8-1) | 3% |
| V-HH-3 | (5-1-1) | 37% |
| 1V-HH-3 | (5-1-1) | 6% |
| 3-HHB-1 | (5-5-1) | 4% |
| 3-HHB-O1 | (5-5-1) | 4% |
| 5-HBB(2F,3Cl)-O2 | (6-1-3-1) | 6% |
| 3-DhHB(2F,3F)-O2 | (6-2-4-1) | 6% |
| 3-HDhB(2F,3F)-O2 | (6-2-5-1) | 10% |
| 1O1-HBBH-5 | (—) | 4% |

0.3% by weight of the compound (1-2-25) which was the first component of the invention was added to 100% by weight of the preceding composition.

NI=92.1° C.; Tc≦−20° C.; Δn=0.085; Δ∈=−2.4; VHR-1=99.2%; VHR-2=98.5%; VHR-3=98.5%. The response time in the PVA device described in this specification: τ=3.3 ms.

Example M19

| | | |
|---|---|---|
| 3-HH1OB(2F,3F)-O2 | (4-6-1) | 6% |
| 3-HBB(2F,3F)-O2 | (4-7-1) | 6% |
| 5-HBB(2F,3F)-O2 | (4-7-1) | 6% |
| V-HH-3 | (5-1-1) | 32% |
| 1V-HH-3 | (5-1-1) | 7% |
| 3-HB-O2 | (5-2-1) | 3% |

-continued

| | | |
|---|---|---|
| 1V-HBB-2 | (5-6-1) | 4% |
| 2-BB(F)B-3 | (5-7-1) | 5% |
| 3-Dh2B(2F,3F)-O2 | (6-2-2-1) | 9% |
| 3-Dh1OB(2F,3F)-O2 | (6-2-3-1) | 6% |
| 3-DhH1OB(2F,3F)-O2 | (6-2-6-1) | 6% |
| 3-H2Cro(7F,8F)-5 | (6-3-1-2) | 3% |
| 3-H1OCro(7F,8F)-5 | (6-3-1-3) | 4% |
| 3-HHCro(7F,8F)-5 | (6-3-3-1) | 3% |

0.3% by weight of the compound (1-3-4) which was the first component of the invention was added to 100% by weight of the preceding composition.

NI=72.0° C.; Δn=0.092; Δ∈=−2.9; VHR-1=99.2%; VHR-2=98.5%; VHR-3=98.6%. The response time in the PVA device described in this specification: τ=3.4 ms.

Example M20

| | | |
|---|---|---|
| 3-HB(2F,3F)-O2 | (4-1-1) | 5% |
| 5-HB(2F,3F)-O2 | (4-1-1) | 5% |
| V-H1OB(2F,3F)-O2 | (4-3-1) | 4% |
| V2-H1OB(2F,3F)-O2 | (4-3-1) | 4% |
| V-HH2B(2F,3F)-O2 | (4-5-1) | 5% |
| V2-HH2B(2F,3F)-O2 | (4-5-1) | 5% |
| 3-HH1OB(2F,3F)-O2 | (4-6-1) | 5% |
| 4-HH1OB(2F,3F)-O2 | (4-6-1) | 3% |
| 5-HH1OB(2F,3F)-O2 | (4-6-1) | 5% |
| V-HH-3 | (5-1-1) | 28% |
| 3-HH-4 | (5-1-1) | 10% |
| V2-BB-1 | (5-3-1) | 4% |
| 5-HBB(F)B-2 | (5-13-1) | 4% |
| 5-HBB(F)B-3 | (5-13-1) | 3% |
| 3-HB(2F,3Cl)-O2 | (6-1-1-1) | 5% |
| 3-HBB(2F,3Cl)-O2 | (6-1-3-1) | 2% |
| 5-HBB(2F,3Cl)-O2 | (6-1-3-1) | 3% |

0.3% by weight of the compound (1-3-5) which was the first component of the invention was added to 100% by weight of the preceding composition.

NI=74.5° C.; Tc≦−20° C.; Δn=0.087; Δ∈=−3.4; VHR-1=99.2%; VHR-2=98.6%; VHR-3=98.6%. The response time in the PVA device described in this specification: τ=3.8 ms.

Example M21

| | | |
|---|---|---|
| V-HB(2F,3F)-O2 | (4-1-1) | 3% |
| 5-HHB(2F,3F)-O2 | (4-4-1) | 8% |
| V-HHB(2F,3F)-O2 | (4-4-1) | 10% |
| V-HHB(2F,3F)-O4 | (4-4-1) | 4% |
| V-HH-5 | (5-1-1) | 20% |
| 1V2-BB-1 | (5-3-1) | 10% |
| V-HHB-1 | (5-5-1) | 5% |
| V2-BB(F)B-1 | (5-7-1) | 3% |
| V2-BB(F)B-2 | (5-7-1) | 7% |
| 5-HBB(F)B-2 | (5-13-1) | 5% |
| 3-H1OB(2F,3F,6Me)-O2 | (6-2-10-1) | 5% |
| 5-H1OB(2F,3F,6Me)-O2 | (6-2-10-1) | 5% |
| 3-HH1OB(2F,3F,6Me)-O2 | (6-2-13-1) | 5% |
| 5-HH1OB(2F,3F,6Me)-O2 | (6-2-13-1) | 5% |
| 3-HBB(2F,3F,6Me)-O2 | (6-2-14-1) | 5% |

0.3% by weight of the compound (1-2-9) which was the first component of the invention was added to 100% by weight of the preceding composition.

NI=90.5° C.; Tc≦−30° C.; Δn=0.129; Δ∈=−3.0; VHR-1=99.2%; VHR-2=98.5%; VHR-3=98.5%. The response time in the PVA device described in this specification: τ=3.8 ms.

Example M22

| | | |
|---|---|---|
| 2-HBB(2F,3F)-O2 | (4-7-1) | 5% |
| 3-HBB(2F,3F)-O2 | (4-7-1) | 12% |
| 5-HBB(2F,3F)-O2 | (4-7-1) | 4% |
| V-HH-4 | (5-1-1) | 15% |
| V-HH-5 | (5-1-1) | 23% |
| 1V-HH-3 | (5-1-1) | 6% |
| V-HHB-1 | (5-5-1) | 5% |
| V2-HHB-1 | (5-5-1) | 3% |
| 3-H2B(2F,3F,6Me)-O2 | (6-2-9-1) | 4% |
| 3-H1OB(2F,3F,6Me)-O2 | (6-2-10-1) | 5% |
| 5-H1OB(2F,3F,6Me)-O2 | (6-2-10-1) | 3% |
| 3-HH2B(2F,3F,6Me)-O2 | (6-2-12-1) | 5% |
| 3-HH1OB(2F,3F,6Me)-O2 | (6-2-13-1) | 6% |
| 3-HH1OCro(7F,8F)-5 | (6-3-3-3) | 4% |

0.3% by weight of the compound (1-2-25) which was the first component of the invention was added to 100% by weight of the preceding composition.

NI=85.4° C.; Tc≦−20° C.; Δn=0.092; Δ∈=−2.8; VHR-1=99.3%; VHR-2=98.6%; VHR-3=98.6%. The response time in the PVA device described in this specification: τ=5.2 ms.

Example M23

| | | |
|---|---|---|
| 3-HB(2F,3F)-O2 | (4-1-1) | 8% |
| 3-HHB(2F,3F)-O2 | (4-4-1) | 10% |
| 3-HBB(2F,3F)-O2 | (4-7-1) | 11% |
| 5-HBB(2F,3F)-O2 | (4-7-1) | 5% |
| V-HH-3 | (5-1-1) | 40% |
| 3-HHEBH-3 | (5-10-1) | 4% |
| 3-HHEBH-4 | (5-10-1) | 3% |
| 3-HB(2F,3F,6Me)-O2 | (6-2-8-1) | 4% |
| 3-H2B(2F,3F,6Me)-O2 | (6-2-9-1) | 4% |
| 3-HHB(2F,3F,6Me)-O2 | (6-2-11-1) | 5% |
| 3-HH1OB(2F,3F,6Me)-O2 | (6-2-13-1) | 6% |

0.3% by weight of the compound (1-3-12) which was the first component of the invention was added to 100% by weight of the preceding composition.

NI=82.9° C.; Δn=0.088; Δ∈=−3.0; VHR-1=99.1%; VHR-2=98.6%; VHR-3=98.6%. The response time in the PVA device described in this specification: τ=4.1 ms.

Example M24

| | | |
|---|---|---|
| V-HB(2F,3F)-O2 | (4-1-1) | 12% |
| V-HB(2F,3F)-O4 | (4-1-1) | 10% |
| 3-H2B(2F,3F)-O2 | (4-2-1) | 15% |
| 3-HBB(2F,3F)-O2 | (4-7-1) | 7% |
| 4-HBB(2F,3F)-O2 | (4-7-1) | 6% |
| 5-HBB(2F,3F)-O2 | (4-7-1) | 6% |
| 3-HH-4 | (5-1-1) | 14% |
| 3-HHB-1 | (5-5-1) | 4% |
| 3-HHB-3 | (5-5-1) | 5% |
| 3-HHB-O1 | (5-5-1) | 3% |
| 5-HBB(F)B-2 | (5-13-1) | 6% |
| 5-HBB(F)B-3 | (5-13-1) | 5% |
| 4O-B(2F,3F)B(2F,3F)-O6 | (6-2-15-1) | 4% |
| 2-BB(2F,3F)B-4 | (6-4-1) | 3% |

0.5% by weight of the compound (1-2-25) which was the first component of the invention was added to 100% by weight of the preceding composition.

NI=83.9° C.; Tc≦−20° C.; Δn=0.120; Δ∈=−3.7; Vth=2.13 V; VHR-1=99.1%; VHR-2=98.6%; VHR-2=98.6%. The response time in the PVA device described in this specification: τ=5.3 ms.

Example M25

| | | |
|---|---|---|
| 3-H2B(2F,3F)-O2 | (4-2-1) | 15% |
| 5-H2B(2F,3F)-O2 | (4-2-1) | 15% |
| 2-HBB(2F,3F)-O2 | (4-7-1) | 3% |
| 3-HBB(2F,3F)-O2 | (4-7-1) | 9% |
| 4-HBB(2F,3F)-O2 | (4-7-1) | 5% |
| 5-HBB(2F,3F)-O2 | (4-7-1) | 9% |
| 2-HH-5 | (5-1-1) | 3% |
| 3-HH-4 | (5-1-1) | 15% |
| 3-HH-5 | (5-1-1) | 4% |
| 3-HB-O2 | (5-2-1) | 12% |
| 3-HHB-1 | (5-5-1) | 3% |
| 3-HHB-3 | (5-5-1) | 4% |
| 3-HHB-O1 | (5-5-1) | 3% |

0.3% by weight of the compound (1-3-13) which was the first component of the invention was added to 100% by weight of the preceding composition.

NI=76.0° C.; Δn=0.101; Δ∈=−2.8; Vth=2.40 V; VHR-1=99.3%; VHR-2=98.6%; VHR-3=98.7%. The response time in the PVA device described in this specification: τ=4.1 ms.

Example M26

| | | |
|---|---|---|
| 3-HB(2F,3F)-O2 | (4-1-1) | 5% |
| 5-HB(2F,3F)-O2 | (4-1-1) | 5% |
| 3-HHB(2F,3F)-O2 | (4-4-1) | 5% |
| 3-HH2B(2F,3F)-O2 | (4-5-1) | 7% |
| 3-HH-VFF | (5-1) | 3% |
| V-HH-3 | (5-1-1) | 28% |
| 1V2-BB-1 | (5-3-1) | 4% |
| 3-HHEH-3 | (5-4-1) | 3% |
| V2-BB(F)B-1 | (5-7-1) | 4% |
| 3-HB(F)HH-5 | (5-9-1) | 5% |
| 5-HBB(2F,3Cl)-O2 | (6-1-3-1) | 5% |
| 5-DhBB(2F,3F)-O2 | (6-2) | 4% |
| 3-DhB(2F,3F)-O2 | (6-2-1-1) | 6% |
| 5-DhB(2F,3F)-O2 | (6-2-1-1) | 6% |
| 3-Dh1OB(2F,3F)-O2 | (6-2-3-1) | 5% |
| 3-dhBB(2F,3F)-O2 | (6-2-7-1) | 5% |

0.3% by weight of the compound (1-2-17) which was the first component of the invention was added to 100% by weight of the preceding composition.

NI=73.1° C.; Tc≦−20° C.; Δn=0.097; Δ∈=−2.5; VHR-1=99.1%; VHR-2=98.3%; VHR-3=98.5%. The response time in the PVA device described in this specification: τ=3.5 ms.

Example M27

| | | |
|---|---|---|
| V-HB(2F,3F)-O2 | (4-1-1) | 15% |
| V-HB(2F,3F)-O4 | (4-1-1) | 7% |
| 3-HBB(2F,3F)-O2 | (4-7-1) | 3% |
| V-HBB(2F,3F)-O2 | (4-7-1) | 10% |
| V2-HBB(2F,3F)-O2 | (4-7-1) | 10% |
| V-HH-3 | (5-1-1) | 29% |
| 3-HHB-1 | (5-5-1) | 6% |
| 3-HHB-3 | (5-5-1) | 6% |
| 3-HHB-O1 | (5-5-1) | 6% |
| 3-HH1OCro(7F,8F)-5 | (6-3-3-3) | 8% |

0.3% by weight of the compound (1-2-17) which was the first component of the invention was added, 0.3 by weight of the compound (8-3) was added, and 200 ppm of the compound (9) where w was 7 was added to 100% by weight of the preceding composition.

NI=85.5° C.; Tc≦−20° C.; Δn=0.100; Δ∈=−3.2; Vth=2.28 V; VHR-1=99.5%; VHR-2=98.8%; VHR-3=98.8%. The response time in the PVA device described in this specification: τ=4.3 ms.

Example M28

| | | |
|---|---|---|
| 3-H2B(2F,3F)-O2 | (4-2-1) | 18% |
| 5-H2B(2F,3F)-O2 | (4-2-1) | 17% |
| 3-HBB(2F,3F)-O2 | (4-7-1) | 9% |
| 4-HBB(2F,3F)-O2 | (4-7-1) | 3% |
| 5-HBB(2F,3F)-O2 | (4-7-1) | 9% |
| 2-HH-3 | (5-1-1) | 18% |
| 3-HH-4 | (5-1-1) | 20% |
| 3-HHB-1 | (5-5-1) | 5% |
| 3-HHB-3 | (5-5-1) | 5% |
| 3-HHB-O1 | (5-5-1) | 4% |
| 3-HHB(2F,3Cl)-O2 | (6-1-2-1) | 4% |
| 4-HHB(2F,3Cl)-O2 | (6-1-2-1) | 3% |
| 5-HHB(2F,3Cl)-O2 | (6-1-2-1) | 3% |

0.3% by weight of the compound (1-3-4) which was the first component of the invention was added to 100% by weight of the preceding composition.

NI=80.7° C.; Tc≦−20° C.; Δn=0.094; Δ∈=−3.4; VHR-1=99.1%; VHR-2=98.2%; VHR-3=98.3%. The response time in the PVA device described in this specification: τ=5.0 ms.

Example M29

| | | |
|---|---|---|
| 3-H2B(2F,3F)-O2 | (4-2-1) | 18% |
| 5-H2B(2F,3F)-O2 | (4-2-1) | 17% |
| 3-HBB(2F,3F)-O2 | (4-7-1) | 9% |
| 4-HBB(2F,3F)-O2 | (4-7-1) | 3% |
| 5-HBB(2F,3F)-O2 | (4-7-1) | 9% |
| 2-HH-3 | (5-1-1) | 18% |
| 3-HH-4 | (5-1-1) | 2% |
| 3-HHB-1 | (5-5-1) | 5% |
| 3-HHB-3 | (5-5-1) | 5% |
| 3-HHB-O1 | (5-5-1) | 4% |
| 3-HHB(2F,3Cl)-O2 | (6-1-2-1) | 3% |
| 5-HHB(2F,3Cl)-O2 | (6-1-2-1) | 2% |
| 3-HDhB(2F,3F)-O2 | (6-2-5-1) | 5% |

0.3% by weight of the compound (1-3-5) which was the first component of the invention was added to 100% by weight of the preceding composition.

NI=80.2° C.; Tc≦−20° C.; Δn=0.093; Δ∈=−3.6; VHR-1=99.1%; VHR-2=98.3%; VHR-3=98.4%. The response time in the PVA device described in this specification: τ=5.0 ms.

Example M30

| | | |
|---|---|---|
| 3-H2B(2F,3F)-O2 | (4-2-1) | 18% |
| 5-H2B(2F,3F)-O2 | (4-2-1) | 17% |
| 3-HHB(2F,3F)-O2 | (4-4-1) | 5% |
| 5-HHB(2F,3F)-O2 | (4-4-1) | 5% |
| 3-HBB(2F,3F)-O2 | (4-7-1) | 9% |
| 4-HBB(2F,3F)-O2 | (4-7-1) | 3% |
| 5-HBB(2F,3F)-O2 | (4-7-1) | 9% |
| 2-HH-3 | (5-1-1) | 18% |
| 3-HH-4 | (5-1-1) | 2% |
| 3-HHB-1 | (5-5-1) | 5% |
| 3-HHB-3 | (5-5-1) | 5% |
| 3-HHB-O1 | (5-5-1) | 4% |

0.3% by weight of the compound (1-2-9) which was the first component of the invention was added to 100% by weight of the preceding composition.

NI=82.2° C.; Tc≦−20° C.; Δn=0.095; Δ∈=−3.6; VHR-1=99.2%; VHR-2=98.5%; VHR-3=98.5%. The response time in the PVA device described in this specification: τ=4.8 ms.

Example M31

| | | |
|---|---|---|
| 3-H2B(2F,3F)-O2 | (4-2-1) | 18% |
| 5-H2B(2F,3F)-O2 | (4-2-1) | 17% |
| 3-HBB(2F,3F)-O2 | (4-7-1) | 9% |
| 4-HBB(2F,3F)-O2 | (4-7-1) | 3% |
| 5-HBB(2F,3F)-O2 | (4-7-1) | 9% |
| 2-HH-3 | (5-1-1) | 18% |
| 3-HH-4 | (5-1-1) | 2% |
| 3-HHB-1 | (5-5-1) | 5% |
| 3-HHB-3 | (5-5-1) | 5% |
| 3-HHB-O1 | (5-5-1) | 4% |
| 3-HDhB(2F,3F)-O2 | (6-2-5-1) | 5% |
| 5-HDhB(2F,3F)-O2 | (6-2-5-1) | 5% |

0.3% by weight of the compound (1-2-25) which was the first component of the invention was added to 100% by weight of the preceding composition.

NI=79.8° C.; Tc≦−20° C.; Δn=0.092; Δ∈=−3.6; VHR-1=99.2%; VHR-2=98.6%; VHR-3=98.5%. The response time in the PVA device described in this specification: τ=4.8 ms.

Example M32

| | | |
|---|---|---|
| 3-H2B(2F,3F)-O2 | (4-2-1) | 20% |
| 5-H2B(2F,3F)-O2 | (4-2-1) | 20% |
| 3-HBB(2F,3F)-O2 | (4-7-1) | 10% |
| 4-HBB(2F,3F)-O2 | (4-7-1) | 6% |
| 5-HBB(2F,3F)-O2 | (4-7-1) | 3% |
| 2-HH-3 | (5-1-1) | 6% |
| 3-HH-4 | (5-1-1) | 17% |
| 3-HHB-O1 | (5-5-1) | 3% |
| 3-HHEBH-3 | (5-10-1) | 4% |
| 3-HHEBH-4 | (5-10-1) | 3% |
| 3-HH1OCro(7F,8F)-5 | (6-3-3-3) | 8% |

0.3% by weight of the compound (1-3-12) which was the first component of the invention was added to 100% by weight of the preceding composition.

NI=80.6° C.; Tc≦−20° C.; Δn=0.089; Δ∈=−3.9; VHR-1=99.1%; VHR-2=98.3%; VHR-3=98.3%. The response time in the PVA device described in this specification: τ=5.1 ms.

Example M33

| | | |
|---|---|---|
| 3-H2B(2F,3F)-O2 | (4-2-1) | 20% |
| 5-H2B(2F,3F)-O2 | (4-2-1) | 14% |
| 3-HBB(2F,3F)-O2 | (4-7-1) | 9% |
| 4-HBB(2F,3F)-O2 | (4-7-1) | 3% |
| 2-HH-3 | (5-1-1) | 19% |
| 3-HH-4 | (5-1-1) | 7% |
| 3-HHB-1 | (5-5-1) | 3% |
| 3-HHB-3 | (5-5-1) | 4% |
| 3-HHEBH-3 | (5-10-1) | 4% |
| 3-HHEBH-4 | (5-10-1) | 4% |
| 3-HDhB(2F,3F)-O2 | (6-2-5-1) | 8% |
| 3-HH1OCro(7F,8F)-5 | (6-3-3-3) | 5% |

0.3% by weight of the compound (1-2-25) which was the first component of the invention was added to 100% by weight of the preceding composition.

NI=78.3° C.; Tc≦−20° C.; Δn=0.084; Δ∈=−3.5; VHR-1=99.1%; VHR-2=98.3%; VHR-3=98.2%. The response time in the PVA device described in this specification: τ=4.7 ms.

Example M34

| | | |
|---|---|---|
| 3-H2B(2F,3F)-O2 | (4-2-1) | 15% |
| 5-H2B(2F,3F)-O2 | (4-2-1) | 10% |
| 3-HHB(2F,3F)-O2 | (4-4-1) | 6% |
| 3-HBB(2F,3F)-O2 | (4-7-1) | 11% |
| 4-HBB(2F,3F)-O2 | (4-7-1) | 10% |
| 5-HBB(2F,3F)-O2 | (4-7-1) | 7% |
| 2-HH-3 | (5-1-1) | 22% |
| 3-HB-O2 | (5-2-1) | 7% |
| 5-HB-O2 | (5-2-1) | 6% |
| 5-HBB(F)B-2 | (5-13-1) | 6% |

0.3% by weight of the compound (1-3-4) which was the first component of the invention was added to 100% by weight of the preceding composition.

NI=73.3° C.; Tc≦−20° C.; Δn=0.106; Δ∈=−3.0; VHR-1=99.1%; VHR-2=98.2%; VHR-3=98.3%. The response time in the PVA device described in this specification: τ=4.9 ms.

Example M35

| | | |
|---|---|---|
| 3-H2B(2F,3F)-O2 | (4-2-1) | 15% |
| 5-H2B(2F,3F)-O2 | (4-2-1) | 7% |
| 3-HBB(2F,3F)-O2 | (4-7-1) | 11% |
| 4-HBB(2F,3F)-O2 | (4-7-1) | 10% |
| 5-HBB(2F,3F)-O2 | (4-7-1) | 7% |

-continued

| | | |
|---|---|---|
| 2-HH-3 | (5-1-1) | 22% |
| 3-HH-4 | (5-1-1) | 3% |
| 3-HB-O2 | (5-2-1) | 7% |
| 5-HB-O2 | (5-2-1) | 6% |
| 5-HBB(F)B-2 | (5-13-1) | 6% |
| 3-HDhB(2F,3F)-O2 | (6-2-5-1) | 6% |

0.3% by weight of the compound (1-3-5) which was the first component of the invention was added to 100% by weight of the preceding composition.

NI=74.6° C.; Tc≦−20° C.; Δn=0.104; Δ∈=−3.0; VHR-1=99.2%; VHR-2=98.3%; VHR-3=98.3%. The response time in the PVA device described in this specification: τ=4.9 ms.

The compositions in Example M1 to Example M35 have a short response time in comparison with that in Comparative example M1. Thus, the liquid crystal composition of the invention is so much superior in characteristics to the liquid crystal composition shown in Comparative example M1.

Industrial Applicability

The liquid crystal composition has at least one of characteristics such as a high maximum temperature of a nematic phase, a low minimum temperature of a nematic phase, a small viscosity, a suitable optical anisotropy, a large positive or negative dielectric anisotropy, a large specific resistance, a high stability to ultraviolet light and a high stability to heat, or is suitably balanced between at least two of the characteristics, and is suitable for use in a display device to which PSA technology is applied. The liquid crystal display device containing such a composition can be used in liquid crystal display projectors, liquid crystal televisions and so forth, since it becomes an AM device that has a short response time, a large voltage holding ratio, a large contrast ratio, a long service life and so forth.

The invention claimed is:

1. A polymerizable compound represented by formula (1-3):

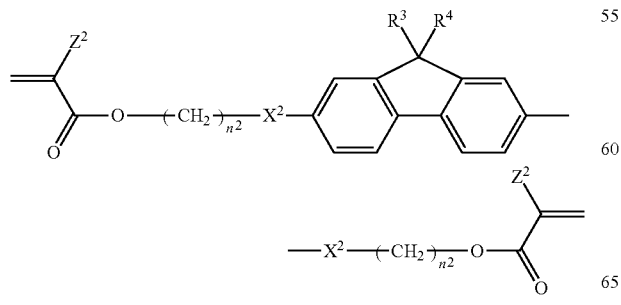

(1-3)

wherein $R^3$ and $R^4$ are independently alkyl having 1 to 5 carbons, hydrogen, chlorine or fluorine; $X^2$ is independently a single bond, —COO— or —O—; $Z^2$ is independently hydrogen, fluorine, chlorine, methyl or —CF$_3$; and $n^2$ is independently an integer from 1 to 8.

2. A liquid crystal composition including at least one compound selected from the group of compounds represented by formula (1-3) as a first component, at least one compound selected from the group of compounds represented by formula (4) as a second component, and at least one compound selected from the group of compounds represented by formula (5) as a third component:

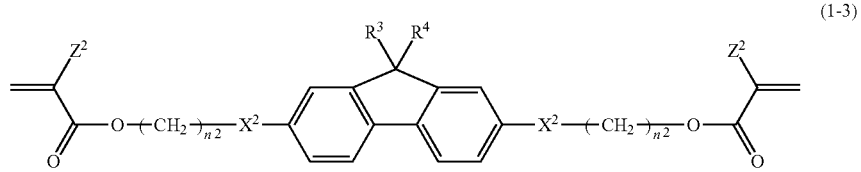

(1-3)

(4)

(5)

wherein $R^3$ and $R^4$ are independently alkyl having 1 to 5 carbons, hydrogen, chlorine or fluorine; $X^2$ is independently a single bond, —COO— or —O—; $Z^2$ is independently hydrogen, fluorine, chlorine, methyl or —CF$_3$; and $n^2$ is independently an integer from 0 to 8; $R^{11}$, $R^{12}$, $R^{13}$, $R^{14}$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; the ring B is independently 1,4-cyclohexylene or 1,4-phenylene; the ring C and the ring D are independently 1,4-cyclohexylene, 1,4-phenylene, 2-fluoro-1,4-phenylene or 2,5-difluoro-1,4-phenylene; $Z^{11}$ is independently a single bond, —(CH$_2$)$_2$—, —CH$_2$O— or —COO—; and k and j are independently 1, 2 or 3.

3. The liquid crystal composition according to claim 2, wherein the second component is at least one compound selected from the group of compounds represented by formula (4-1) to formula (4-7):

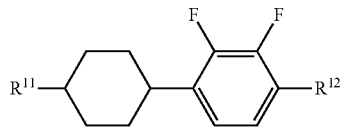

(4-1)

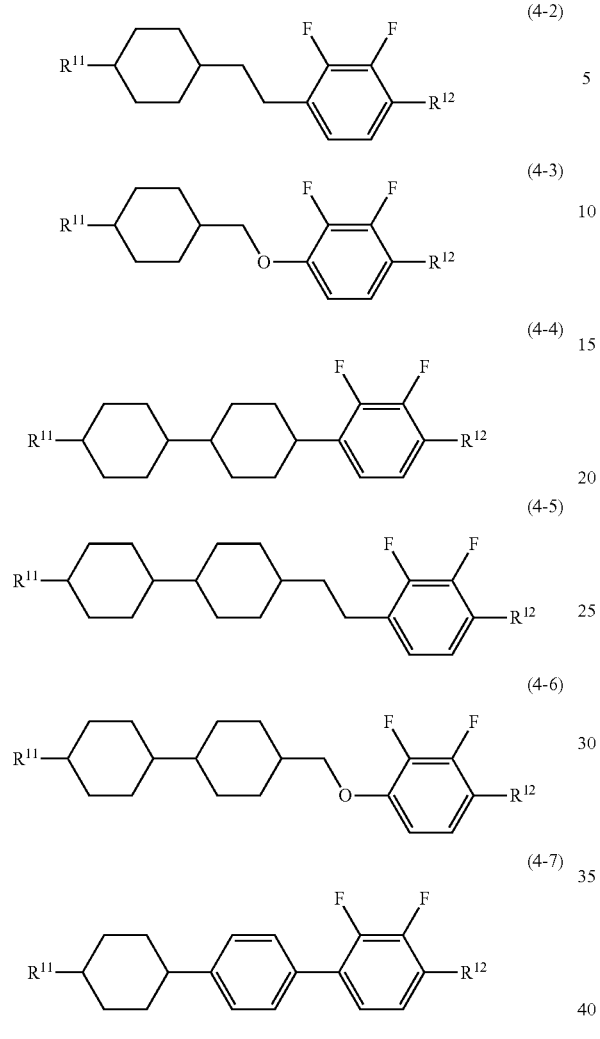

wherein $R^{11}$ and $R^{12}$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

4. The liquid crystal composition according to claim 2, wherein the third component is at least one compound selected from the group of compounds represented by formula (5-1) to formula (5-13):

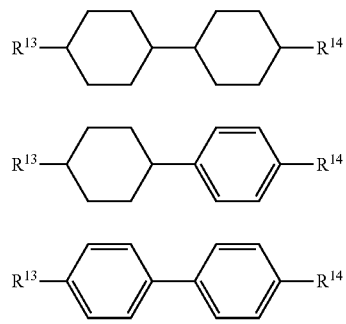

wherein $R^{13}$ and $R^{14}$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

5. The liquid crystal composition according to claim 2, wherein the ratio of the second component is in the range of 10% by weight to 60% by weight and the ratio of the third component is in the range of 5% by weight to 50% by weight based on the weight of the liquid crystal composition excluding the first component, and the ratio of the first component is in the range of 0.05% by weight to 10% by weight based on 100% by weight of the liquid crystal composition excluding the first component.

6. The liquid crystal composition according to claim 2, further including at least one compound selected from the group of compounds represented by formula (6-1) to formula (6-4) as a fourth component:

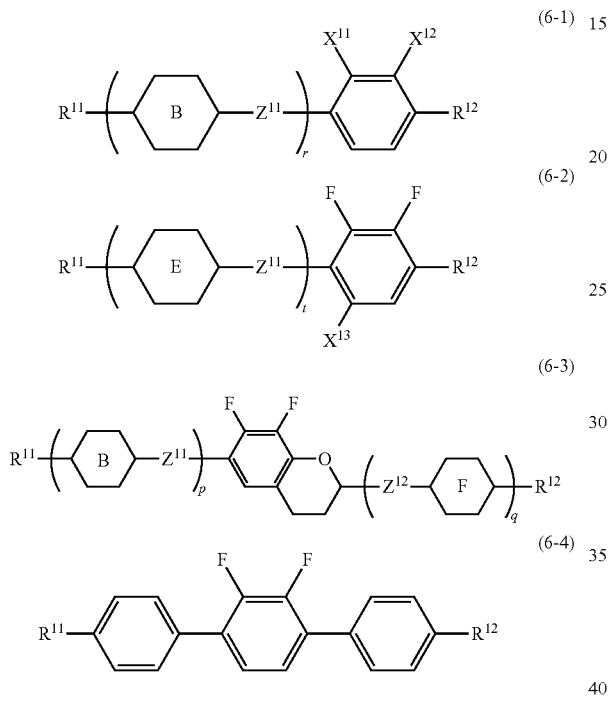

wherein $R^{11}$ and $R^{12}$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; the ring B and the ring F are independently 1,4-cyclohexylene or 1,4-phenylene; the ring E is independently tetrahydropyran-2,5-diyl, 1,4-cyclohexylene, 1,4-phenylene, 2,3-difluoro-1,4-phenylene or 2-fluoro-1,4-phenylene; $Z^{11}$ and $Z^{12}$ are independently a single bond, —(CH$_2$)$_2$—, —CH$_2$O— or —COO—; one of $X^{11}$ and $X^{12}$ is fluorine, and the other is chlorine; $X^{13}$ is hydrogen or methyl, and at least one of the ring E is tetrahydropyran-2,5-diyl, 2,3-difluoro-1,4-phenylene or 2-fluoro-1,4-phenylene when $X^{13}$ is hydrogen; r and t are independently 1, 2 or 3; and p and q are independently 0, 1, 2 or 3, and the sum of p and q is 0, 1, 2 or 3.

7. The liquid crystal composition according to claim 6, wherein the fourth component is at least one compound selected from the group of compounds represented by formula (6-1-1) to formula (6-1-3), formula (6-2-1) to formula (6-2-16), formula (6-3-1) to formula (6-3-4) and formula (6-4):

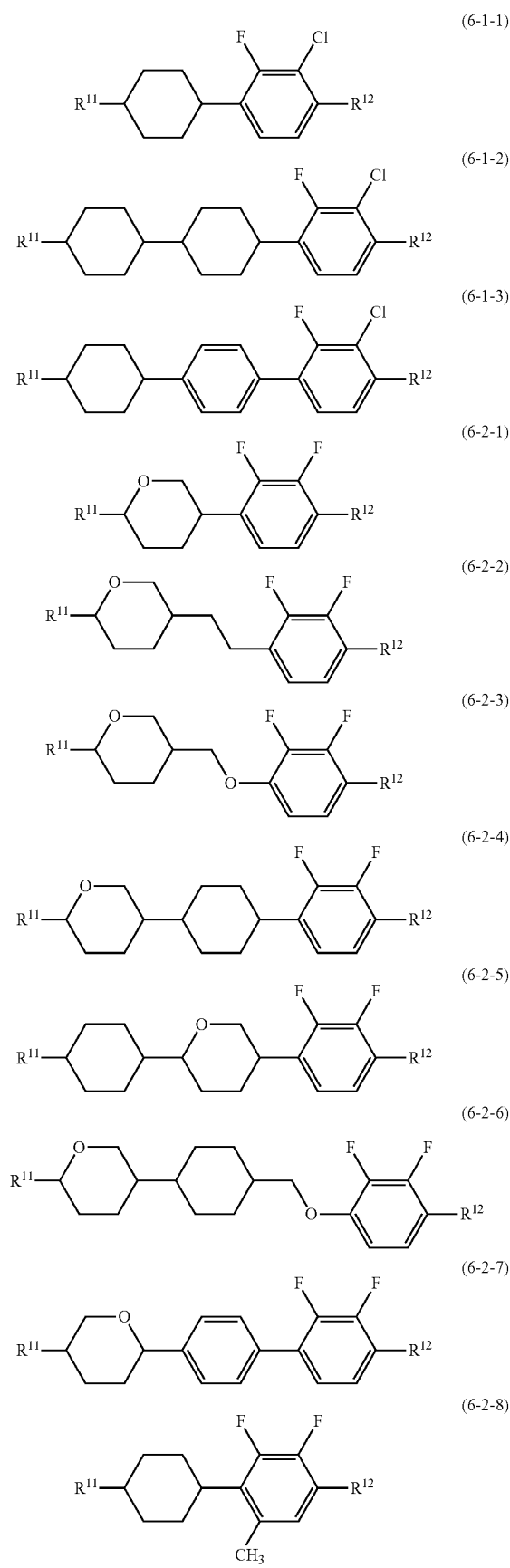

(6-2-9) 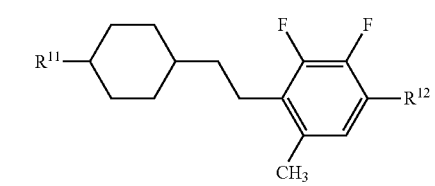

(6-2-10) 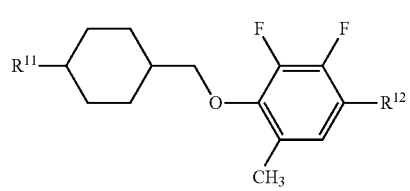

(6-2-11) 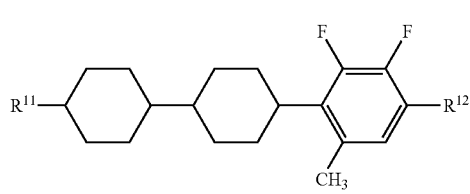

(6-2-12) 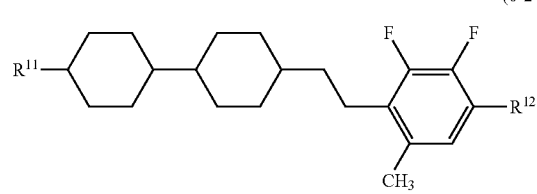

(6-2-13) 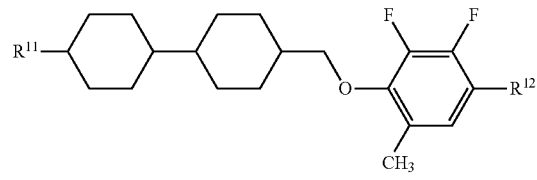

(6-2-14) 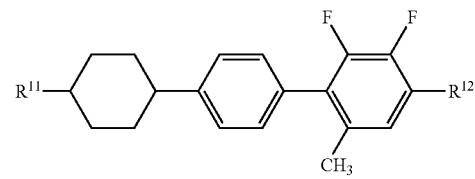

(6-2-15) 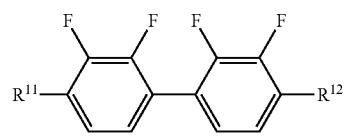

(6-2-16) 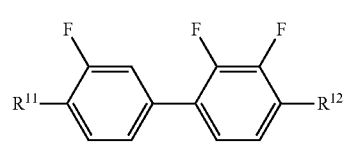

(6-3-1) 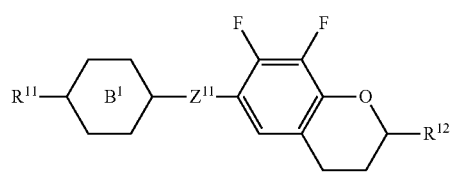

(6-3-2) 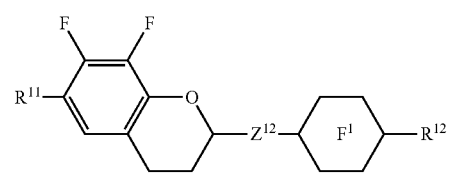

(6-3-3) 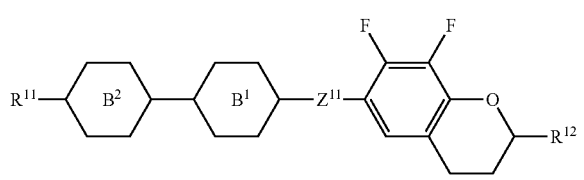

(6-3-4) 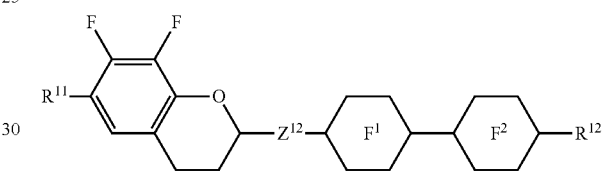

(6-4) 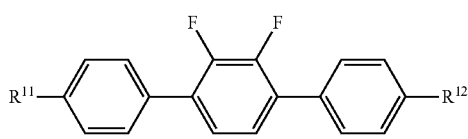

wherein $R^{11}$ and $R^{12}$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; the ring $B^1$, the ring $B^2$, the ring $F^1$ and the ring $F^2$ are independently 1,4-cyclohexylene or 1,4-phenylene; and $Z^{11}$ and $Z^{12}$ are independently a single bond, —(CH$_2$)$_2$—, —CH$_2$O— or —COO—.

8. The liquid crystal composition according to claim 6, wherein the ratio of the fourth component is in the range of 5% by weight to 50% by weight based on the weight of the liquid crystal composition excluding the first component.

9. The liquid crystal composition according to claim 2, further including at least one compound selected from the group of compounds represented by formula (7-1) to formula (7-4) as a fifth component:

(7-1) 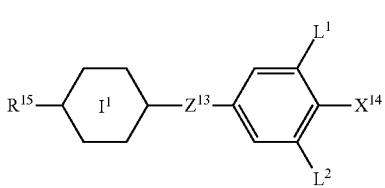

-continued (7-2)
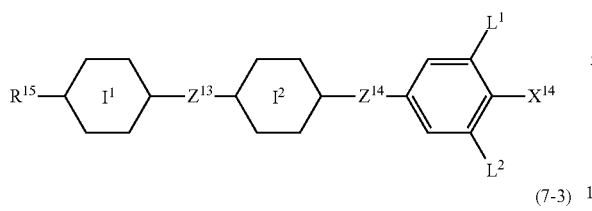

(7-3)
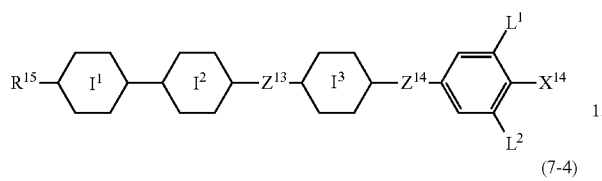

(7-4)
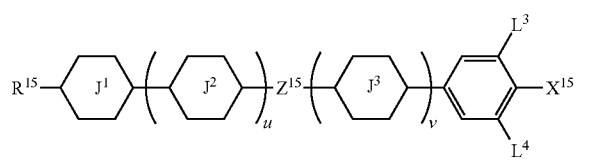

wherein R$^{15}$ is alkyl having 1 to 12 carbons or alkenyl having 2 to 12 carbons, and in the alkyl and alkenyl, arbitrary hydrogen may be replaced by fluorine, and arbitrary —CH$_2$— may be replaced by —O—; X$^{14}$ is fluorine, chlorine, —OCF$_3$, —OCHF$_2$, —CF$_3$, CHF$_2$, —CH$_2$F, —OCF$_2$CHF$_2$ or —OCF$_2$CHFCF$_3$; X$^{15}$ is —C≡N or —C≡C—C≡N; the ring I$^1$, the ring I$^2$, the ring I$^3$, the ring J$^1$, the ring J$^2$ and the ring J$^3$ are independently 1,4-cyclohexylene, 1,3-dioxane-2,5-diyl, pyrimidine-2,5-diyl, tetrahydropyran-2,5-diyl or 1,4-phenylene in which arbitrary hydrogen may be replaced by fluorine; Z$^{13}$ and Z$^{14}$ are independently —(CH$_2$)$_2$—, —(CH$_2$)$_4$—, —COO—, —CF$_2$O—, —OCF$_2$—, —CH=CH—, —C≡C—, —CH$_2$O— or a single bond; Z$^{15}$ is —(CH$_2$)$_2$—, —COO—, —CF$_2$O—, —C≡C—, —CH$_2$O— or a single bond; L$^1$, L$^2$, L$^3$ and L$^4$ are independently hydrogen or fluorine; and u is 0, 1 or 2, and v is 0 or 1.

10. The liquid crystal composition according to claim 9, wherein the ratio of the fifth component is in the range of 5% by weight to 50% by weight based on the weight of the liquid crystal composition excluding the first component.

11. The liquid crystal composition according to claim 2, further including a polymerization initiator.

12. The liquid crystal composition according to claim 2, further including a polymerization inhibitor.

13. The liquid crystal composition according to claim 2, wherein the maximum temperature of a nematic phase is 70° C. or higher, the optical anisotropy (25° C.) at a wavelength of 589 nanometers is 0.08 or more, and the dielectric anisotropy (25° C.) at a frequency of 1 kHz is -2 or less.

14. A PSA (polymer sustained alignment) type-liquid crystal display device, wherein the device contains two substrates, where at least one of the substrates has an electrode layer, and a liquid crystal material is arranged between these two substrates, and the liquid crystal material is prepared by polymerization of the polymerizable compound that is included in liquid crystal composition according to claim 2.

15. The liquid crystal display device according to claim 14, wherein the operating mode of the liquid crystal display device is a TN (twisted nematic) mode, a VA (vertical alignment) mode, an OCB (optically compensated bend) mode or an IPS (in-plane switching) mode, and the driving mode of the liquid crystal display device is an active matrix mode.

16. The liquid crystal display device according to claim 14, wherein the liquid crystal display device has a multi-domain structure, and the driving mode is a VA (vertical alignment) mode.

17. A method for the production of the liquid crystal display device according to claim 14, wherein a voltage is applied to the liquid crystal composition which is arranged between the two substrates, and the polymerizable compound included in the liquid crystal composition is polymerized by irradiation with light, wherein the liquid crystal composition includes at least one compound selected from the group of compounds represented by formula (1-3) as a first component, at least one compound selected from the group of compounds represented by formula (4) as a second component, and at least one compound selected from the group of compounds represented by formula (5) as a third component:

(1-3)
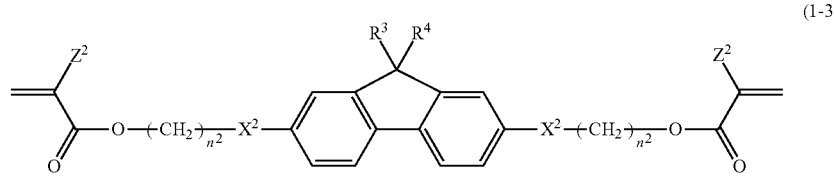

(4)
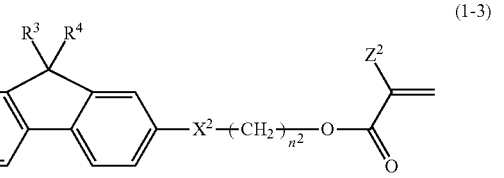

(5)
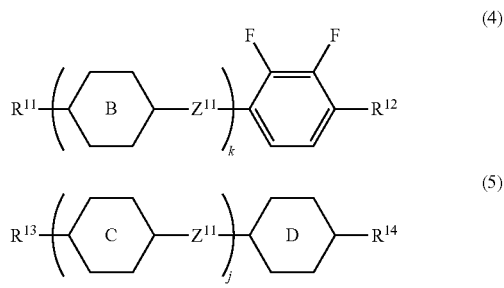

wherein R$^3$ and R$^4$ are independently alkyl having 1 to 5 carbons, hydrogen, chlorine or fluorine; X$^2$ is independently a single bond, —COO— or —O—; Z$^2$ is independently hydrogen, fluorine, chlorine, methyl or —CF$_3$; and n$^2$ is independently an integer from 0 to 8; R$^{11}$, R$^{12}$, R$^{13}$ and R$^{14}$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; the ring B is independently 1,4-cyclohexylene or 1,4-phenylene; the ring C and the ring D are independently 1,4-cyclohexylene, 1,4-phenylene, 2-fluoro-1,4-phenylene or 2,5-difluoro-1,4-phenylene; $Z^{11}$ is independently a single bond, —(CH$_2$)$_2$—, —CH$_2$O— or —COO—; and k and j are independently 1, 2 or 3.

* * * * *